(12) United States Patent
Tambakis

(10) Patent No.: US 6,427,403 B1
(45) Date of Patent: Aug. 6, 2002

(54) FIBER REINFORCED PLASTIC (FRP) COMPOSITE STRUCTURAL SYSTEM FOR DECKS, DOCKS, BOARDWALKS, WALKWAYS, SPA DECKS, HOT TUB DECKS AND GAZEBOS AND COMPONENTS THEREFORE AND METHOD OF MAKING SAME

(76) Inventor: Nicholas C. Tambakis, 5014 Clifford Rd., Perry Hall, MD (US) 21128

( * ) Notice: Subject to any disclaimer, the term of this patent is extended or adjusted under 35 U.S.C. 154(b) by 0 days.

(21) Appl. No.: 09/184,644

(22) Filed: Nov. 3, 1998

(51) Int. Cl.$^7$ ................................................ E04C 1/00
(52) U.S. Cl. ............................ 52/309.1; 52/299; 52/263
(58) Field of Search ...................... 52/263, 299, 309.1, 52/650.3, DIG. 8

(56) References Cited

U.S. PATENT DOCUMENTS

| | | |
|---|---|---|
| 2,862,255 A | 12/1958 | Nelson |
| 3,045,294 A | 7/1962 | Livezey, Jr. |
| 3,387,422 A | 6/1968 | Wanzer |
| 3,389,930 A | 6/1968 | Ashworth et al. |
| 3,822,053 A | 7/1974 | Daily |
| 3,902,703 A | 9/1975 | Bouye |
| 3,921,960 A | 11/1975 | Bright |
| 4,026,084 A | 5/1977 | Goose |
| 4,108,422 A | 8/1978 | Fleischmann |
| 4,138,094 A | 2/1979 | Thir |
| 4,140,298 A | 2/1979 | Coleman, Jr. |
| 4,477,058 A | 10/1984 | Lowery |
| 4,572,694 A | 2/1986 | Hoeksema |

(List continued on next page.)

Primary Examiner—Beth A. Stephan
(74) Attorney, Agent, or Firm—Venable; James R. Burdett; Paul F. Daebeler

(57) ABSTRACT

An entire structure utilizing fiber reinforced plastic (FRP) pultruded structural shapes is provided for use in decks, docks, and boardwalks. This deck system for building decking, docks, boardwalks, walkways, gazebos, hot tub decks and spas can be built either to and extending from the exterior side of residential or commercial structures or as an independent, freestanding structure. The invention is assembled from FRP pultruded components comprising several systems which include a weight bearing support system, flooring system, safety system, roofing system, and decorative system. Components of the invention including but not limited to vertical support posts, horizontal decking, railing, stairs, gates, doors, frames and supporting members will be manufactured from FRP pultrusion structural shapes and composite sections using corrosion resistant hardware and adhesives. The use of fiber reinforced plastic (FRP), allows for the manufacture of a corrosion-free, non-rotting, warp and splitting resistant decks and docks. FRP structures do not suffer from the structural and thermal limitations that recycled plastic lumber and PVC experience. The decking surface will incorporate a skid-resistant surface using either pultruded material or honeycomb-sandwich flooring panels. Portions or entire assemblies of the invention will be manufactured as modular units, which can be easily transported to the worksite for final assembly/installation. Hollow sections in the FRP pultruded shapes will be used to conceal electrical wiring for power and lighting fixtures. The intent of this application is to describe these types of structures and their components. The intent of the application is not to limit it to only these structures, but it can be extended to other structures such as gazebos, decks for hot tubs and spas, pavilions, and enclosed patios, pool enclosures, and property (yard) enclosures where the structure can be screened-in.

28 Claims, 50 Drawing Sheets

U.S. PATENT DOCUMENTS

| | | |
|---|---|---|
| 4,609,185 A | 9/1986 | Prater et al. |
| 4,691,484 A | 9/1987 | Wilson |
| 4,783,040 A | 11/1988 | Lindberg et al. |
| 4,809,955 A | 3/1989 | Veilleux |
| 4,823,529 A | 4/1989 | Canfield et al. |
| 4,833,842 A | 5/1989 | Anastasio |
| 5,230,186 A | 7/1993 | Hammonds et al. |
| 5,274,977 A | 1/1994 | Bayly |
| 5,275,381 A | 1/1994 | Cluff et al. |
| 5,394,667 A | 3/1995 | Nystrom |
| 5,412,915 A | 5/1995 | Johnson |
| 5,553,427 A * | 9/1996 | Andres ..................... 52/177 |
| 5,623,803 A | 4/1997 | Willis |
| 5,706,620 A | 1/1998 | De Zen |
| 5,811,035 A * | 9/1998 | Mockry .................. 52/588.1 X |
| 6,061,991 A * | 5/2000 | Dahl ..................... 52/263 X |

* cited by examiner

See View A in Figure 22

View A (Refer back to Figure 21)

See View B in Figure 24

See View C in Figure 25

See View C in Figure 23

Method 2
(Flooring-to-Weight Bearing System Attachment)

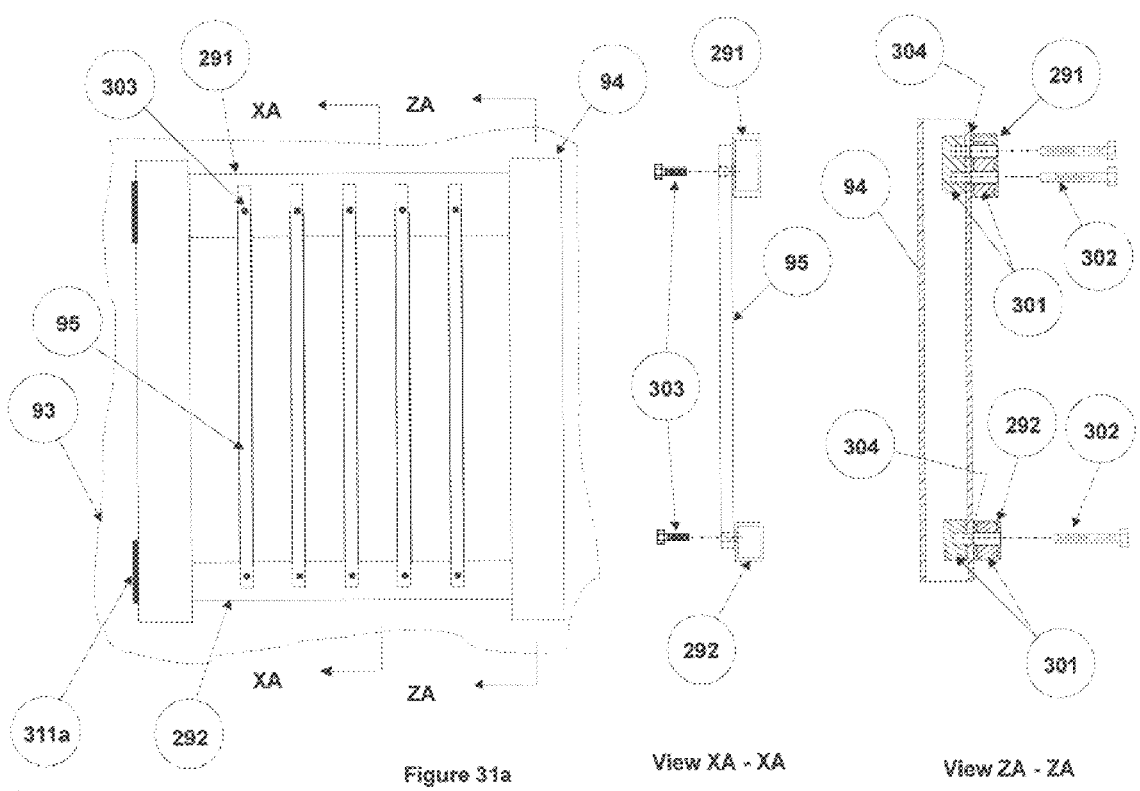
Figure 31a   View XA - XA   View ZA - ZA

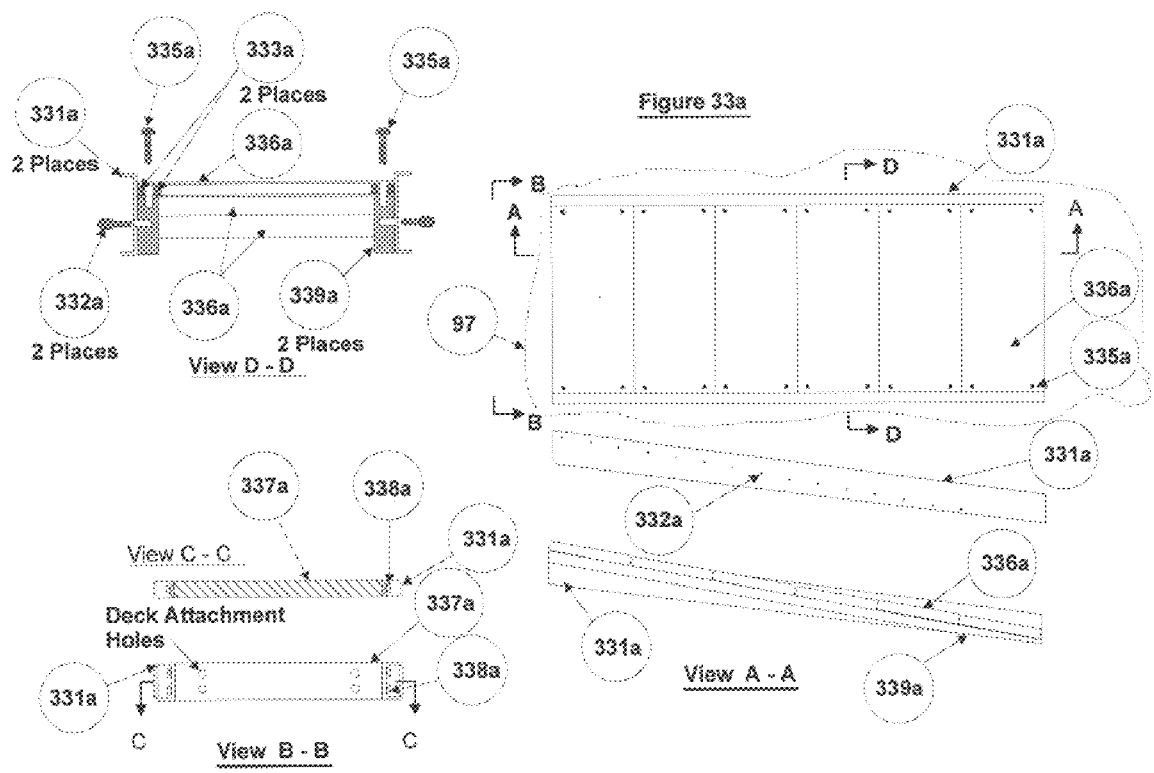

View K
(Refer back to Figure 37)

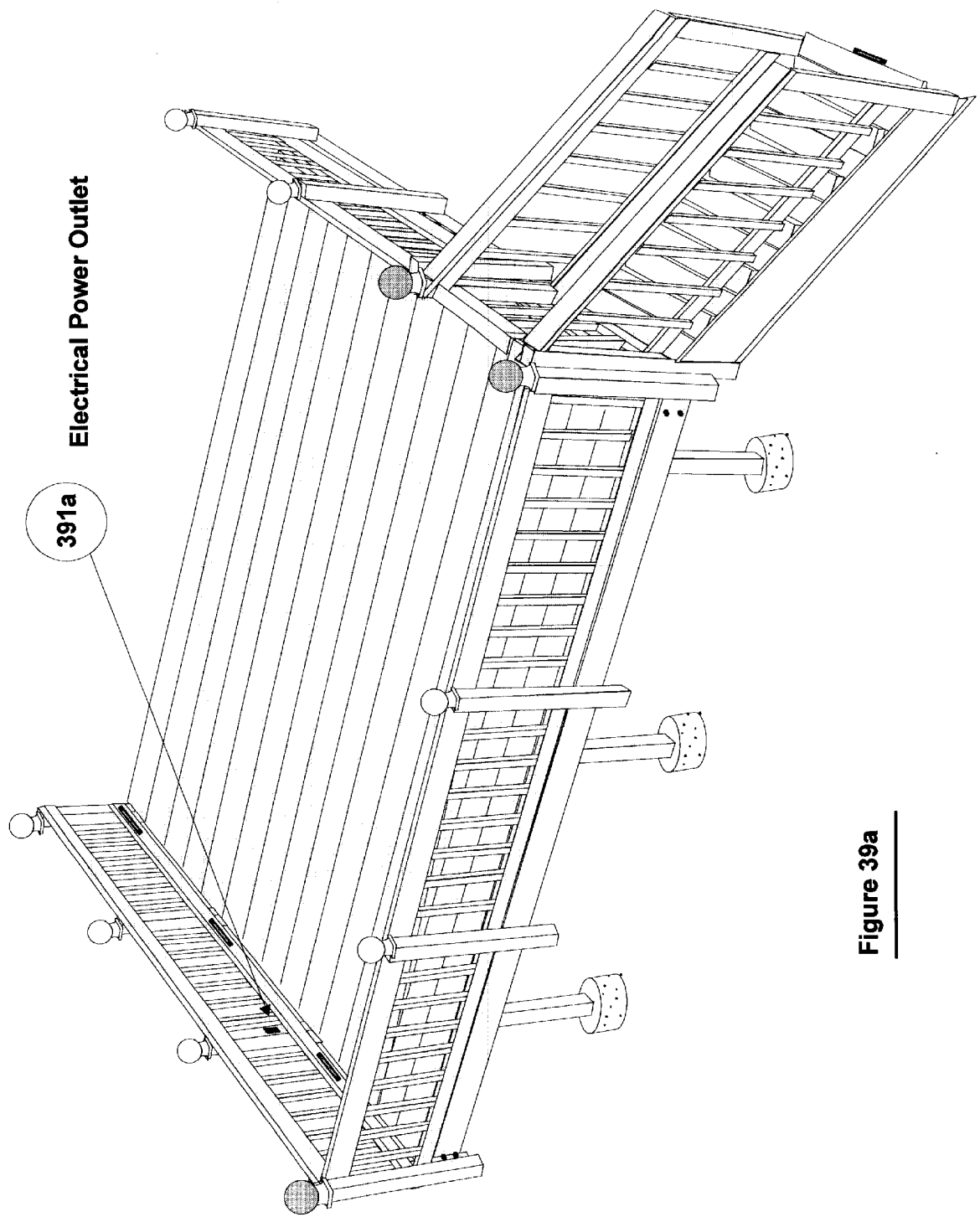

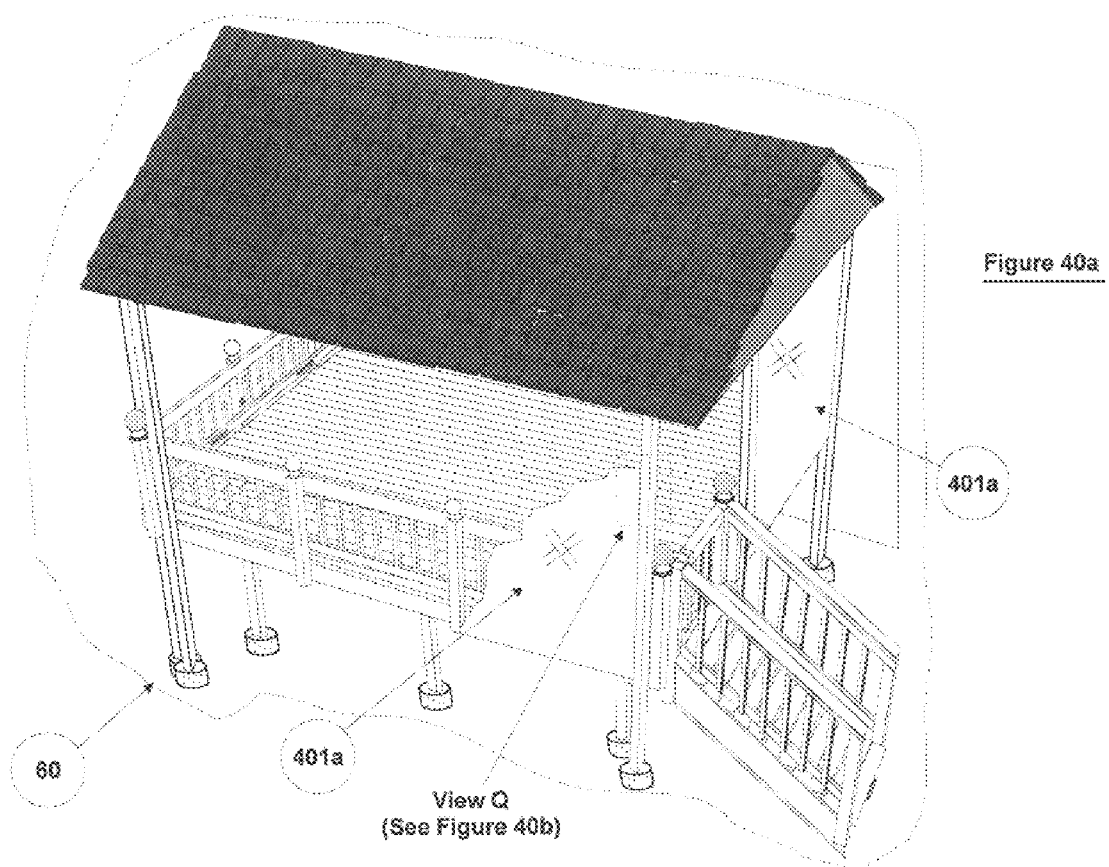

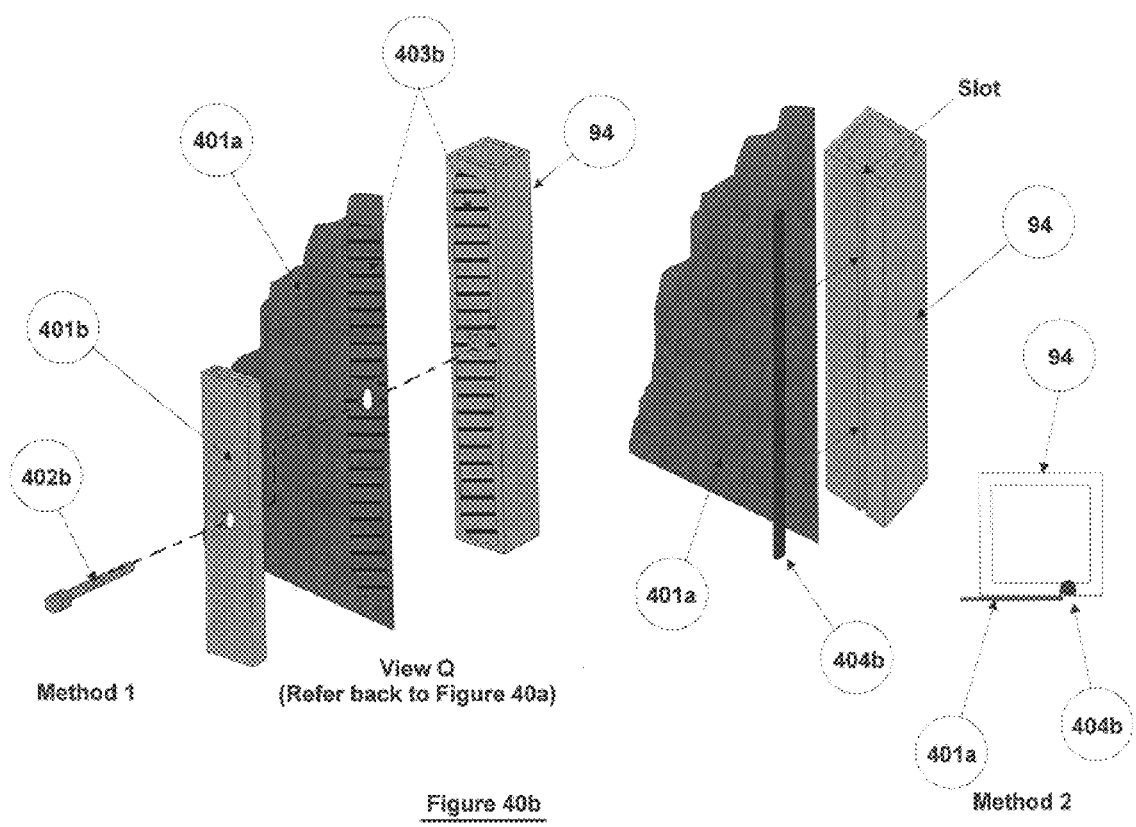

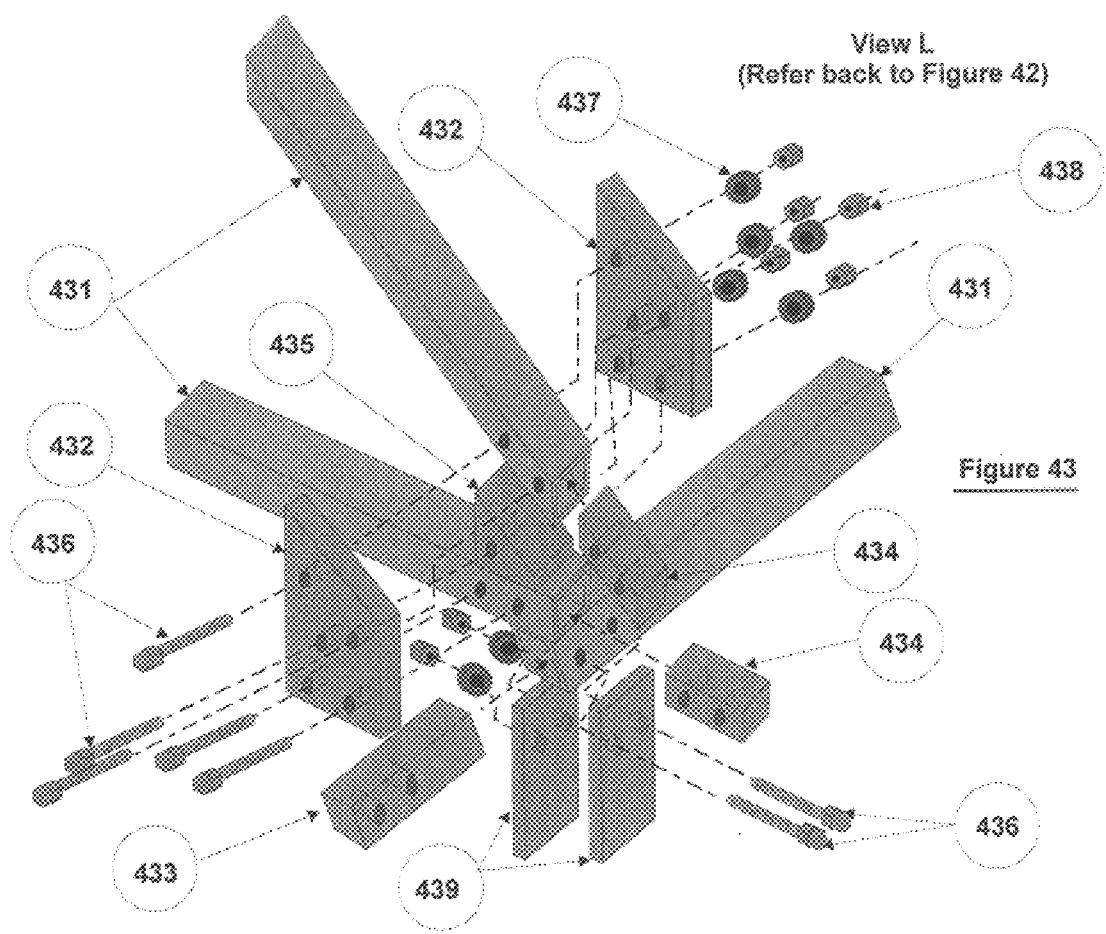

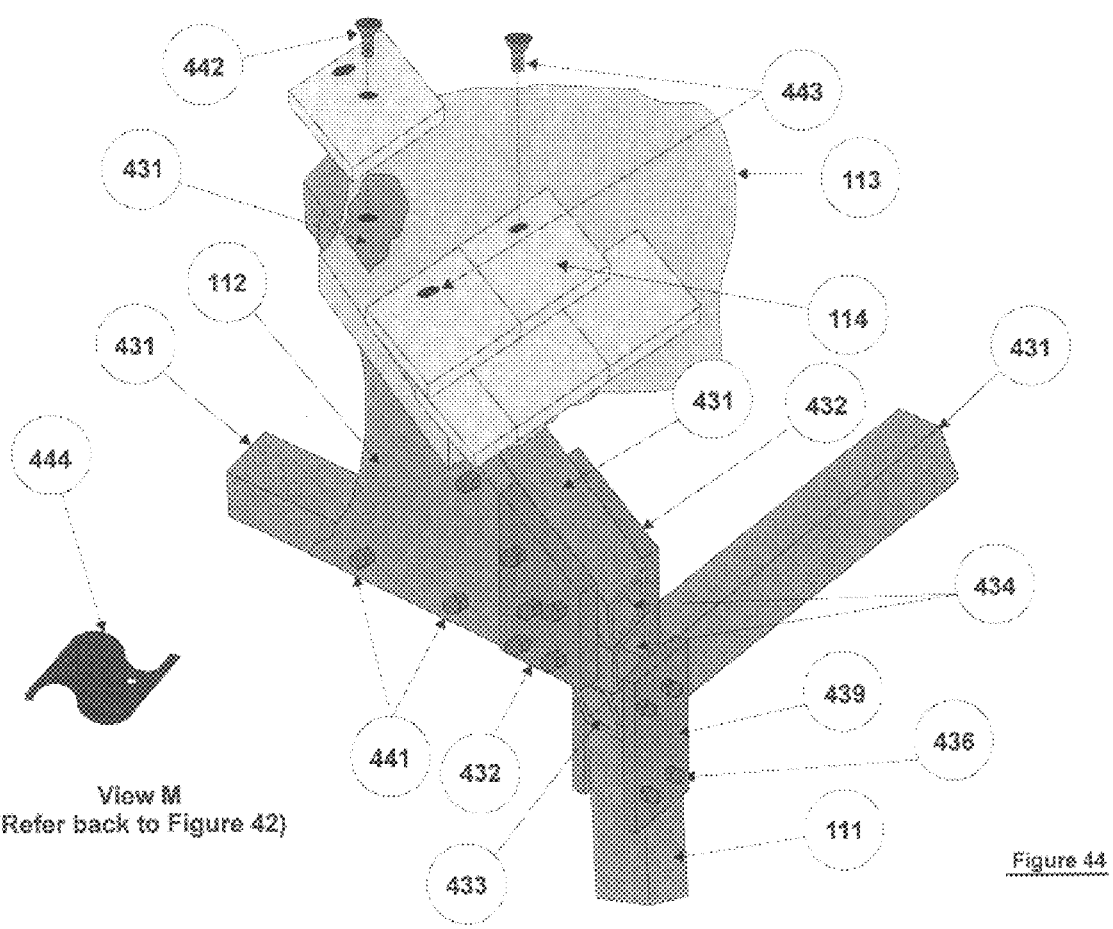

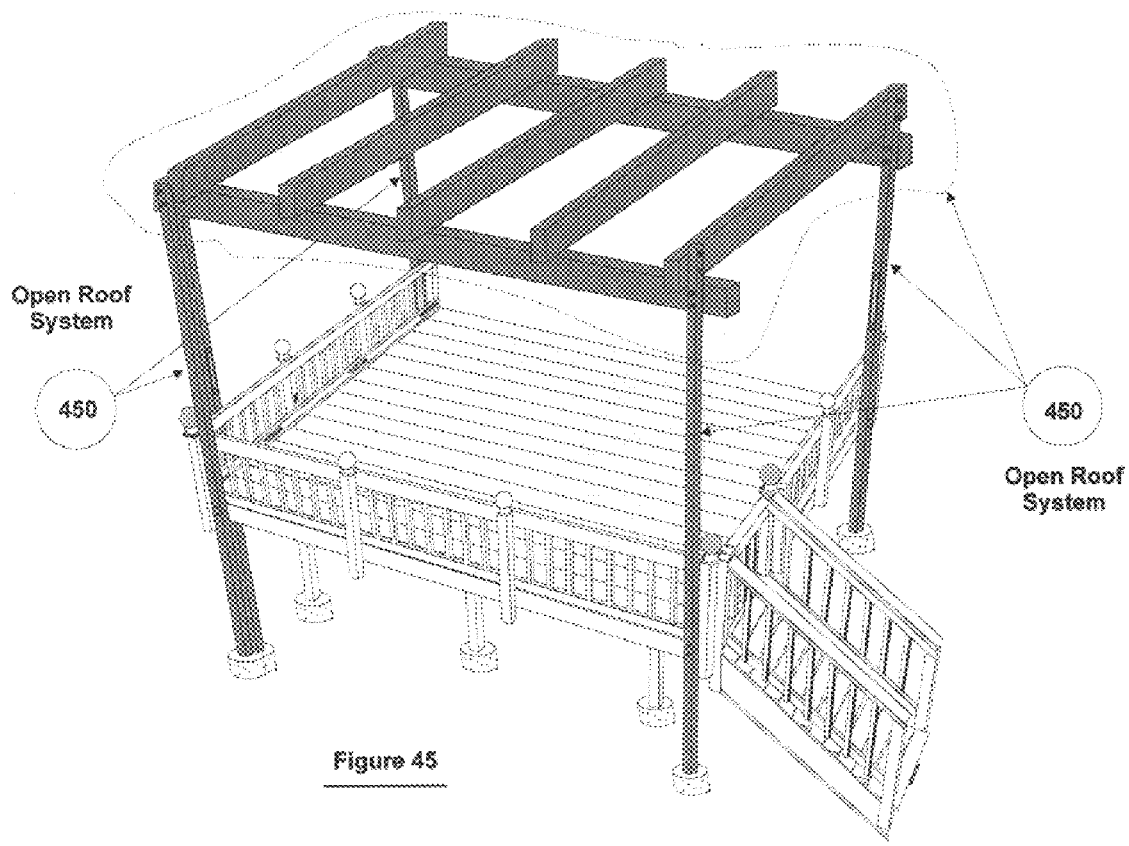

FIBER REINFORCED PLASTIC (FRP) COMPOSITE STRUCTURAL SYSTEM FOR DECKS, DOCKS, BOARDWALKS, WALKWAYS, SPA DECKS, HOT TUB DECKS AND GAZEBOS AND COMPONENTS THEREFORE AND METHOD OF MAKING SAME

BACKGROUND OF THE INVENTION

This invention to a decking system for use as a residential or commercial deck is manufactured from an extruded fiber reinforced plastic (FRP) material known as pultruded FRP and assembled using a combination of corrosion resistant hardware and/or adhesives. The invention is assembled from FRP pultruded components comprising several systems which included a weight bearing support system, flooring system, safety system, roofing system, and decorative system. The systems described herein can be used to assemble not only decks but also docks, boardwalks, walkways, gazebos, spa and hot tub decks. The FRP material is pultruded from a choice of resin systems with UV inhibitors such as isophtalic polyester flame-retardant, vinyl ester flame-retardant, or the like, such that the decking material is maintenance-free, strong, light in weight, resistant to rotting, corrosion and weathering. However, many other resin systems are available and, therefore, this invention shall not be limited to a specific resin system. The FRP material is pultruded from a choice of fiber reinforcement systems, the most common of which is fiberglass, however many other fiber types are available and, therefore, this invention shall not be limited to a specific type. In this disclosure, it will be understood that the FRP pultrusion decking system of this invention may have many uses such as a decks, docks, walkways, boardwalks, gazebos, hot tub decks, spa decks, etc. and can be extended. However, for the sake of simplicity, the primary applications discussed herein will be in the context of a deck, dock, and boardwalk, and shall not be limited by this disclosure.

1. Field of Invention

This invention pertains generally to the art of deck, dock, and boardwalk construction for residential and commercial applications such as those attached to the wall of a home, constructed on property, freestanding, or extending out from the edge of land property into a waterway or body of water.

2. Description of the Related Art

Most decks, docks, boardwalks, gazebos, and spa decks found in residential and commercial applications are manufactured or constructed from traditional building materials including pressure-treated (CCA: copper-chromated arsenic) wood using screws, nails, and bolts to provide structural attachment. These wooden decks are typically attached to an existing structure, freestanding, or extend out from property into water in the case of a dock. A smaller number of these products are manufactured from aluminum or steel. Conventional design methods have traditionally utilized treated wood for all of the structural potions of decks and docks. These structures are assembled using vertical posts (also know as piles in the case of a dock), beams, joists, deck planking. Typically, a horizontal frame is constructed using wood, pressure-treated lumber 2×8 or 2×10 joists, or the like and attached at one end to the wall of a structure usually with joist hangers. Horizontal, wooden deck planking is secured using nails or screws to the top of the joist frame, forming the decking surface upon which persons may walk. Supporting the decking frame are wood vertical support posts, typically 4×4 or 6×6 or the like made from pressure treated lumber. These posts are anchored either into the ground or on top of a concrete or block pad. Depending on local building codes and customer preferences, a wooden railing may be attached to the perimeter of the deck. Stairs, again commonly constructed from wood, extend from the edge of the deck and are attached to the perimeter of the deck, providing access to ground level. The construction of a dock is similar in that the structure, typically fabricated from pressure-treated lumber, is supported by wood vertical posts or pilings. Wood deck planking boards are attached to the joists, forming the walking surface of the dock.

Wood structures have several disadvantages including but not limited to deterioration resulting from exposure to the weather and water. Wood structures deteriorate with exposure to the elements, even those constructed with treated lumber, and are susceptible to rotting, nail popping, splitting and warping. In addition they require costly and time-consuming maintenance such as replacing rotted or warped planks, painting (which can be difficult with CCA treated wood), staining, power washing, scraping, or the reapplication of chemical treatments (water sealants). The leeching of the copper-chromated arsenic treatment into the ground or water is also of some concern amongst environmental advocates.

There are also disadvantages in constructing decks and docks from PVC (vinyl), aluminum or steel. Metal docks are vulnerable to corrosion, high maintenance and are usually much warmer when contacting with skin; while vinyl decking products require structural supports typically wood or metal bracing and framing. Docks made from vinyl products such as those manufactured by Brock Docks U.S. Pat. No. 5,613,339 to Pollock are not fabricated entirely from polyvinyl chloride material. These dock systems still require either wood or metal members to provide structural support. U.S. Pat. No. 5,048,448 to Misener discloses a boat dock with plastic resin horizontal planking which are slideably engaged into tube-shaped metal supporting members.

Decks and docks manufactured from fiber reinforced plastic (FRP) using pultruded structural shapes offer several advantages. Metal or wood decking and docks are vulnerable to rotting or corrosion and high maintenance and vinyl decking products lack structural integrity and require wood or metal reinforcement support and bracing. Other plastic lumber exhibits dimensional temperature instability. FRP docks and decks made entirely of high strength composite material are maintenance free, do not require painting or staining and will never rust. FRP composite decks and docks are non-corrosive and non-decaying, insect resistant, strong (no need for extra structural reinforcement components), light-weight, and colors can be molded into the product with ultra violet (UV) inhibitors. Further, they are dimensionally stable with regard to temperature fluctuations, allow for concealed installation of auxiliary lighting and power, and do not contain chromated copper arsenic (CCA) as do structures made with pressure treated lumber. Sections or entire structures can be pre-manufactured for easy transportation, assembly and rapid installation. FRP composite decks and docks stay cool to the touch, are warp resistant, will not produce popped nails or wood splinters, and are available with a skid-resistant surface.

Efforts by others to address the challenges raised by using plastic as a building material include U.S. Pat. No. 5,623,803 to Willis, which discloses a decking, made of plastic along with a securement system and method of installation. The deck structure utilizes recycled plastic lumber planks which have T-shaped slots and slide onto a rigid frame. The rigid frame incorporates protruding connectors, which fit into the slots on the bottom side of the decking planks. Willis incorporates the T-slotted feature to account for the thermal dimensionally instability of his plastic. However, Willis does not address the problems of high maintenance, rotting, corrosion and the structural frame, supports and posts which are still made from wood lumber or metal.

U.S. Pat. No. 5,706,620 to De Zen discloses a thermoplastic structural system and components for a structural building system. The material utilizes PVC as the thermoplastic and chopped glass fiber as the reinforcement. However, De Zen does not address the inherent strength limitations of chopped, random reinforcement fibers in contradistinction to the present invention, which utilizes continuous fiber reinforcement. De Zen also does not address the tendency of PVC to sag and the low strength material properties of the matrix material (PVC thermoplastic). De Zen does not address the issue of providing weight-bearing support as the present invention does in the use of my FRP vertical support posts. The thermoplastic structural system and components of De Zen requires an extra co-extruded outer skin to cover the protruding glass fibers whereas the FRP pultruded material in the present invention is inherently sealed within the resin matrix. De Zen also does not address the issue of utilizing this material in other structures such as a deck or dock.

U.S. Pat. No. 5,617,697 to Erwin discloses a composite deck post for use with a wood joist of a wood deck and for attachment thereto with at least one fastener. The composite deck post incorporates an extruded plastic tube, rectangular in cross-section, with a tubular metal component inserted inside and secured to the plastic post to provide structural stiffness. However, Erwin does not address the problem of corrosion and replacement of the metal stiffening member.

U.S. Pat. No. 5,412,915 to Johnson discloses a dock plank assembly, which uses an injection molding for forming the shape. However, Johnson utilizes a separate metal reinforcing rib, which must be attached individually to each dock plank to provide stiffening support. Wilson also does not address the problem of the rotting, splintering, and warping of what are denominated dock stringers, which the present invention denominates joists.

U.S. Pat. No. 4,691,484 to Wilson discloses a portable deck system, which uses individual deck sections attached together for the purpose of expansion. However, Wilson does not address the problem raised by rotting, splintering, and warping of the decking or supporting structure.

U.S. Pat. No. 4,691,484 to Anastasio disclosed a segmented deck fabricated out of plastic material with hollow railings. However, Anastasio does not address the use of reinforcement in the plastic material, which is required to provide structural support necessary for the decking system.

None of the prior art addresses the problem of rotting, corrosion, warping, nail popping, high maintenance or the elimination of wood or metal used to provide structural support (i.e. joists, posts or columns, etc.).

The present invention proposes a new type of construction for decks and docks and can be configured as, but not limited to a boardwalk, walkway, gazebo, hot tub or spa deck. The invention is simple in design, construction, effective in use, maintenance-free, strong, insect resistant, corrosion resistant, and light weight (high strength/weight ratio due to fiber reinforcements). It overcomes the shortcomings of the prior art providing better and more advantageous results.

SUMMARY OF THE INVENTION

In accordance with the present invention, an improved deck design for use as a deck, dock, boardwalk, walkway, gazebo, hot tub deck or spa deck, method of assembly, and support system is provided. The purpose behind the present invention is multi-fold. Its purposes are to furnish a structural system which can be manufactured in sections or as an entire assembly, providing a strong, corrosion-free, maintenance-free, non-rotting, non-warping, insect resistant, and non-splintering product as compared with its wood or metal counterparts.

More particularly, in accordance with the invention, the construction of the structure comprises of a weight bearing support system, flooring system, safety system, decorative system, and an optional roof system. All these systems are fastened and assembled together to form a solid structure. The invention can be configured as a freestanding structure or attached to an existing structure. The flooring system is securely attached to the (first) weight bearing support system. The safety system is securely attached to said flooring system. The decorative system is securely attached to said safety system. The optional roofing system is comprised of a second weight bearing support system and a roof frame or truss system. The second weight bearing system is either securely attached to said flooring system or combined with the first weight bearing system. The entire structure will be assembled with corrosion resistant fasteners, adhesives, or a combination.

According to another aspect of the invention, the first weight bearing system further comprises of a plurality of vertical support posts secured into the ground, on top of the ground, into concrete footings, resting on corrosion resistant pads, or through water into the ground where said structure is a dock. A plurality of FRP pultruded beams, are, securely attached transversely to said FRP pultruded vertical support posts. In cases where not required, the vertical support posts can be eliminated.

According to another aspect of the invention, the flooring system further comprises of a plurality of FRP pultruded joists securely attached to said FRP pultruded beams. A plurality of flooring panels fabricated from FRP pultrusion material, fiberglass, honeycomb or foam core sandwich panels, or FRP pultruded flooring planks are securely attached to said FRP pultruded joists. An optional, skid-resistant coating is applied to the surface of flooring panels.

According to another aspect of the invention, the safety system further comprises a railing system. The railing system, which comprises of a plurality of FRP pultruded vertical rail posts having a plurality of reinforcement blocks therein, a plurality of FRP pultruded balusters and baluster rails, plastic or PVC latticework, plastic panels, or decorative FRP pultruded latticework are securely attached to the perimeter of said flooring system. The safety system also further comprises optional FRP pultruded stairs. These stairs are comprised of FRP pultruded stair treads and FRP pultruded stair risers securely attached to said flooring system at the perimeter of said flooring system. An optional ramp, comprising a plurality of FRP pultruded side stringers securely attached to said flooring system, a plurality of FRP pultruded ramp surface board support rails securely attached to said FRP pultruded side stringers, and a plurality of ramp surface members securely attached to said FRP pultruded ramp surface board support rails. A plurality of ramp surface boards are fabricated from FRP pultrusions, fiberglass, or sandwich panels with a honeycomb or foam core. These ramp surface boards are securely attached to said FRP pultruded support rails. An optional, skid-resistant coating is applied to the surface of ramp surface members. An optional gate or door fabricated with FRP pultrusion shapes is securely attached to said railing system or said FRP pultruded vertical rail posts. The decorative system further comprises a plurality of decorative pultruded, PVC, or plastic end caps fitted into said FRP pultruded vertical rail posts and said flooring planks. The decorative system further comprises decorative FRP pultruded trim panels attached to the perimeter of said flooring system. The decorative system further comprises a plurality of optional auxiliary lighting units securely mounted on said FRP pultruded vertical rail posts, the required wiring for said optional auxiliary lighting being installed through hollow sections of said FRP pultruded components. The decorative system further comprises a plurality of optional low-level auxiliary lighting units securely mounted on said flooring system, safety system, or on said stair treads, the required wiring for said optional auxiliary lighting being installed through hollow sections of said FRP pultruded components. The decorative system further comprises a plurality of optional FRP pultruded dock accessories including but not limited to dock ladders, rub rails, bumpers and cleats attached to said structure where said structure may be a dock.

According to another aspect of the invention, the roof frame or truss system further comprises of a plurality of FRP horizontal framing members securely attached to said FRP vertical support posts. These FRP vertical support posts comprise said second weight bearing system. The second weight bearing system comprise a plurality of vertical support posts secured into the ground, on top of the ground, into concrete footings, resting on corrosion resistant pads, or through water into the ground where said structure is a dock. The vertical support posts can also be secured to the flooring or (first) weight bearing system. The roof frame or truss system further comprises a plurality of FRP pultruded roof trusses or a plurality of FRP pultruded rafters securely attached to said horizontal framing members. The roof frame or truss system further comprises a plurality of FRP pultruded, honeycomb or foam core sandwich, fiberglass, or plastic sheathing panels securely attached to said FRP pultruded roof trusses or FRP pultruded rafters. The roof frame or truss system further comprises a plurality of FRP pultruded, fiberglass, or plastic shingles or barrel tiles securely attached to said sheathing panels. The roof frame or truss system further comprises a plurality of FRP pultruded, plastic, PVC, or fiberglass trim panels securely attached to said FRP pultruded horizontal framing members.

According to another aspect of the invention, said structure further comprises mesh screening securely attached to said flooring system and said FRP pultruded trim panels at the perimeter of said flooring system and between said horizontal framing members of said roofing system and said FRP pultruded trim panels at the perimeter of said roofing system.

According to another aspect of the invention, the deck, dock or boardwalk structure is securely attached to a pre-existing structure or freestanding.

According to another aspect of the invention, the deck, dock, boardwalk etc. structure is pre-manufactured (or pre-manufactured in sections) allowing it to be easily transported and speed final assembly and installation.

According to another aspect of the invention, the structural members, frame posts and decking surface are manufactured from corrosion resistant, rot resistant and warp resistant materials such as fiber reinforced plastic (FRP) pultrusion and non-corrosive honeycomb or foam core sandwich flooring; there is no need for wood or metal.

According to another aspect of the invention, the spacing of the supporting members in the frame are varied to allow for design flexibility, meet customer requirements, and all building codes requirements including but not limited to maximum deflection requirements.

According to another aspect of the invention, the entire decking, frame and supports are all manufactured from man-made material.

According to another aspect of the invention, an optional skid-resistant surface is applied to the surface of the flooring panels.

According to another aspect of the invention, the decking frame can be covered using optional non-corrosive honeycomb or foam core sandwich flooring panels with a skid-resistant surface.

According to another aspect of the invention, the spacing of the flooring panels can be varied to allow for drainage.

According to another aspect of the invention, the use of FRP pultrusion materials eliminates the thermal dimensional stability problem found in other plastic materials used in previous decking inventions (Ref. U.S. Pat. No. 5,623,803).

According to another aspect of the invention, corrosion resistant material reinforcements are used inside thin walled sections where through-bolting is necessary.

According to another aspect of the invention, stairs can be attached to the frame of the deck, dock and boardwalk and extend to the ground level. These stairs are fabricated using the same composite materials and techniques as in the decking system.

According to another aspect of the invention, access ramps fabricated using the same materials can be attached to the decking frame to provide access to disabled individuals.

According to another aspect of the invention, FRP pultrusion shapes are used for railings. These railings are attached to the decking frame using corrosion resistant hardware.

Other advantages of the present invention are that the FRP material will not rot, crack, split or warp as does wood lumber (even pressure-treated) which is commonly used in decks, docks, and other similar structures.

Another advantage of the present invention is the speedy assembly during final installation. Because sections or the entire structure of these systems are designed to be pre-manufactured, measuring and cutting at the customer site can be significantly reduced or virtually eliminated. Each of these systems are assembled together to form the finished structure of the deck, dock and boardwalk etc. assembly.

Another advantage of the present invention is that of convenience. FRP decking and docks are maintenance free as compared to their wood or metal counterparts. They do not require the time consuming maintenance such as refinishing, painting, staining, scraping, power-washing, water sealant treatment and replacing rotted or warped boards, to maintain its appearance and utility. These types of maintenance issues are common with wood or metal decks and docks. Colors and Ultra-Violet Radiation (UV) inhibitors are added to resin and molded into the FRP during the manufacturing of the pultrusion shapes. The color of the entire invention or its individual components can be a single color scheme or varied according to the requirements of the customer or designer.

Another advantage of the present invention is that the vertical support posts are manufactured from FRP material, which are designed to function without the need for wood or metal internal stiffeners. U.S. Pat. No. 4,833,842 to Antonio discloses composite posts which require internal stiffeners to meet load requirements.

Another advantage of the present invention is the pultrusion material used has a flame-retardant rating, which none of the other known prior art discloses.

Another advantage of the present invention is that the hollow sections in the pultrusion shapes in the decking and dock etc. system are used to conceal and neatly install electrical power, sockets, cables, and lighting (including low-voltage) which none of the known prior art wood construction systems disclose.

Another advantage of the present invention is that the FRP pultrusion material used in the decking and dock system will not crack, split, rot, or decay when exposed to water or salt water or sea water.

BRIEF DESCRIPTION OF THE DRAWINGS

The invention may take physical form in certain parts and arrangement of parts. A preferred embodiment of the parts will be discussed in detail in the specifications and illustrated in the accompanying drawings, which form a part of this disclosure and wherein:

FIG. 31a is a illustration of an optional gate.

FIG. 33a illustrates views of an optional ramp.

FIG. 39a is a perspective view of the invention highlighting an electrical power outlet.

FIG. 40a is a perspective view of the invention illustrating the optional screen attached to the structure.

FIG. 40b illustrates views of two methods for attaching the screen to the invention.

FIG. 43 illustrates an enlarged view of the typical assembly of the roof frame or truss system components.

FIG. 44 illustrates an enlarged view of the typical attachment of the roof sheathing, trim panels, and shingles to the roof frame or truss system components.

FIG. 45 is an illustration of the invention configured as a deck with an open roof system.

DESCRIPTION OF THE PREFERRED EMBODIMENT

Figure 1:
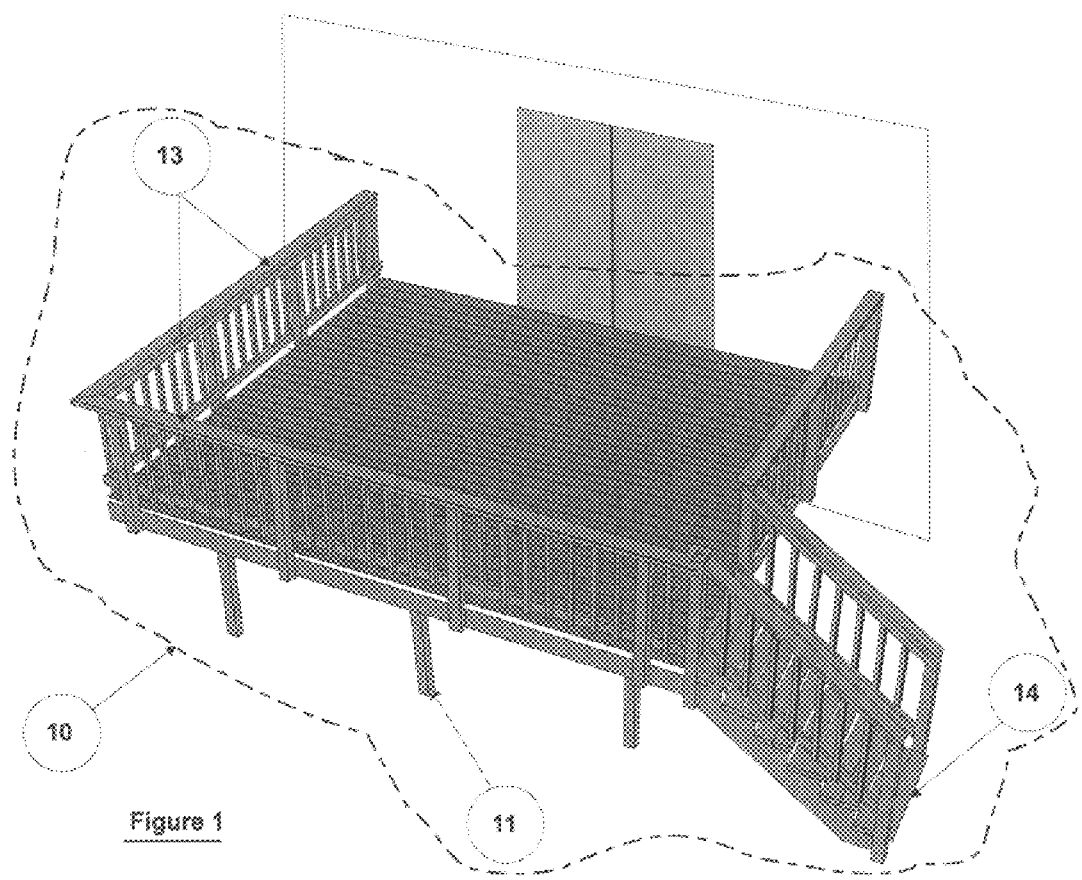
FIG. 1 is a perspective view of a typical prior art wood deck.
Figure 2:
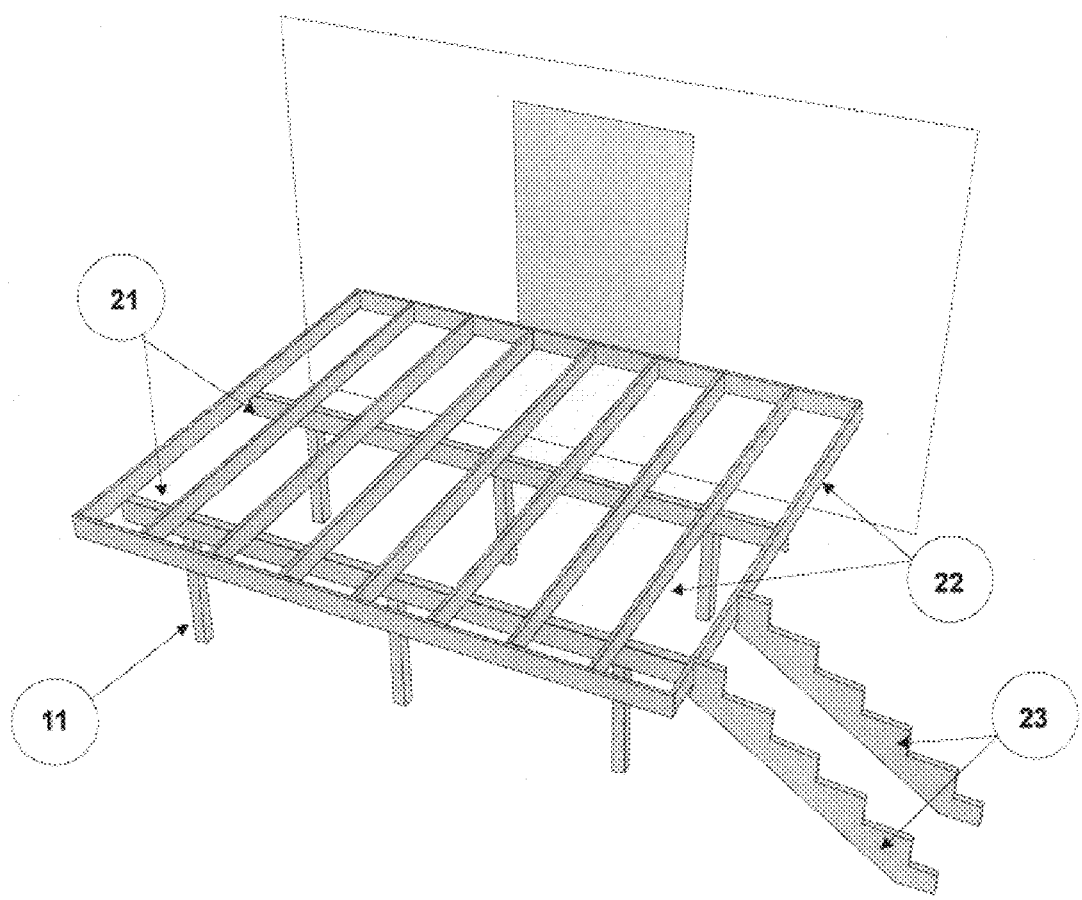
FIG. 2 is a perspective view of a typical prior art wood deck shown with the horizontal decking surface planks removed to reveal the decking frame comprising of joists, vertical support posts and stair risers.
Figures 3, 4:
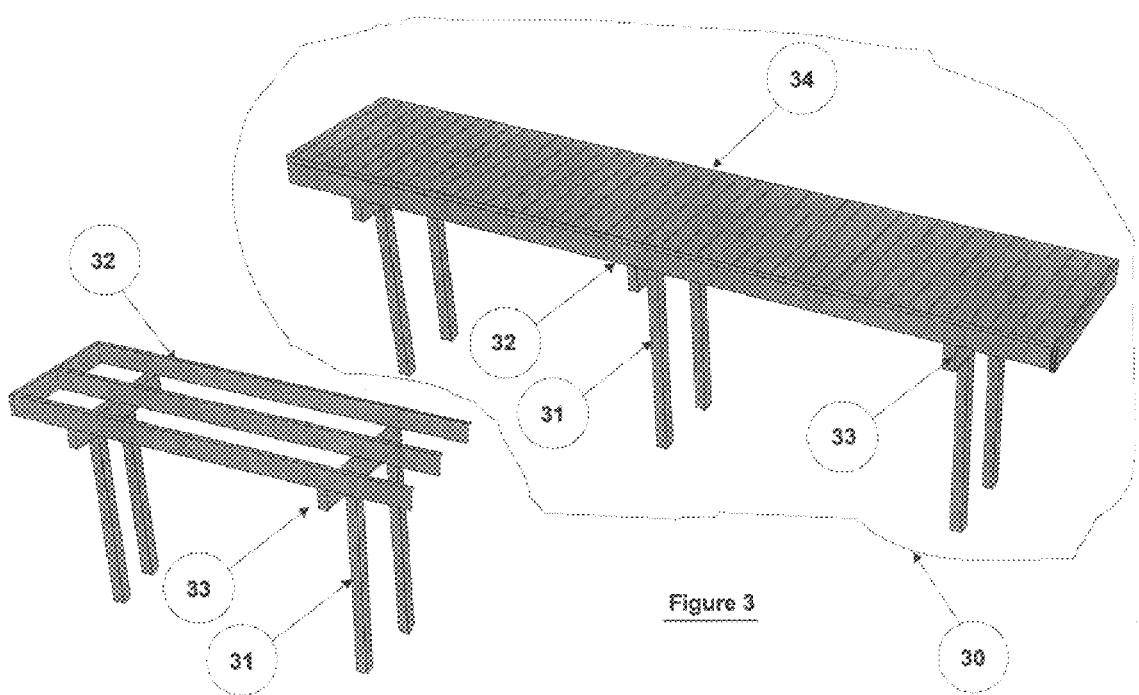
FIG. 3 is a perspective view of a typical prior art wood dock.
FIG. 4 is a perspective view of a typical prior art wood dock shown with the horizontal decking surface planks removed to reveal the decking frame comprising of joists and vertical supports posts (or pilings).

The following drawings included here are provided for the purposes of illustrating a preferred embodiment of the invention only. The drawings and configurations (i.e., deck, dock, boardwalk, gazebo, etc.) are not provided for the purposes of limiting the invention. A prior art wooden deck 10 shown in FIG. 1 is illustrated as one that might be attached to an existing structure. The deck 10 illustrated in FIG. 1 is comprised of vertical support posts 11, flooring surface 12, railings 13, and a set of stairs 14. The illustration in FIG. 2 shows the vertical support posts 11, beams 21, and joists 22 which support the flooring surface of the structure and stair risers 23, which support the stair treads (are not shown). A prior art wooden dock 30 illustrated in FIG. 3 is one that might be free-standing. The dock 30 illustrated in FIG. 3, is comprised of vertical support posts (also referred to as of pilings) 31, joists 32, beams 33 and deck planking 34. The deck planking 34 was removed as illustrated in FIG. 4, to expose the underlying structure of the dock.

The invention is similar to a prior art wood deck, however, it uses structural components and assemblies fabricated from fiber reinforced plastic pultrusion material instead of wooden members. The invention can be configured as a freestanding structure or attached to an existing structure. The invention can be configured as, but not limited to a deck, dock, boardwalk, walkway, gazebo, pavilion, hot tub deck, spa deck, children's play structure or enclosure, pool enclosure, property (yard) enclosure, etc. Additional optional materials including but not limited to honeycomb or foam core sandwich panels, PVC, plastic, or fiberglass can be used in any combination with the FRP material. The invention and its' components are illustrated in the following figures, however its' configuration, shape, style, cross-section, placement, arrangement, and spacing shall not be limited by this disclosure and can be varied according but not limited to design requirements, building codes, customer requirements, artistic expression, and aesthetics.

Simplified views of each of the systems of the invention are illustrated in the following figures. However, detailed views and descriptions of each of the systems will be subsequently illustrated and described herein.

Figure 5:
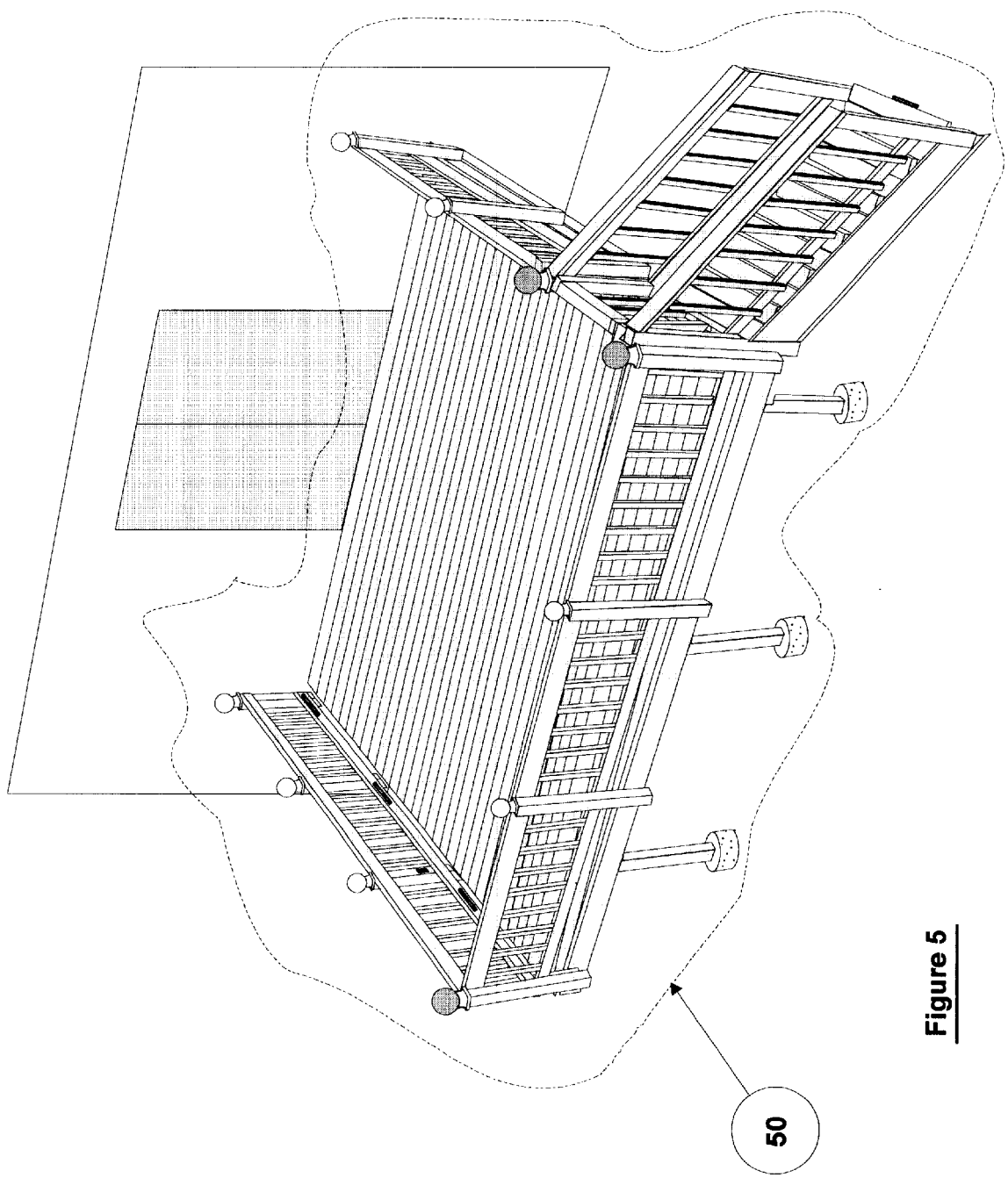
FIG. 5 is a perspective view of the invention (without the roofing system).
Figure 6:
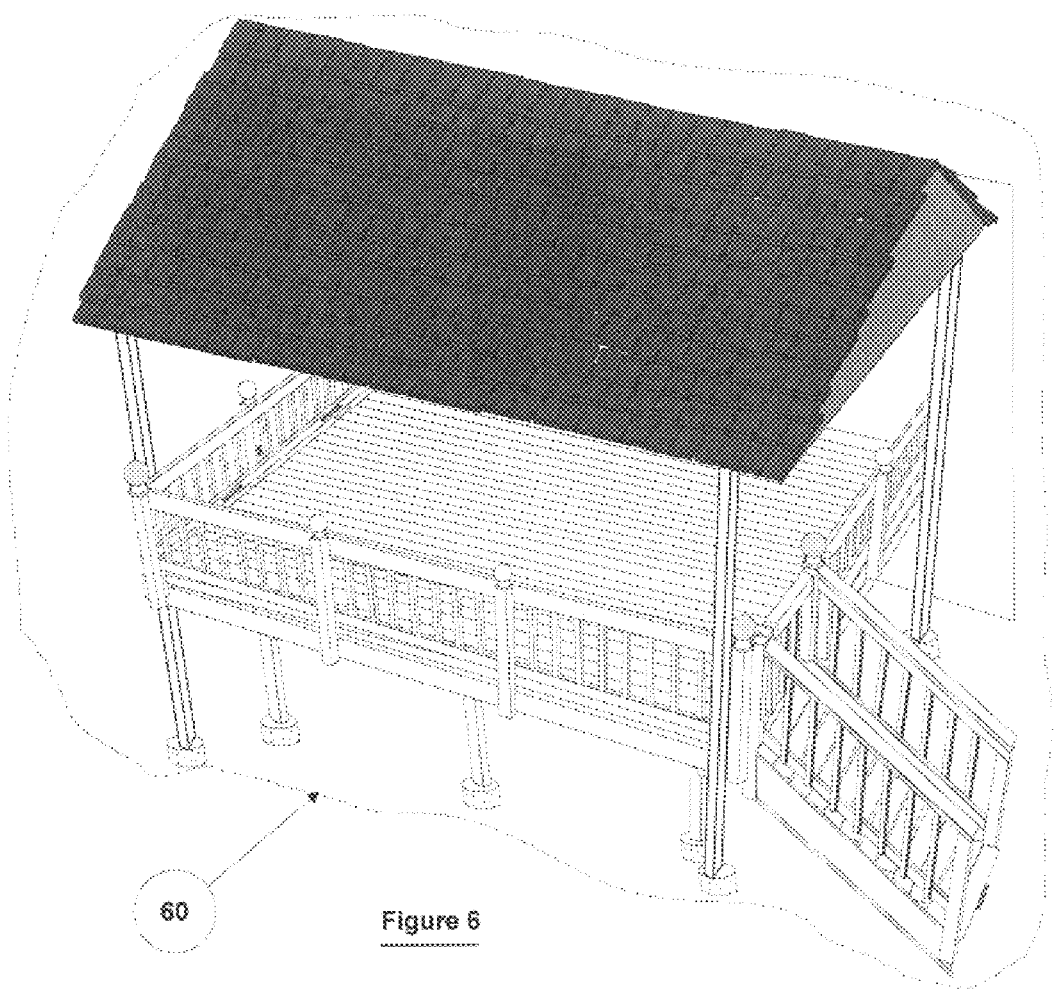
FIG. 6 is a perspective view of the invention (with the roofing system).

A perspective view of the invention (without the roofing system) illustrated as a deck 50 attached to an existing structure is shown in FIG. 5. The invention comprises of a weight bearing support system, flooring system, safety system, decorative system, and an optional roof system. All these systems are fastened and assembled together to form a solid structure as illustrated in FIG. 5 (roof system not show for clarity). A perspective view of the roofing system attached to the invention 60, is illustrated in FIG. 6.

Figure 7:
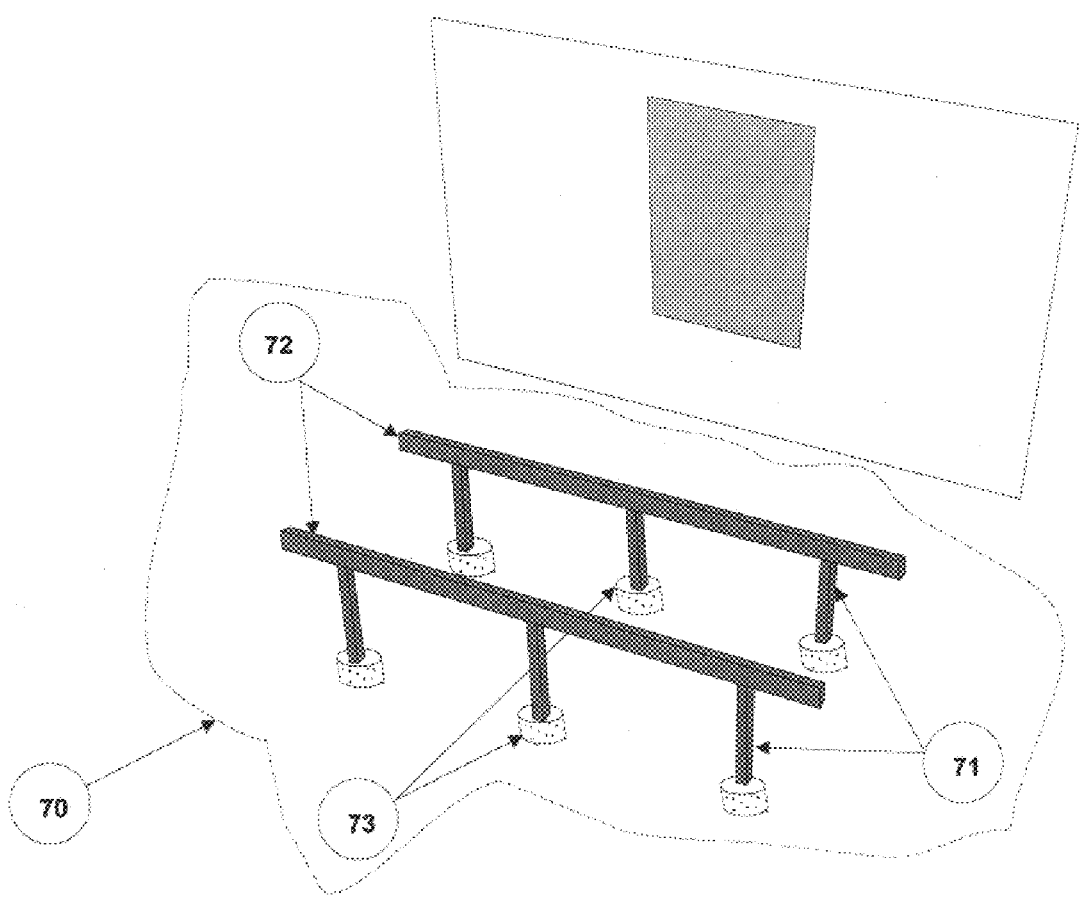
FIG. 7 is a perspective view of said (first) weight bearing support system.

A simplified perspective view of the weight bearing support system 70 is illustrated in FIG. 7. The weight bearing support system is comprised of vertical support posts 71 horizontally attached to the support beams 72. The vertical support posts 71 provide vertical support for the weight bearing system 70 and can rest on the ground, corrosion resistant pads, concrete, be secured into the ground, or into concrete footings 73 as illustrated in FIG. 7. When the invention is configured as a dock, the vertical support posts 71 are secured into the ground through water into the earth, into concrete footings, or onto corrosion resistant pads.

Figure 8:
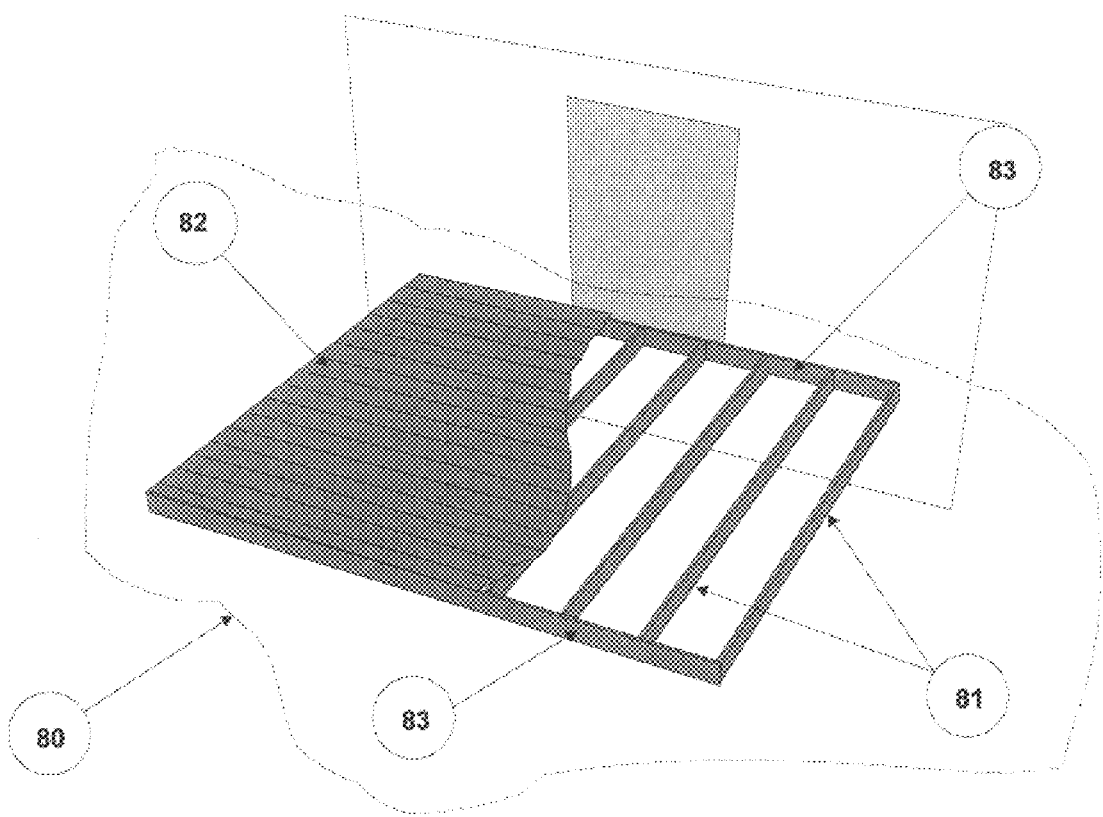
FIG. 8 is a perspective view of said flooring system.

A simplified perspective view of the flooring system 80 is illustrated in FIG. 8. The flooring system, illustrated in FIG. 8, is comprised of flooring planks (or panels) 82 attached transversely to the joists 81 and end joists 83 which are attached to the joists 81. An optional, skid-resistant coating is utilized on the surface of flooring planks 82.

Figure 9:
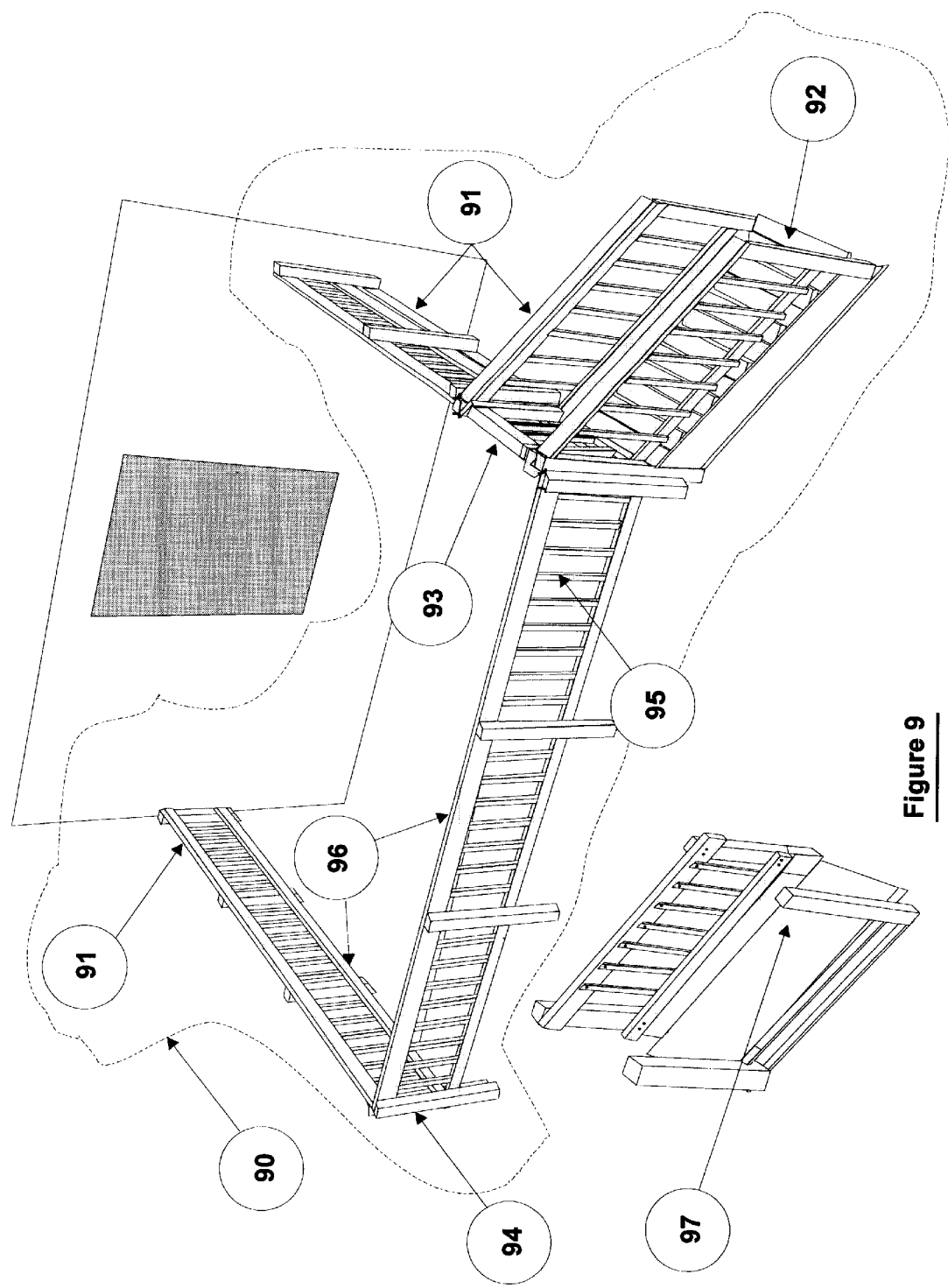
FIG. 9 is a perspective view of said safety system.

A simplified perspective view of the safety system 90 is illustrated in FIG. 9. The safety system 90 as illustrated in FIG. 9, is comprised of a railing system 91 consisting of a plurality of vertical support posts 94, balusters 95, and railings 96 (various decorative latticework or panels can also be incorporated into the railing system as an option). The railing assembly 91 illustrated in FIG. 9, is securely attached to the perimeter of the flooring system 80 (illustrated in FIG. 5). The safety system 90 is also comprised of stairs 92 (which are optional unless required by applicable building codes). The stairs 92 are comprised of stair treads, stair risers and a railing system. The stairs 92 are securely attached to the flooring system at the perimeter of said flooring system 80 (illustrated in FIG. 5). An optional, skid-resistant coating can be applied on the surface of the stair treads. An optional ramp 97 as illustrated in FIG. 9, can also be securely attached to the flooring system 80 (illustrated in FIG. 5) in place of or in addition to the stairs 92. An optional, skid-resistant coating can be utilized on the surface of the ramp 97. Illustrated in FIG. 9 is an optional gate 93, which can also be configured as a door. The gate 93 is securely attached to said railing system and can be installed as an option (unless required by applicable building codes).

Figure 10:
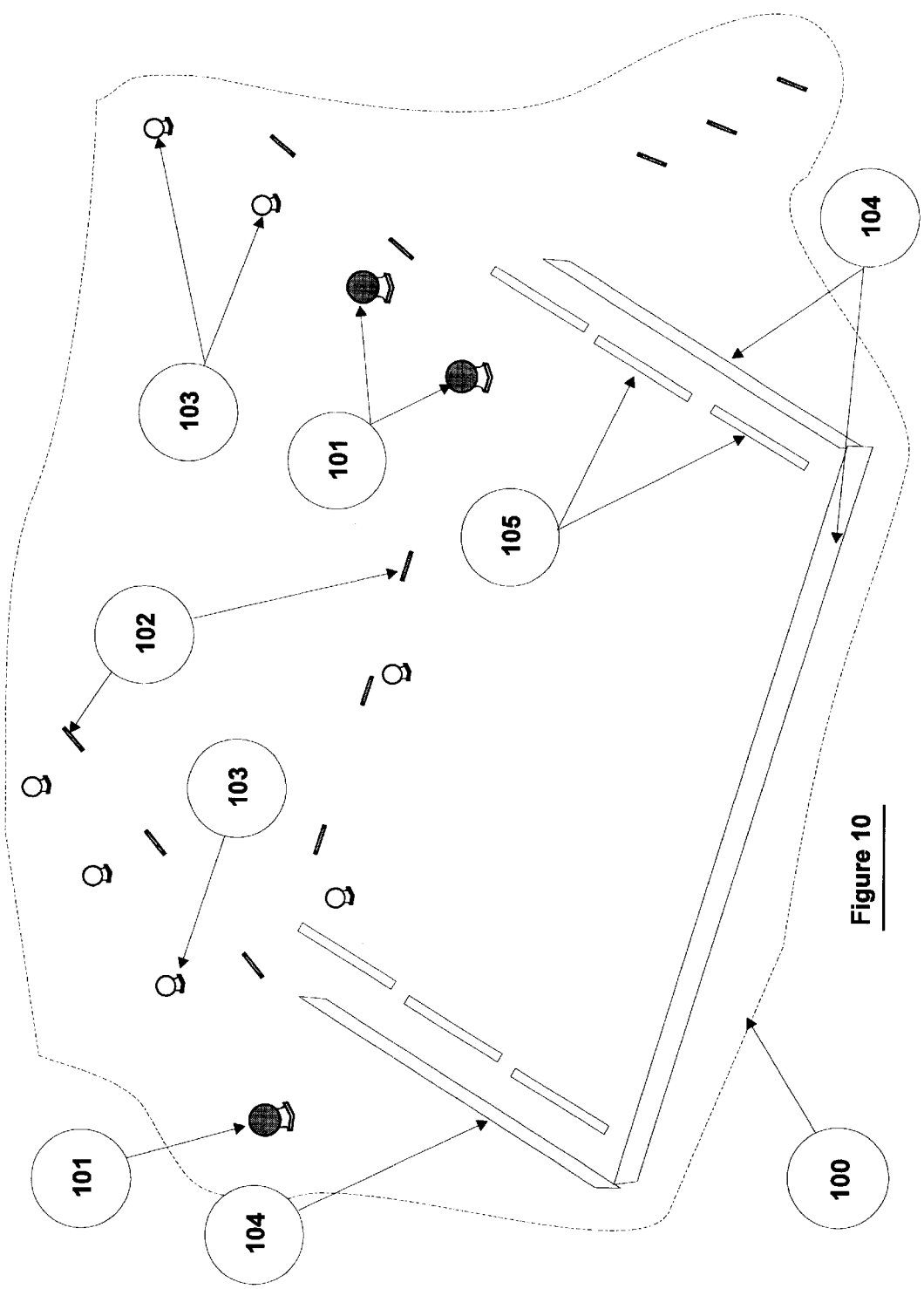
FIG. 10 is a perspective view of said decorative system.

A simplified perspective view of the decorative system 100 is illustrated in FIG. 10. The decorative system 100 is comprised of a plurality of various optional decorative components including but not limited to auxiliary lighting units 101, low-level auxiliary lighting 102, (vertical post) end caps 103, a plurality of trim panels 104, and a plurality of (flooring plank) end caps 105. However, the shapes, colors, sizes, and method of attachment for optional decorative system components can be varied and shall not be limited by this disclosure. A plurality of optional auxiliary lighting units 101 are securely mounted on said FRP pultruded vertical (railing) posts, the required wiring for said optional auxiliary lighting being installed through hollow sections of said FRP pultruded components of the invention. Illustrated in FIG. 10 are a plurality of optional low-level auxiliary lighting units 102, which are securely mounted on said weight bearing system, flooring system, safety system, or on said stair treads. The required wiring for said optional low-level auxiliary lighting is installed through hollow sections of said FRP pultruded components of the invention. Decorative vertical post end caps 103 are securely attached onto the vertical (railing) posts 94 (shown in FIG. 9). Illustrated in FIG. 10 are a plurality of decorative trim panels 104 which are attached to the perimeter of said flooring system 80 (illustrated in FIG. 5), and a plurality of decorative end caps 105 are fitted into said flooring planks. A plurality of optional decorative system accessories such as dock ladders, rub rails, bumpers, and cleats may also be attached to said structure where said structure may be a dock.

Figure 11:
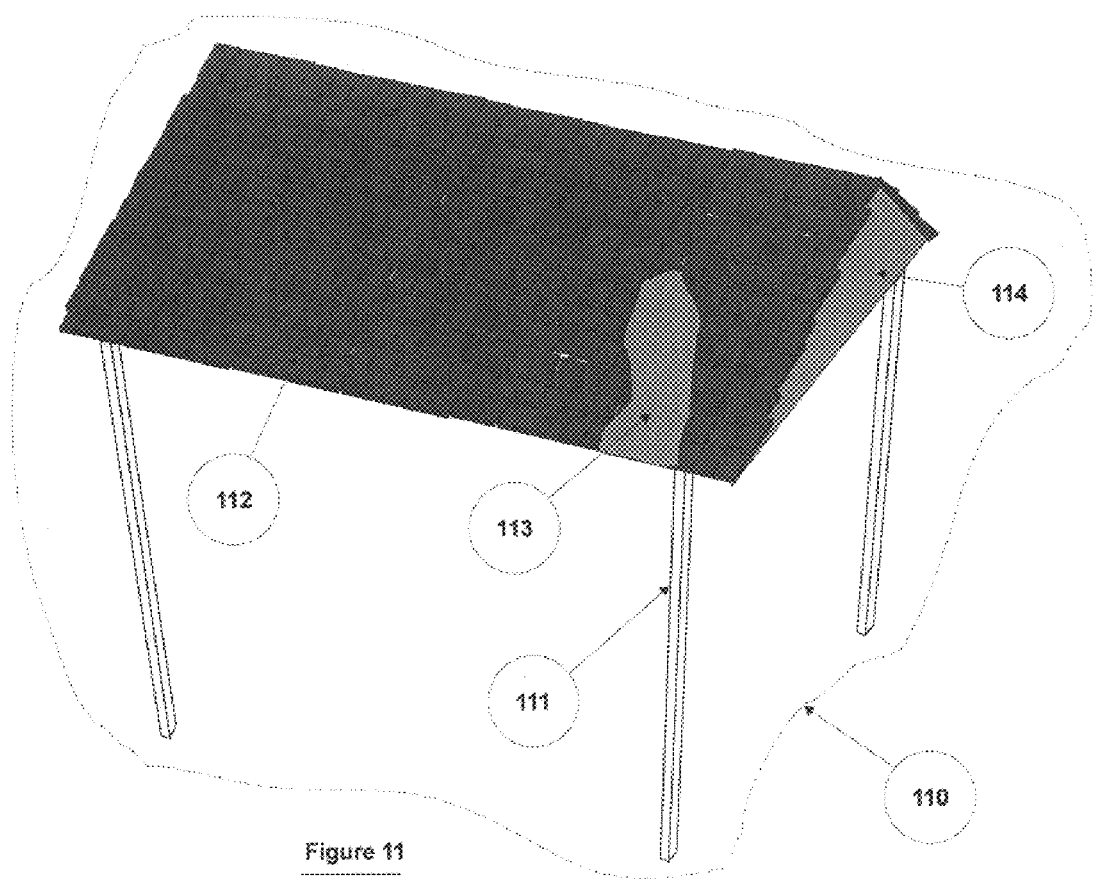
FIG. 11 is a perspective view of said optional roof system.

Illustrated in FIG. 11 is a simplified perspective view of the roofing system 110, which is optional. The roofing system 110 is comprised of a second weight bearing support system and a roof frame or truss system. The roofing system further comprises a plurality of FRP pultruded vertical support posts 111 securely attached to the flooring system 80 (illustrated in FIG. 5), into the ground, into concrete footings, onto corrosion resistant pads, or through water into the ground where said structure is a dock. The roofing system also comprises a plurality of roofing sheathing 113, trim panels 114, and shingles 112. The roofing system illustrated in FIG. 6 is typically characterized as a gable roof. The invention can be practiced, as well, with a shed-type roof securely attached to a pre-existing structure. The roofing trusses or rafters would be easily adjusted to conform to this configuration.

Figure 12:
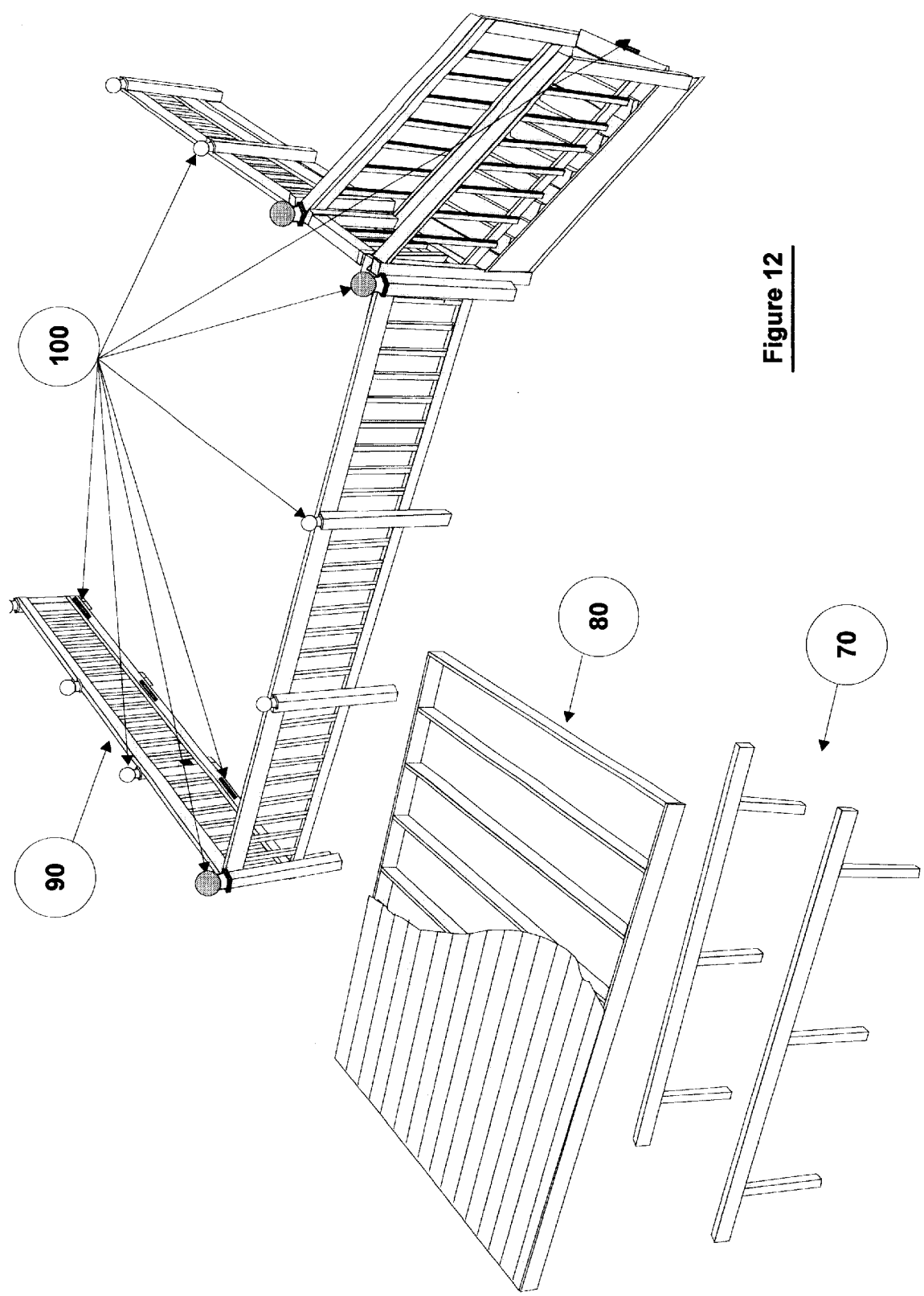
FIG. 12 is an exploded assembly perspective view of the invention (roofing system is not shown for clarity).
Figure 13:
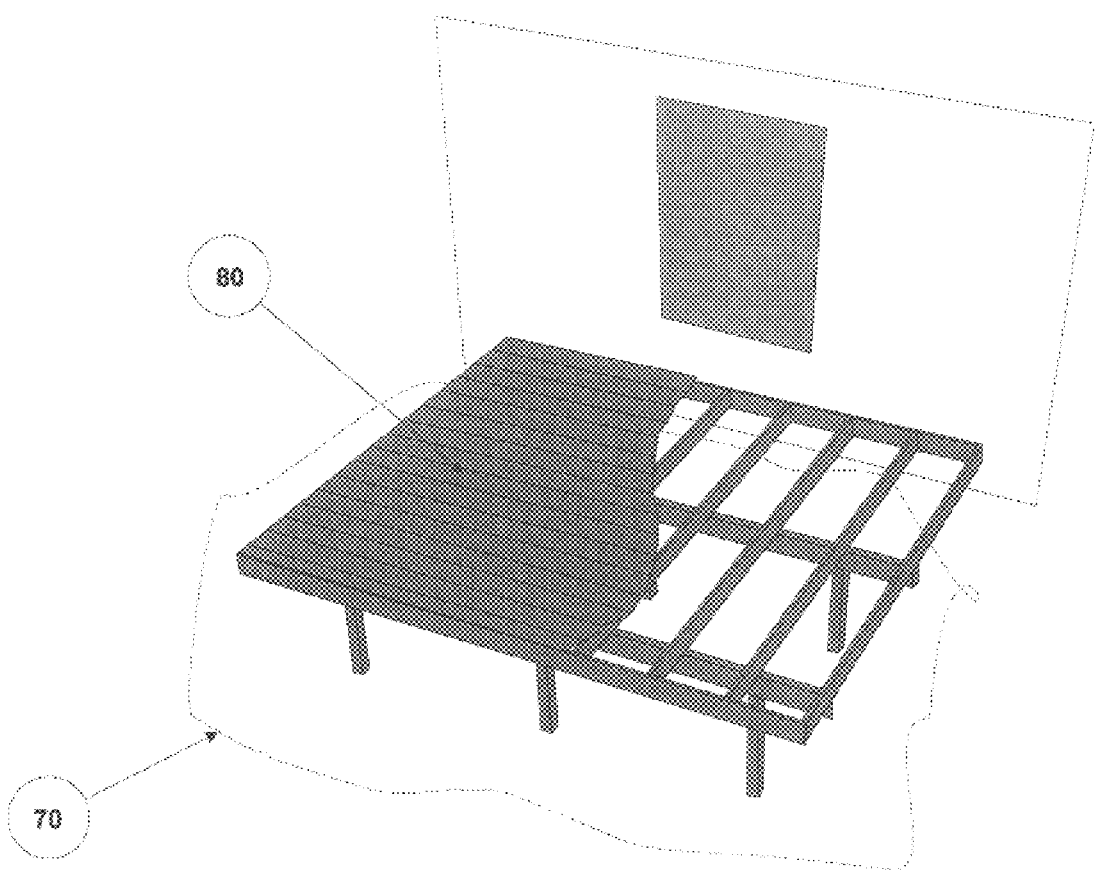
FIG. 13 is a perspective view of the flooring system attached to the (first) weight bearing system.
Figure 14:
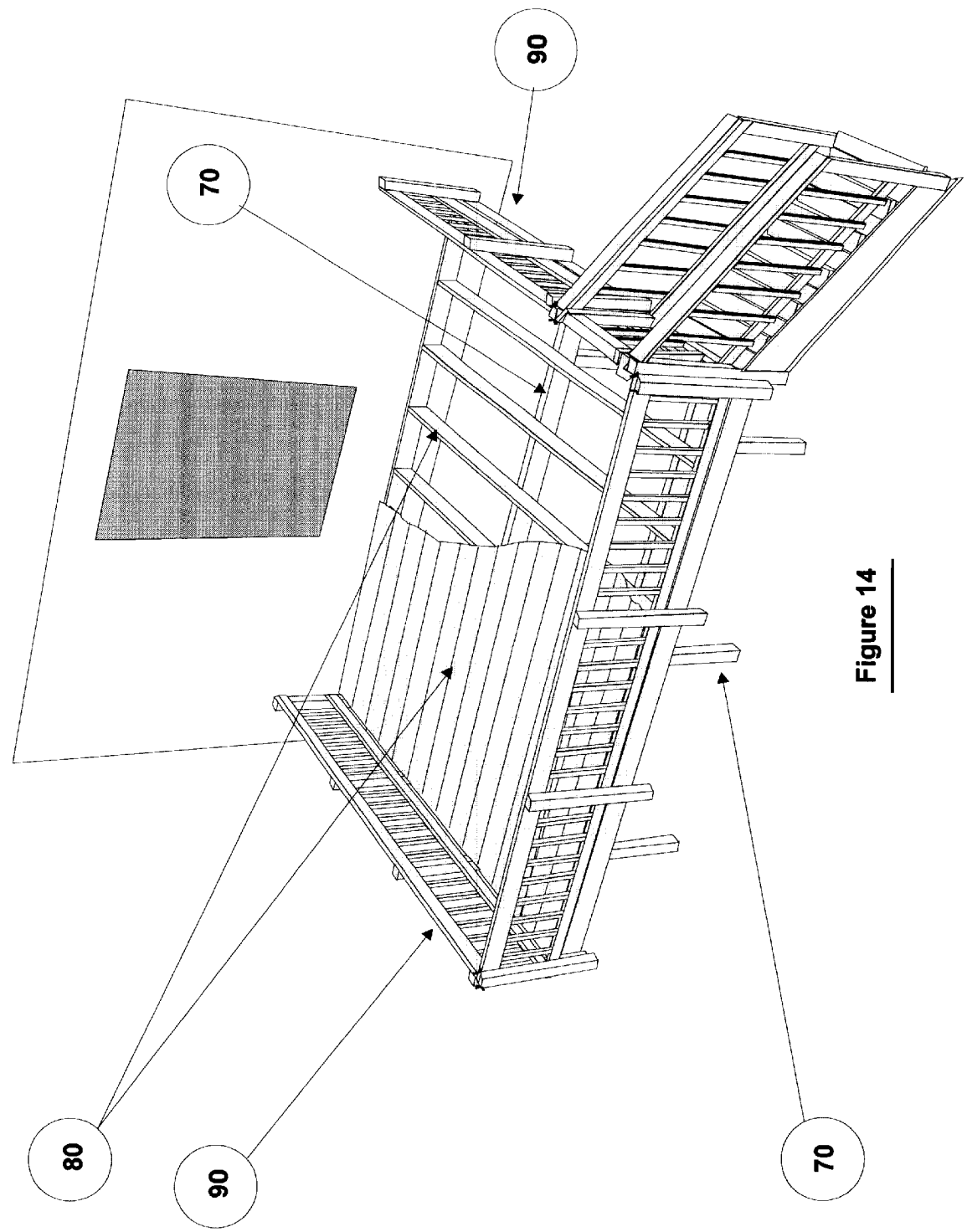
FIG. 14 is a perspective view of the safety system attached to the flooring system (and the first weight bearing system).
Figure 15:
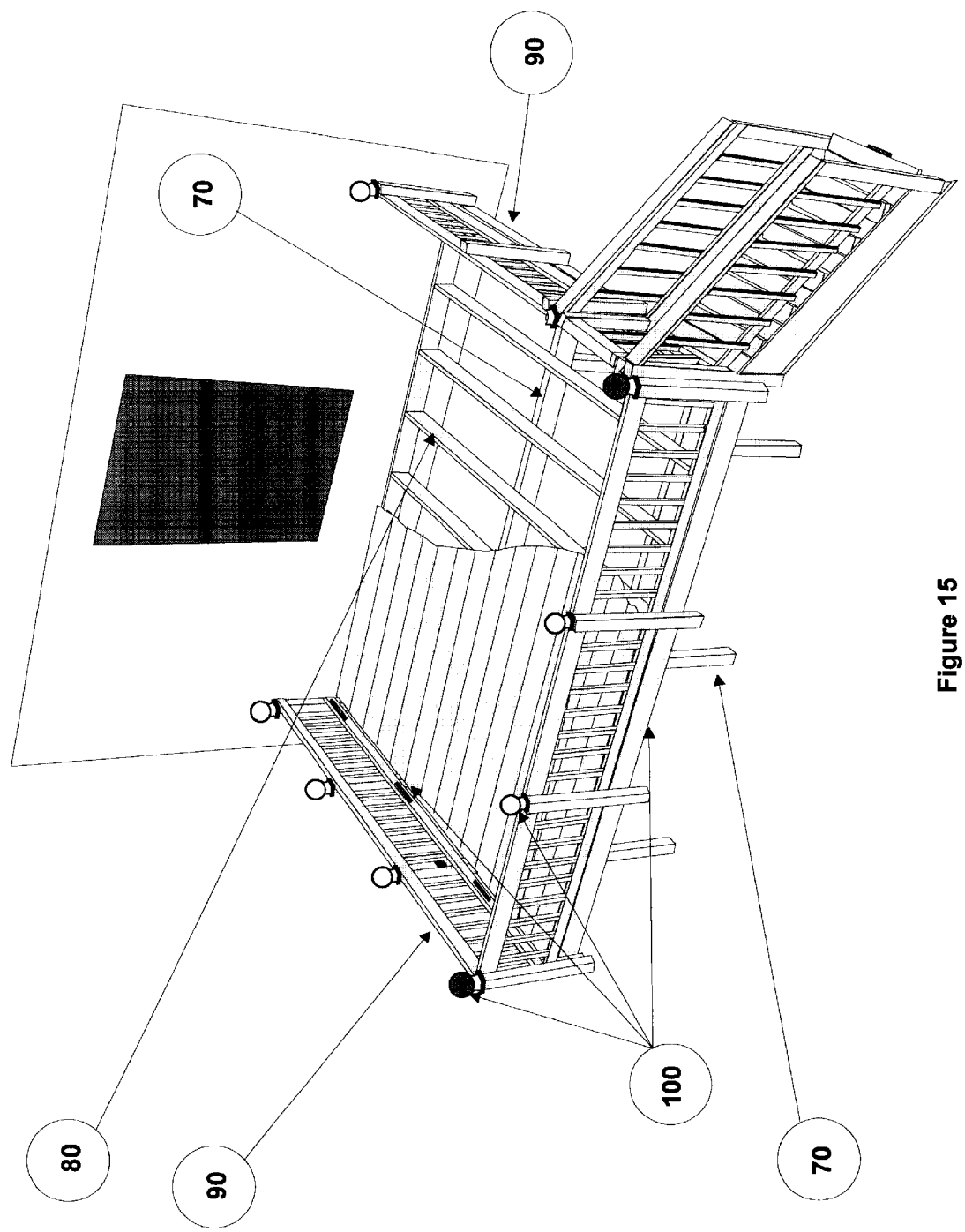
FIG. 15 is a perspective view of the decorative system attached to the safety system, the flooring system and the first weight bearing system.

Illustrated in FIG. 12 is an exploded assembly perspective view of the invention including the weight bearing support system 70, flooring system 80, safety system 90, and decorative system 100 (roofing system is not shown for clarity). The flooring system 80, as illustrated in FIG. 13, is securely attached to the first weight bearing support system 70. Illustrated in FIG. 14 is the safety system 90, which is securely attached to the flooring system 80 (and the first weight bearing support system 70). The decorative system 100, as illustrated in FIG. 15, is securely attached to said safety system 90, the flooring system 80, and the first weight bearing system 70. Detailed views of the attachments of each of the systems will be discussed and shown later in this disclosure.

Figure 16:
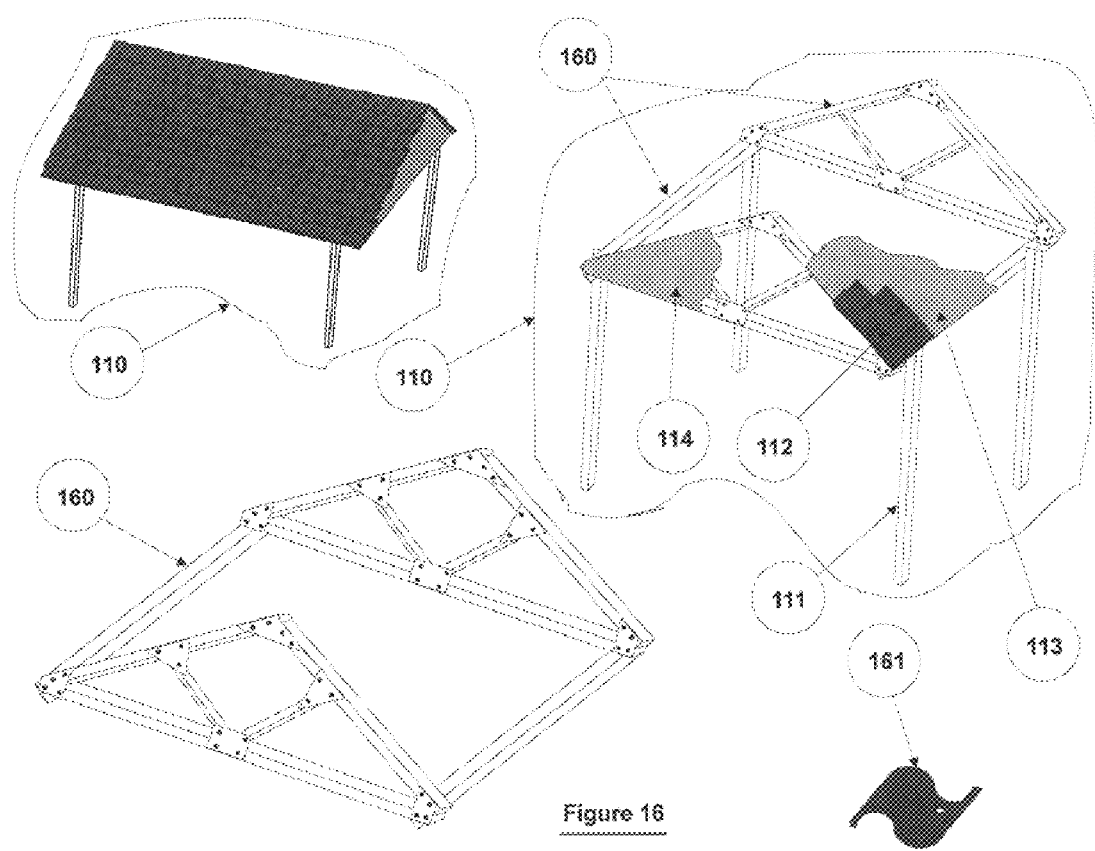
FIG. 16 is a perspective view of the roofing system and the roof or truss system.

Illustrated in FIG. 16 is the optional roofing system 110 which is comprised of the second weight bearing support system and a roof frame or truss system 160. Additional trusses may be added to the roof frame or truss system 160 if requirements necessitate. Characteristics of the roofing system 110 and the roof frame or truss system 160 including but not limited to shape, color, and configuration can be varied according, but not limited to customer, designer, and building code requirements. The second (or roof) weight bearing system, as illustrated in FIG. 16, consists of vertical roofing support posts 111. Shingles 112 or FRP barrel tiles 161 are attached to the roof sheathing 113. Trim panels 114 and roof sheathing 113 are attached to the roof frame or truss system 160. The second weight bearing system can be either securely attached to said flooring system 80 (illustrated in FIG. 5) or combined with the first weight bearing system 70 illustrated in FIG. 6 (which illustrates attachment at both the flooring system 80 and into the ground as a part of the first weight bearing system 90). The roofing system 110 will be assembled with corrosion resistant hardware, including but not limited to fasteners, bolts, nuts, washers, rivets, threaded inserts, and adhesives.

Figure 17:
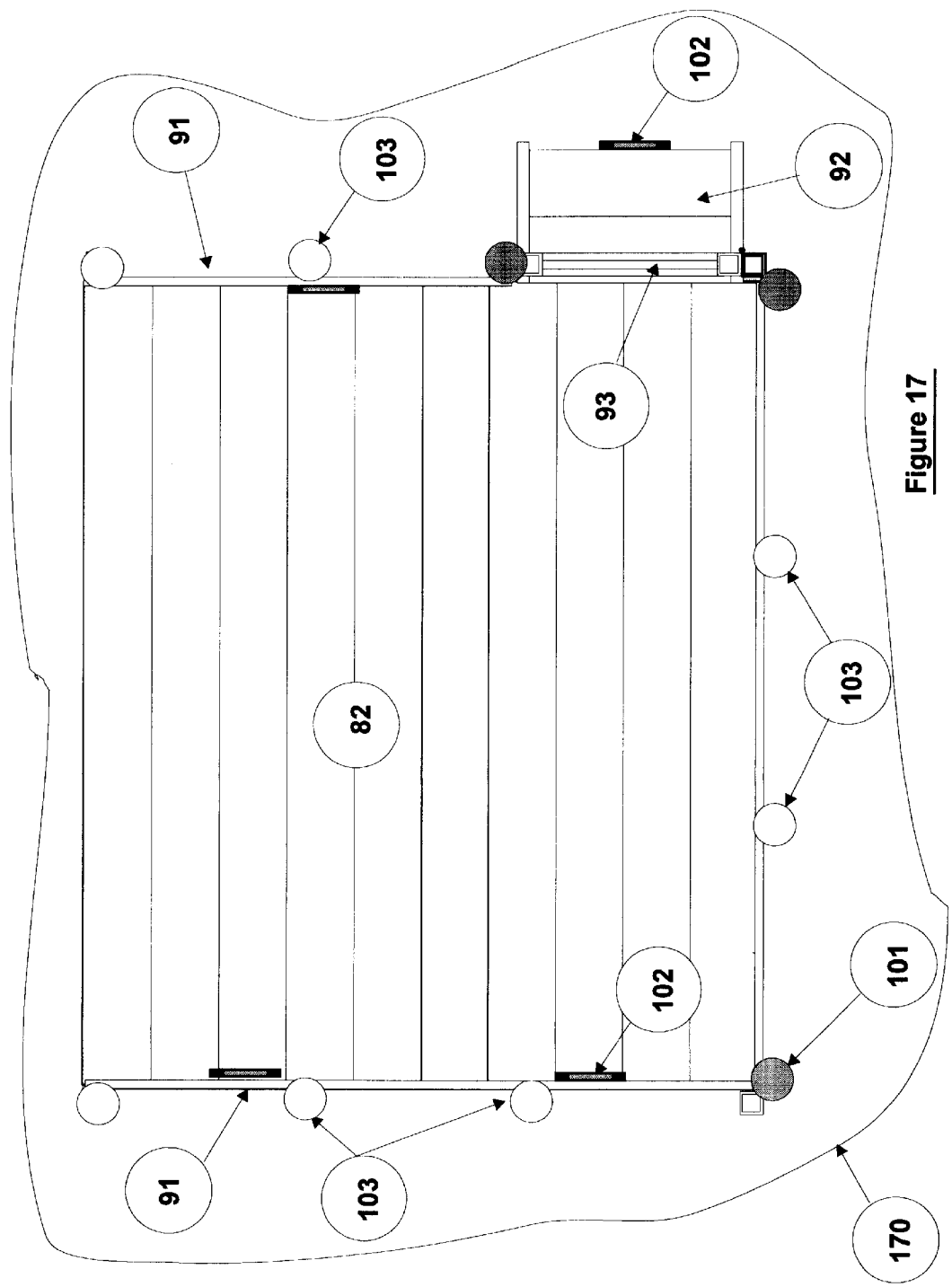
FIG. 17 is a top view of the invention (No stair railing and only two stair treads are shown for clarity).
Figure 18:
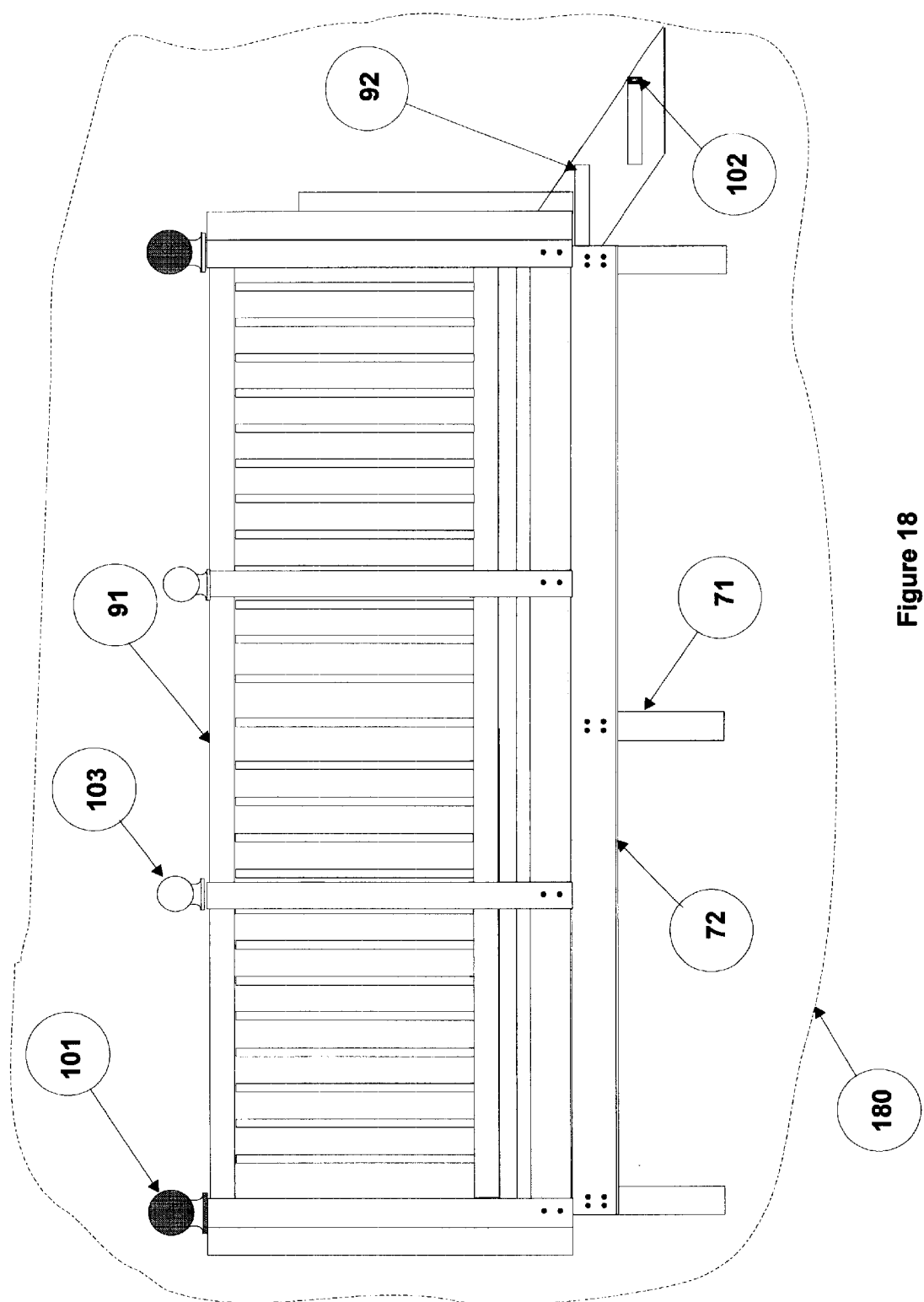
FIG. 18 is a front view of the invention (No stair railing and only two stair treads are shown for clarity).
Figure 19:
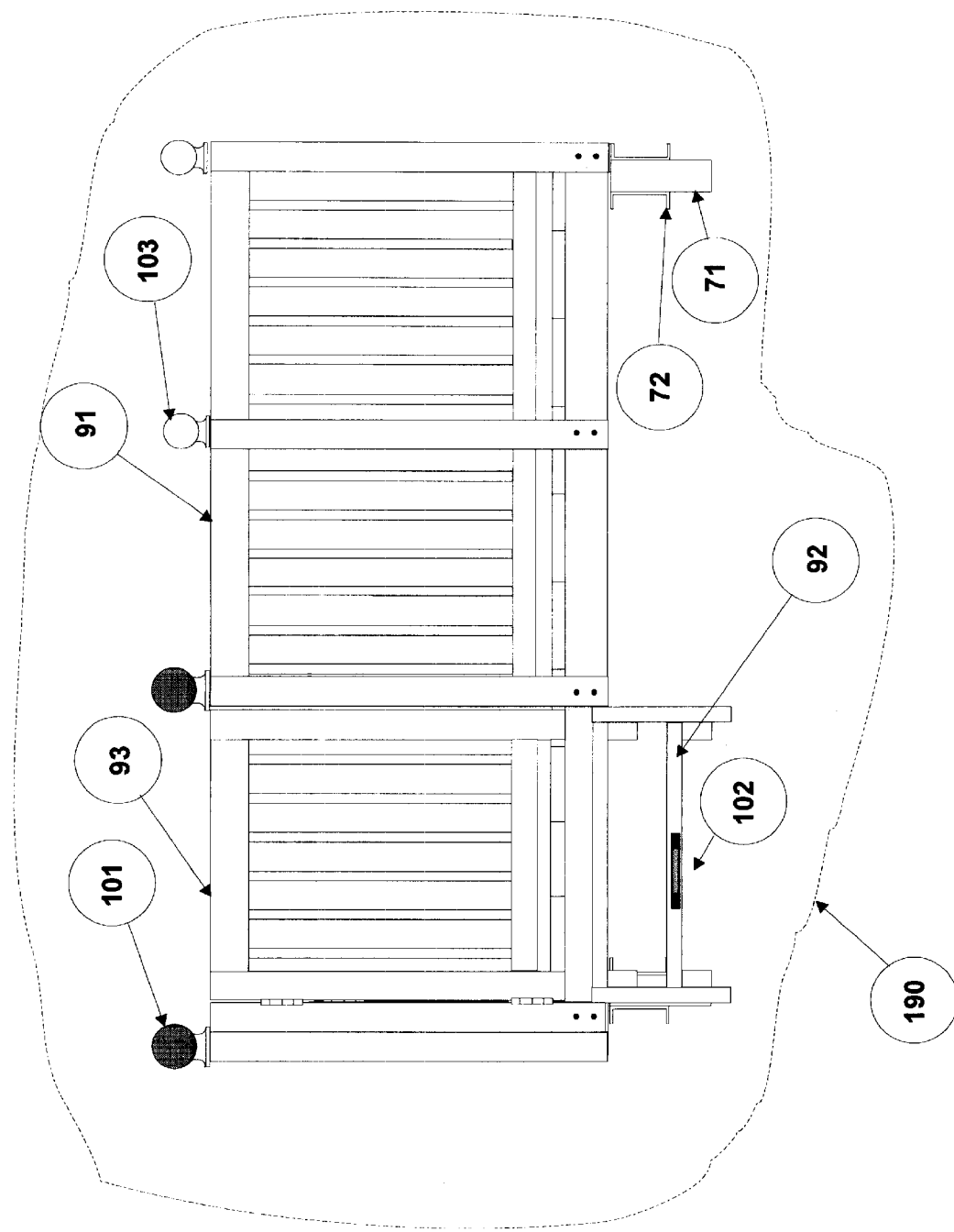
FIG. 19 is a right side view of the invention (No stair railing and only two stair treads are shown for clarity).

Additional illustrations of the top 170, front 180, and right-side 190 views of the invention illustrated as a FRP pultrusion deck are shown in FIG. 17 through FIG. 19 respectively. The top view 170 of the invention is illustrated in FIG. 17. Illustrated in FIG. 17 are the flooring planks 82, railing assembly 91, stairs 92, an optional gate 93 (which can be configured as a door), auxiliary lighting units 101, low-level auxiliary lighting 102, and decorative end caps 103 mounted onto FRP pultruded vertical rail posts. The stair railing and portions of the stairs have been removed in FIG. 17, for clarity. The front view 180 of the invention is illustrated in FIG. 18. Illustrated in FIG. 18 are the vertical support posts 71, support beams 72, railing assembly 91, stairs 92, auxiliary lighting units 101, low-level auxiliary lighting 102, and decorative end caps 103 mounted onto FRP pultruded vertical rail posts. The stair railing and portions of the stairs have been removed in FIG. 17 for clarity. A view of the right-side 190 of the invention is illustrated in FIG. 19. Illustrated in FIG. 19 are the vertical support posts 71, support beams 72, railing assembly 91, stairs 92, optional gate 93 (which can be configured as a door), auxiliary lighting units 101, low-level auxiliary lighting 102, and decorative end caps 103 mounted onto FRP pultruded vertical rail posts. The stair railing and portions of the stairs have been removed in FIG. 17, for clarity.

Figure 20:
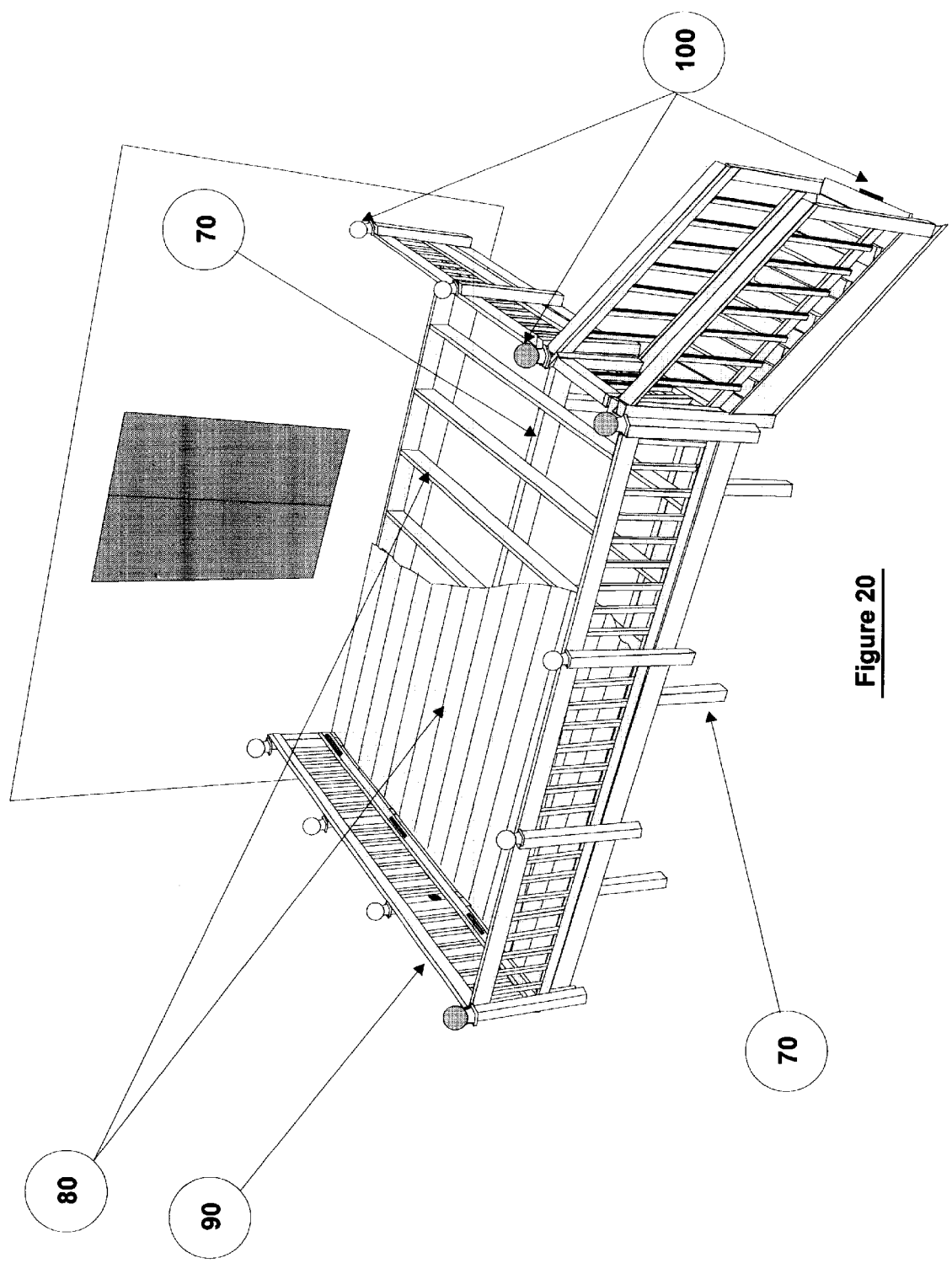
FIG. 20 is a perspective view of the invention (without the roofing system).
Figure 21:
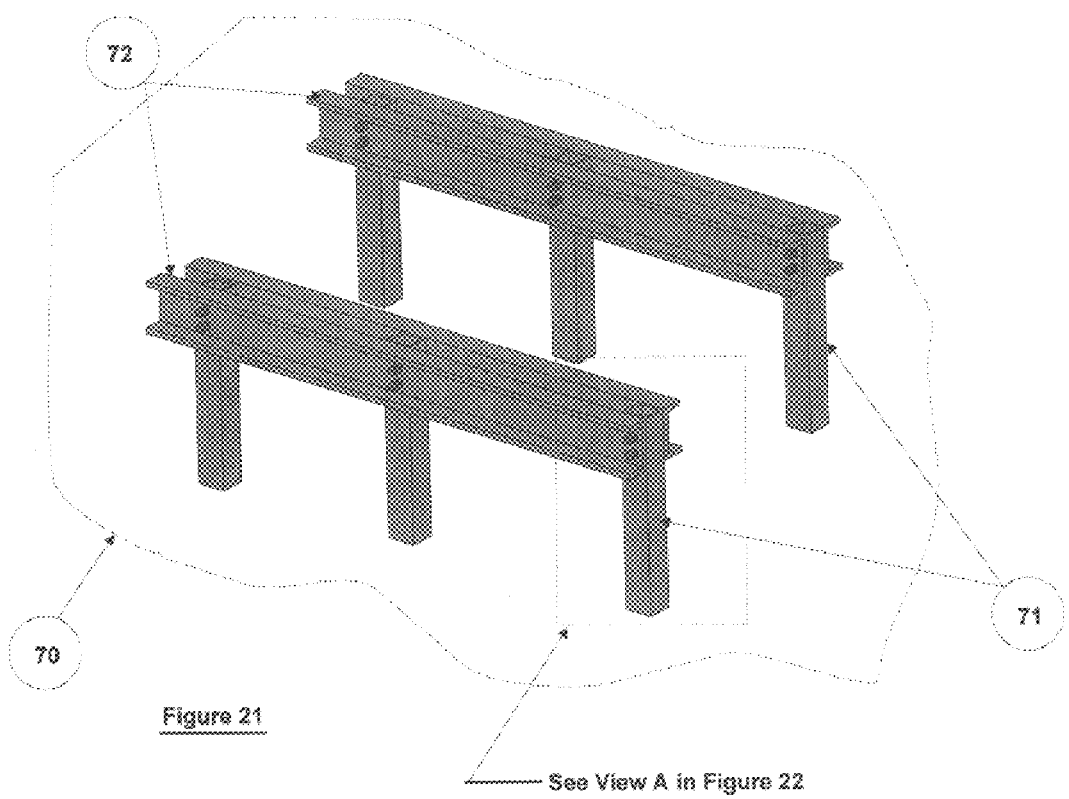
FIG. 21 is a perspective view of the weight bearing system.
Figure 22:
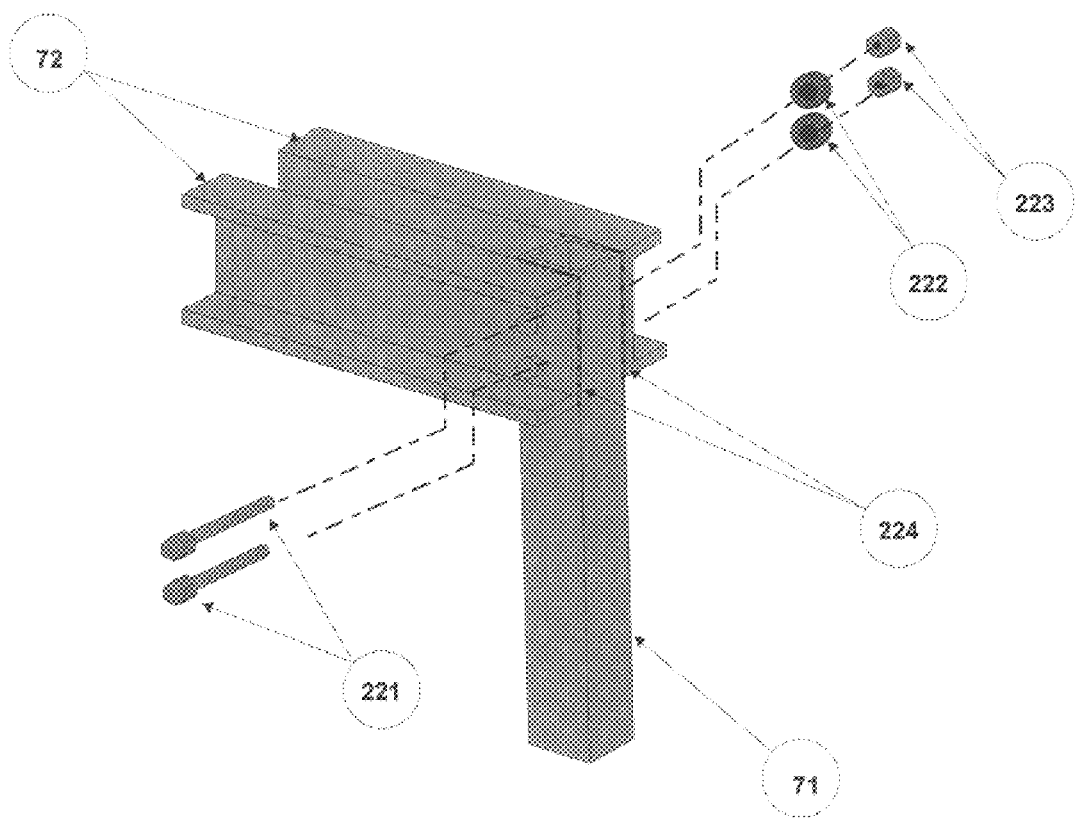
FIG. 22 is an enlarged illustration of the vertical support post and support beam connection.

As described previously, the invention is comprised of several systems. The invention comprises of a weight bearing support system 70, flooring system 80, safety system 90, decorative system 100, and an optional roof system 110. All these systems are assembled together to form a solid structure as illustrated in FIG. 20 (roof system not show for clarity). Illustrated in FIG. 21 is the weight bearing system 70 which is fabricated using FRP square tube-shaped vertical support posts 71 and FRP c-channel shaped support beams 72. Illustrated in FIG. 22 is an enlarged view of the vertical support post 71 and support beam connection 72, labeled as View A in FIG. 21. The weight bearing system is assembled using corrosion resistant attachment hardware 221, 222, and 223 (bolts, washers, and nuts) and/or optional adhesive bonding 224. The type, number, shape, cross-section, color, orientation, method of attachment, placement, arrangement, spacing, and configuration of the vertical support posts, support beams, attachment hardware, and weight bearing system may be varied and shall not be limited by this disclosure. In addition, the bonding material, method, and location may also be varied and shall not be limited by this disclosure. These variations are not limited by this disclosure and may be varied according but not limited to design requirements, building codes, customer requirements, artistic expression, and aesthetics.

Figure 23:
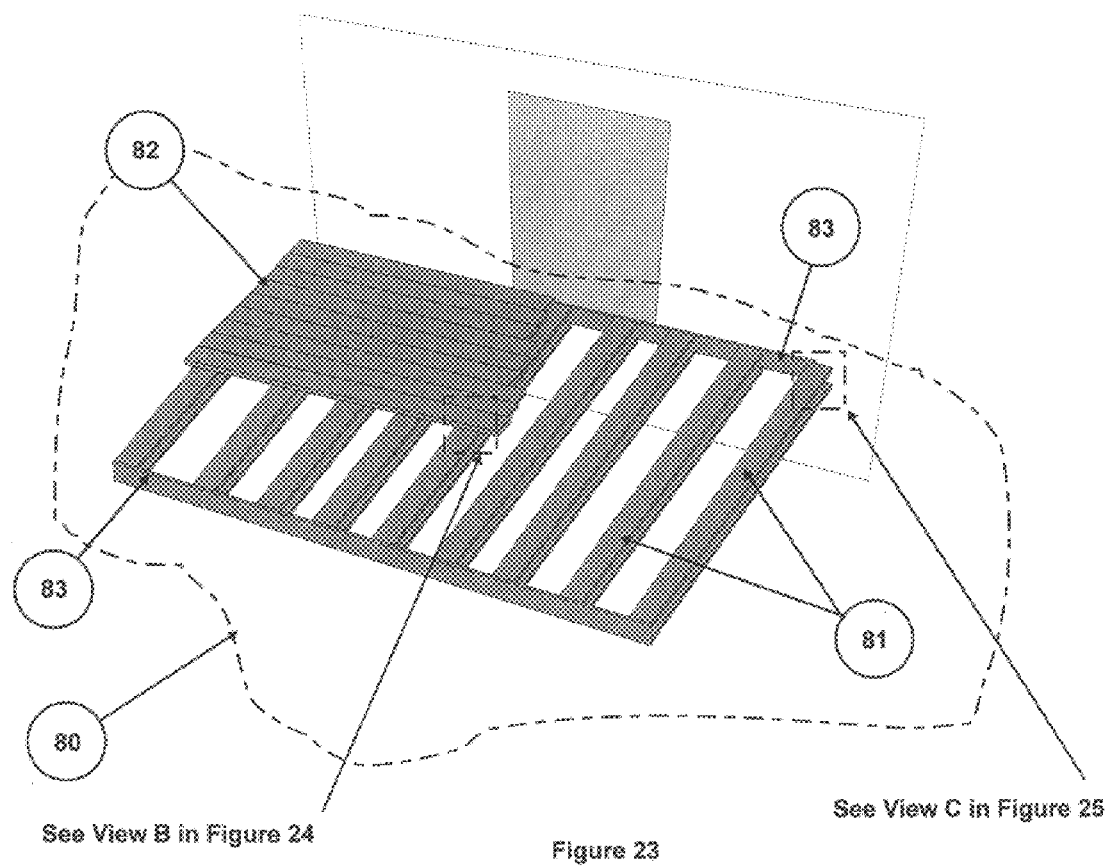
FIG. 23 is an illustration of the flooring system highlighting the areas of flooring plank, joist and end joist connection.
Figure 24:
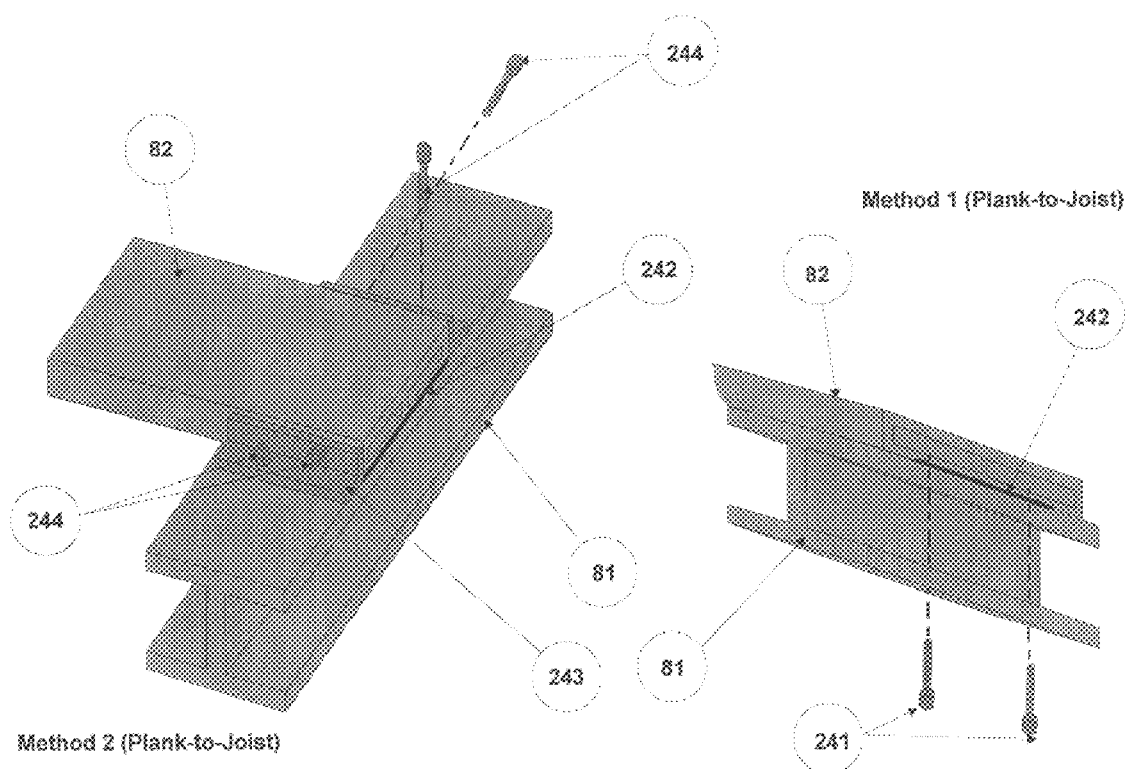
FIG. 24 are illustrations of the flooring plank-to-joist connections.
Figure 25:
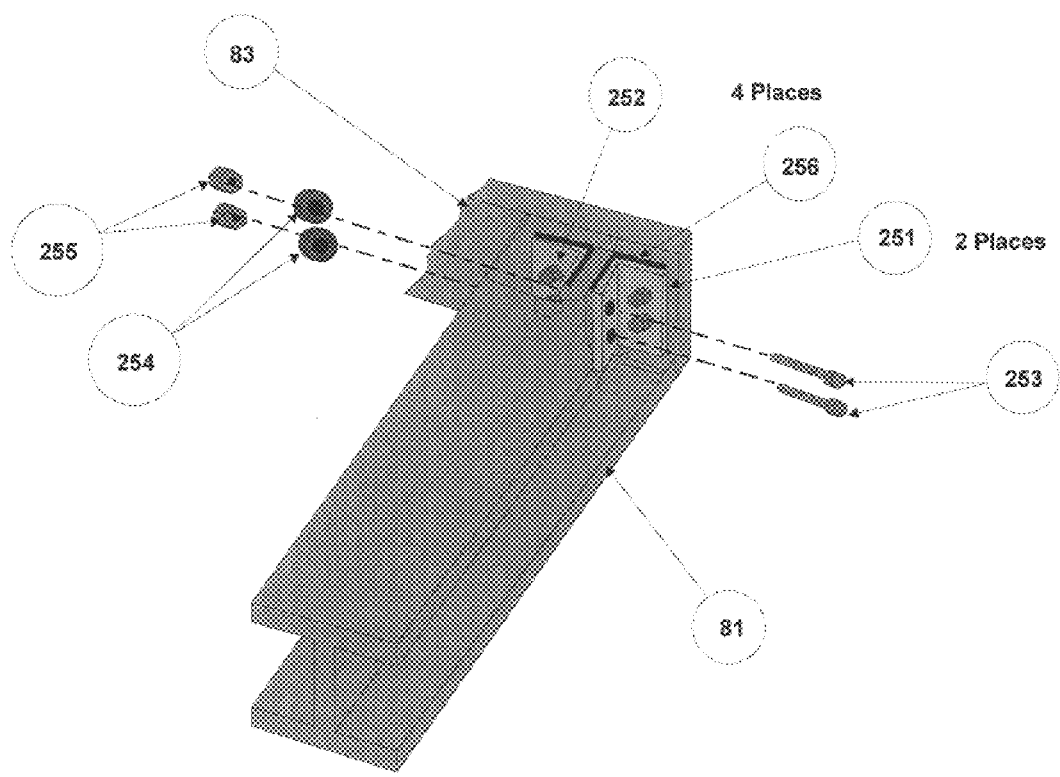
FIG. 25 is an illustration of the joist-to-end joist connection.

The flooring system 80 illustrated in FIG. 23, is fabricated using FRP wide flange-shaped joists 81, FRP rectangular-shaped flooring planks 82, and FRP rectangular-shaped end joists 83. Illustrated in FIG. 24 is an enlarged view of the method of attachment of the flooring planks 82 to the joists 81, labeled as View B in FIG. 23. Although two methods for attaching the flooring planks 82 to the joists 81 are illustrated, there are numerous attachment methods and configurations, which can be used and this invention shall not be limited by this disclosure. Therefore, this disclosure shall not limit the attachment methods and configurations of the flooring system. An optional, skid-resistant surface may be applied on the top surface of the flooring planks 82. The shape, color, orientation, placement, arrangement, pacing, method of attachment, and configuration of the joists, flooring planks, and joist brackets may be varied and shall not be limited by this disclosure. The type, color, configuration, and number of attachment hardware may also be varied and shall not be limited by this disclosure. In addition, the bonding material and bonding method may also be varied and shall not be limited by this disclosure. These variations are not limited by this disclosure and may be varied according but not limited to design requirements, building codes, customer requirements, artistic expression, and aesthetics. Illustrated in FIG. 24 are the flooring planks 82 which are attached to the joists 81 using Method 1, with corrosion resistant hardware 241 (self-tapping screws) and/or optional adhesive bonding 242. Clearance holes are drilled through the top flange of the joists 81 and pilot holes are drilled into the bottom surface of the flooring planks 82. Self-tapping corrosion resistant hardware is threaded through the joist holes into the flooring planks 82, without protruding through the top surface of the flooring planks 82. Optional bonding adhesive 242 can be applied singly to either of the back surface of the flooring planks 82, the joists 81, or any combination. Illustrated in FIG. 24 are the flooring planks 82 which can also be attached to the joists 81 using Method 2 with a flooring plank bracket 243, corrosion resistant hardware 244 (self-tapping screws), and/or adhesive bonding 242. Flooring plank brackets 243 are fabricated from FRP angle-shaped material. Clearance holes are drilled through the flooring plank brackets 243 and pilot holes are drilled into the edge of the flooring planks 82. Self-tapping corrosion resistant screws are threaded through the flooring plank bracket holes into the flooring planks 82. Illustrated in FIG. 25 is an enlarged view of the method of attachment of the joists 81 to the end joists 83, labeled View C in FIG. 23. Joist brackets 251, fabricated from FRP angle-shaped material are used to connect the joists 81 to the end joists 83. Clearance holes are drilled through both surfaces of the joist brackets 251 and pilot holes are drilled into the end joists 83. The joist brackets 251 are attached to the end joists 83 using corrosion resistant hardware 252 (self-tapping screws). The joist bracket 251 is attached to the end joist 83 by inserting self-tapping screws 252 into the joist bracket clearance holes and threading them into the pilot holes in the end joists 83. Clearance holes are drilled through the ends of the joists 81 (through the web of the joists). Also illustrated in FIG. 25 are the joist brackets 251 are attached to the joists 81 using corrosion resistant hardware 253, 254, and 255 (bolts, washers, and nuts). Optional bonding adhesive 256 may also be applied singly to either of the back surface of the joist brackets 251, the joists 81, the end joists 83, or any combination. Clearance holes are drilled through the joist brackets 251 and pilot holes are drilled into the end joists 83.

Figure 26:
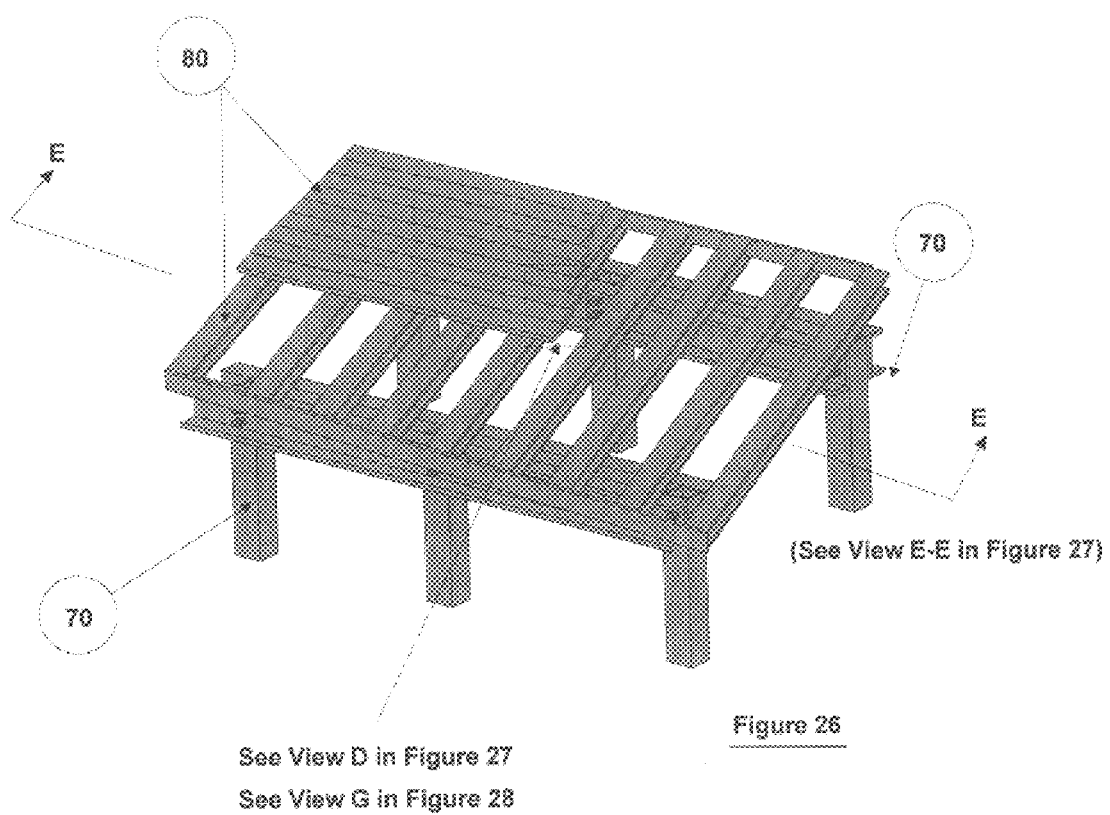
FIG. 26 are illustrations of the attachment of the flooring system to the weight bearing system.

The flooring system is attached to the weight bearing system as illustrated in FIG. 26.

Figure 27:
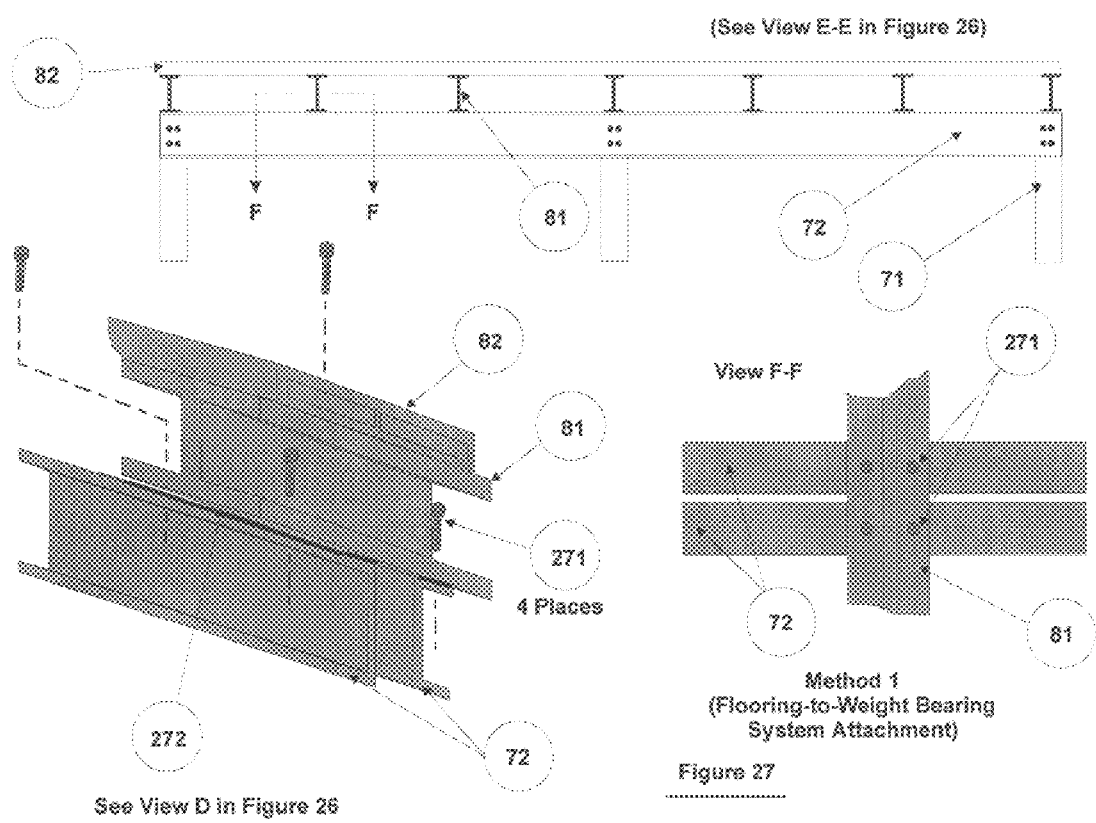
FIG. 27 is an enlarged illustration of the attachment of the flooring s stem to the weight bearing system.

View E—E, illustrated in FIG. 27 is a view cutting through the flooring and weight bearing system to expose an edge view of the system attachment of FIG. 26. View F—F, also illustrated in FIG. 27 is a view cutting through one of the joists 81, showing its attachment to the (weight bearing system) beams 72. Also illustrated in FIG. 27 is View D, which is an enlargement of the attachment of the flooring system to the weight bearing system. The joists 81 are attached to the support beams 72 using Method 1 with corrosion resistant hardware 271 (self-tapping screws) and/or optional adhesive bonding 272. Clearance holes are drilled through the bottom flanges of the joists 81 and pilot holes are drilled into the to flanges of the (weight bearing system) beams 72 through which the self-tapping screws are threaded.

Figure 28:
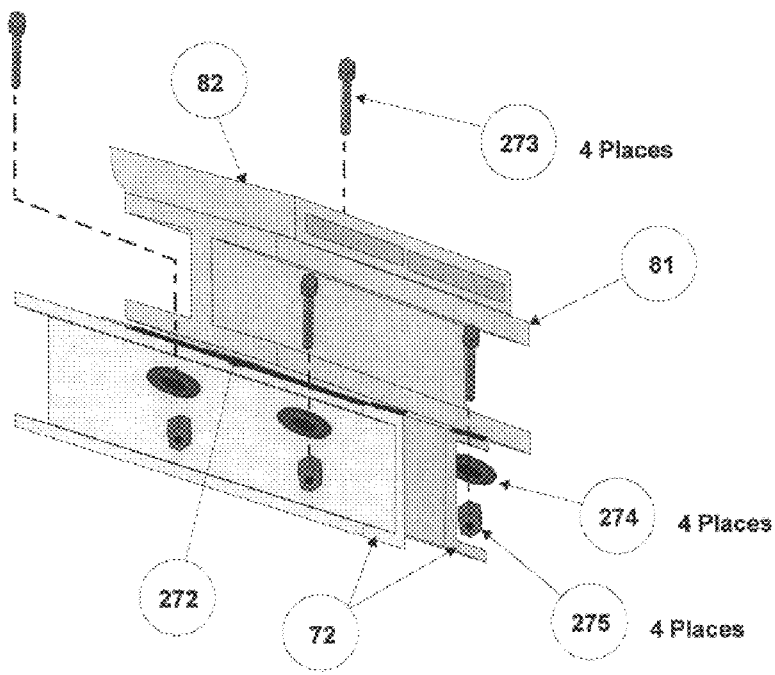
FIG. 28 is an enlarged illustration of a second method to attach the flooring system to the weight bearing system.

Illustrated in FIG. 28 are the joists 81 which can also be attached to the support beams 72 using Method 2, using corrosion resistant hardware 273, 274, and 275 (bolts, washers, and nuts), and/or optional adhesive bonding 272. Clearance holes are drilled through both the bottom flanges of the joists 81 and flanges of the (weight bearing system) beams 72 through which the bolts are inserted. Although two methods for attaching the joists 81 to the support beams 72 are illustrated, there are numerous attachment methods and configurations, which can be used and this invention shall not be limited by this disclosure. Therefore, this disclosure shall not limit the attachment methods and configurations of the flooring system. The shape, cross-section, color, orientation, placement, arrangement, spacing, method of attachment, and configuration of the flooring, weight bearing systems, and attachment hardware may be varied and shall not be limited by this disclosure. In addition, the optional bonding material and bonding method may also be varied and shall not be limited by this disclosure. These variations are not limited by this disclosure and may be varied according but not limited to design requirements, building codes, customer requirements, artistic expression, and aesthetics.

Figure 29:
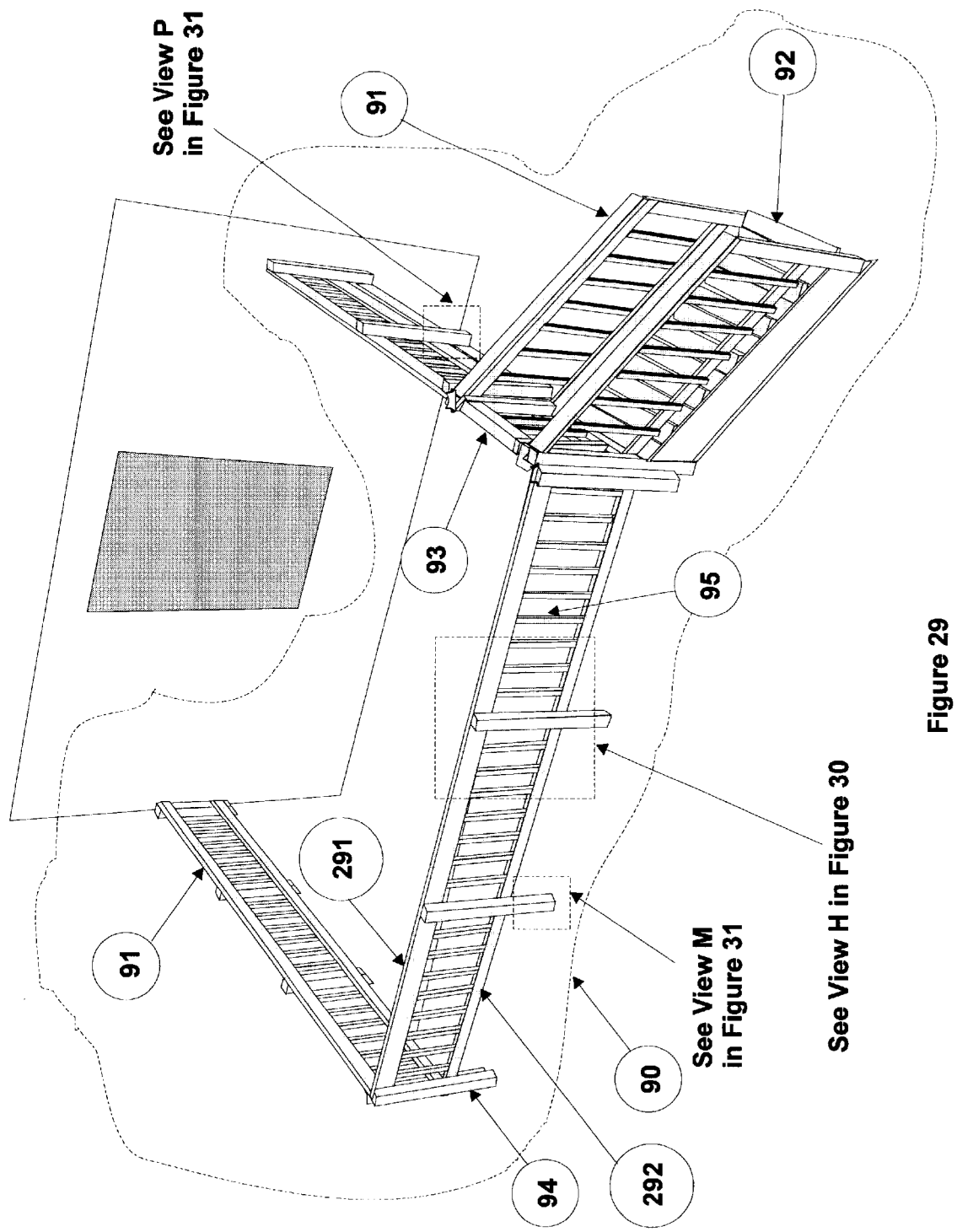
FIG. 29 is an illustration of the safety system.

The safety system 90 illustrated in FIG. 29 is attached the to the perimeter of the structure and is fabricated using FRP rectangular tube-shaped vertical rail posts 94, balusters 95, upper baluster rails (also referred to as hand rails) 291, lower baluster rails 292, various corrosion resistant hardware, and optional adhesive bonding. There are numerous variations in configuration of the attachment of balusters 95 to the upper baluster rails 291 and lower baluster rails 292. However, the shape, color, orientation, placement, arrangement, spacing, method of attachment (i.e., vertical rail posts, balusters, and baluster rails), and configuration may be varied and shall not be limited by this disclosure. The type, color, configuration, and number of attachment hardware may also be varied and shall not be limited by this disclosure. In addition, the bonding material and bonding method may also be varied and shall not be limited by this disclosure. These variations are not limited by this disclosure and may be varied according but not limited to design requirements, building codes, customer requirements, artistic expression, and aesthetics.

Figure 30:
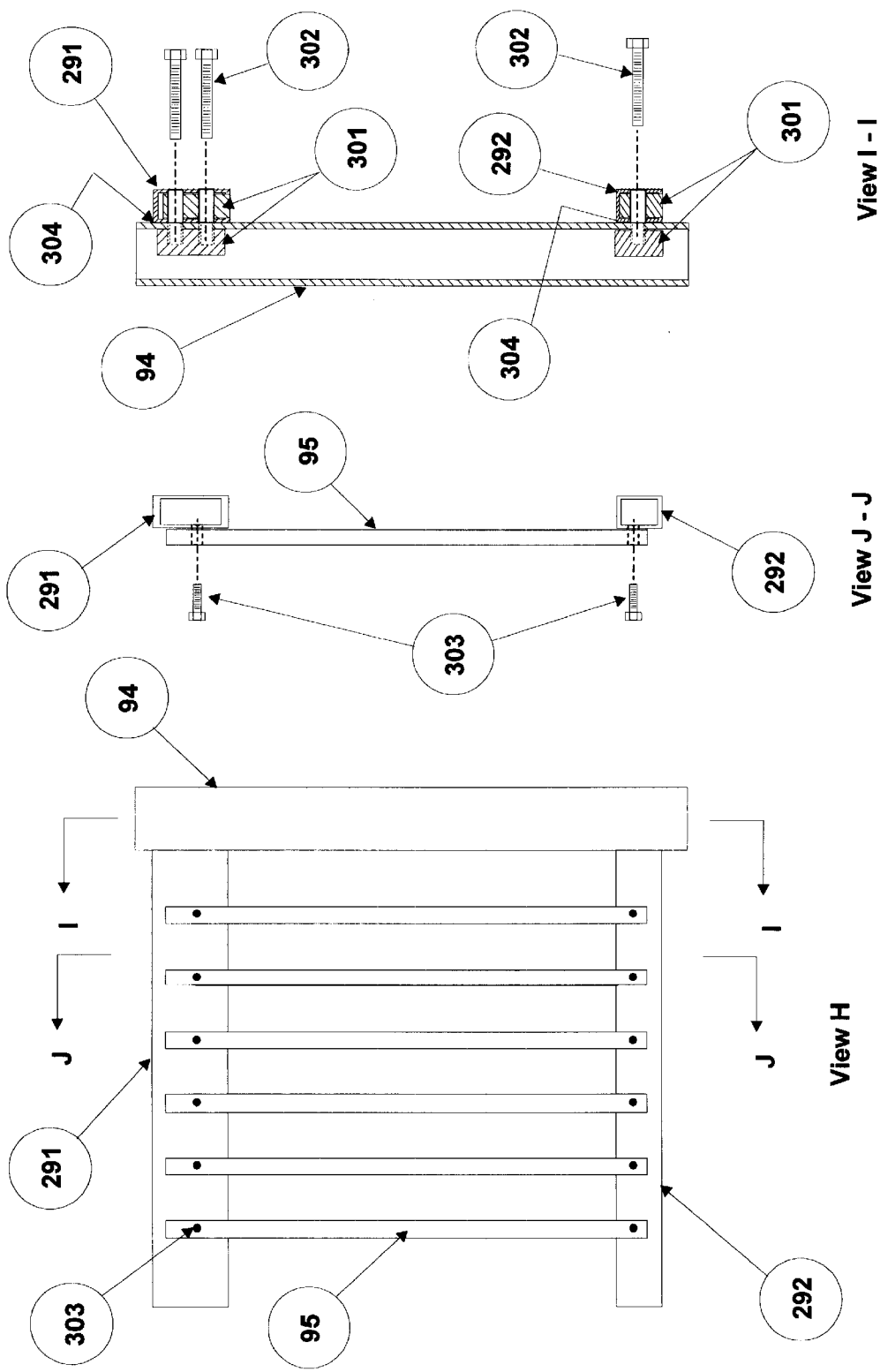
FIG. 30 is an illustration of the assembly of the balusters, upper baluster rails, lower baluster rails, and al rail posts.
Figure 31:
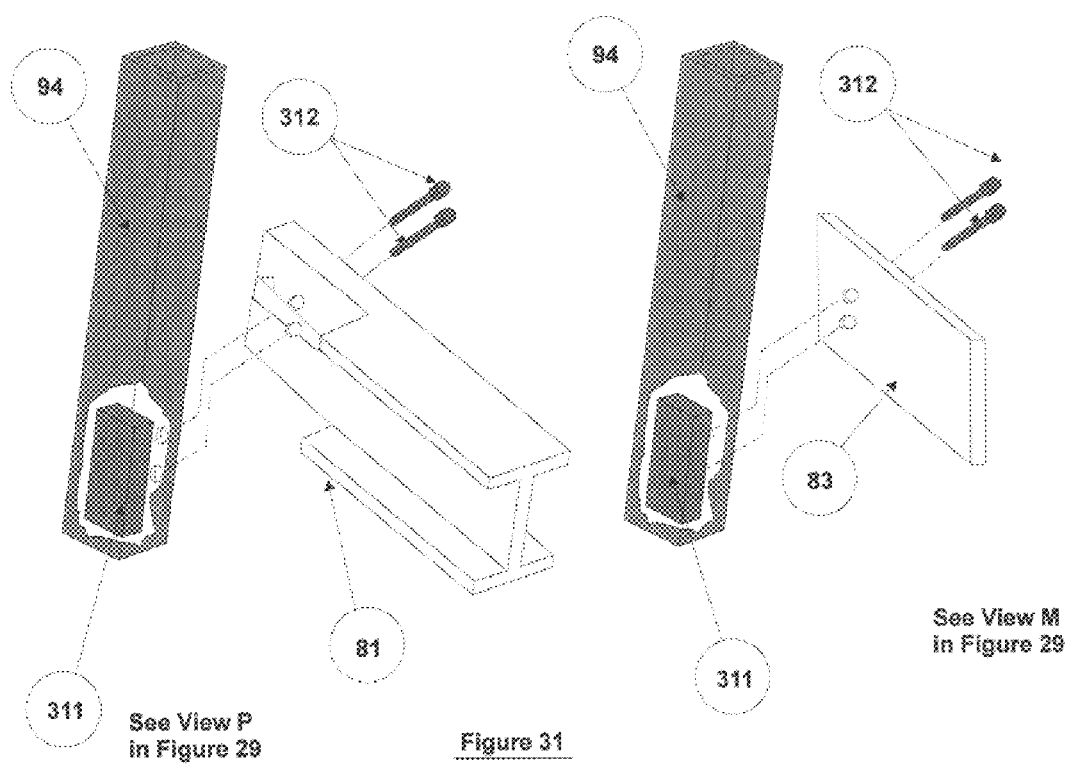
FIG. 31 is an illustration of the attachment of vertical rail posts to the joists and end joists.

Illustrated in FIG. 30 are View H of FIG. 29, which is a method for attaching the balusters 95 to the upper baluster rails 291 and lower baluster rails 292. The balusters 95 are attached to the upper baluster rails 291 and lower baluster rails 292. Also illustrated in FIG. 30 is View J—J, which is a section view showing the clearance holes drilled through the balusters 95 and pilot holes are drilled though the upper baluster rails 291 and lower baluster rails 292 through which the self-tapping corrosion resistant screws 303 are inserted. Illustrated in View I—I of FIG. 30 are the upper baluster rails 291 and lower baluster rails 292 which are attached to the vertical rail posts 94 using FRP reinforcement blocks 301 with corrosion resistant hardware 302 (self-tapping screws) and/or optional adhesive bonding 304. The bonding adhesive 304 would be applied singly to either of the back surface of the vertical rail posts 94, balusters 95, upper baluster rails 291, lower baluster rails 292, reinforcement blocks 301, or any combination. Clearance holes are drilled though the upper baluster rails 291, lower baluster rails 292, and vertical rail posts 94. Pilot holes are drilled though the reinforcement blocks 301 through which the screws 302 are inserted as illustrated in View I—I in FIG. 30. The vertical rail posts 94 are attached to the flooring system as pointed out in Views M and P as shown in FIG. 29. Illustrated in FIG. 31 is View M of FIG. 29, which is an enlarged view of a method for attaching the vertical rail posts 94 to the end joists 83 (of the flooring system). Clearance holes are drilled though the end joists 83, vertical rail posts 94, and pilot holes are drilled into the FRP reinforcement blocks 311. The vertical rail posts 94 are attached to the end joists 83 using corrosion resistant hardware 312 (self-tapping screws) and/or optional adhesive bonding. Also illustrated in FIG. 31 is View P of FIG. 29, which is an enlarged view of a method for attaching the vertical rail posts 94 to the joists 81 (of the flooring system). Clearance holes are drilled though the joists 81, vertical rail posts 94, and pilot holes are drilled into the reinforcement blocks 311. Notches are cut into the joists 81 as illustrated in View P of FIG. 31 to allow for the flush mounting of the vertical rail posts 94 to the joists 81. The vertical rail posts 94 are attached to the joists 81 using corrosion resistant hardware 312 (self-tapping screws) and/or optional adhesive bonding. Although the methods for attaching the vertical rail posts 94 to the joists 81 and end joists 83 are illustrated, there are numerous attachment methods and configurations, which can be used and this invention shall not be limited by this disclosure. Therefore, this disclosure shall not limit the attachment methods and configurations of the flooring system. The shape, cross-section, color, orientation, placement, arrangement, spacing, method of attachment, and configuration of the safety system 90 and attachment hardware may be varied and shall not be limited by this disclosure. In addition, the optional bonding material and bonding method may also be varied and shall not be limited by this disclosure. These variations are not limited by this disclosure and may be varied according but not limited to design requirements, building codes, customer requirements, artistic expression, and aesthetics.

Illustrated in FIG. 31 a is the optional gate 93, which can be configured as a door. The gate 93 is similar in construction to the railing system illustrated in FIG. 30. The gate 93 is assembled using FRP rectangular tubing for the vertical rail posts 94, balusters 95, upper baluster rail 291, and lower baluster rail 292. Illustrated in FIG. 31a is View XA—XA, which is a method for attaching the balusters 95 to the upper baluster rails 291 and lower baluster rails 292. The balusters 95 are attached to the upper baluster rails 291 and lower baluster rails 292 using corrosion resistant hardware 303 (self-tapping screws) and/or adhesive bonding. Also illustrated in FIG. 31 a in View XA—XA is a section view. showing the clearance holes drilled through the balusters 95 and pilot holes are drilled though the upper baluster rails 291 and lower baluster rails 292 through which the self-tapping screws 303 are inserted. Illustrated in View ZA—ZA are the upper baluster rails 291 and lower baluster rails 292 which are attached to the vertical rail posts 94 using reinforcement blocks 301 with corrosion resistant hardware 302 (self-tapping screws) and/or optional adhesive bonding 304. The bonding adhesive 304 would be applied singly to either of the back surface of the vertical rail posts 94, balusters 95, upper baluster rails 291, lower baluster rails 292, reinforcement blocks 301, or any combination. Clearance holes are drilled though the upper baluster rails 291, lower baluster rails 292, and vertical rail posts 94. Pilot holes are drilled though the reinforcement blocks 301 through which the self-tapping screws 302 are inserted. Hinges 311a are attached to the gate using corrosion resistant hardware (self-tapping screws). The gate 93 is attached to the vertical post 94 of the railing system also using corrosion resistant hardware (self-tapping screws).

Figure 32:
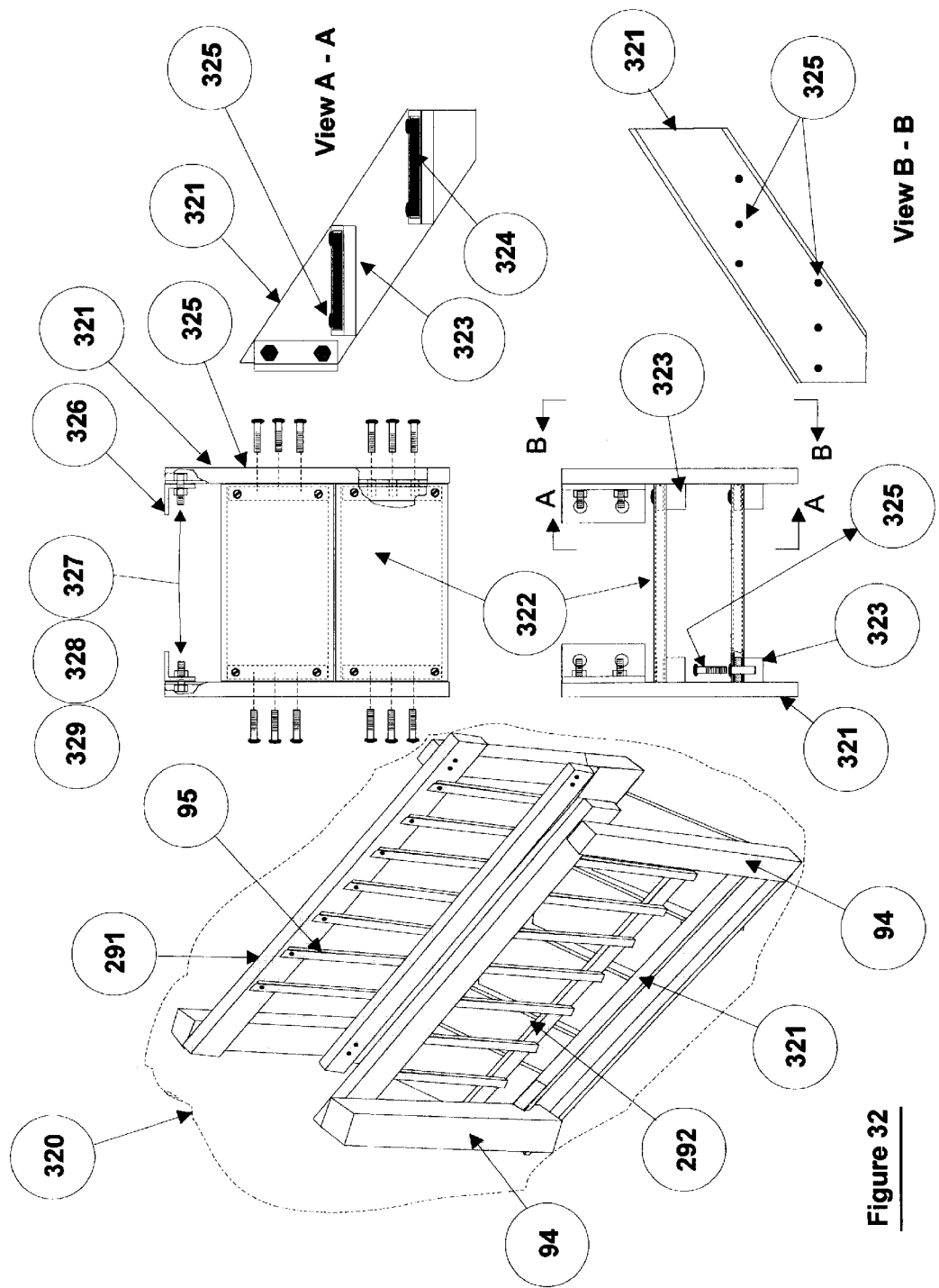
FIG. 32 illustrates views of the stair assembly.
Figure 33:
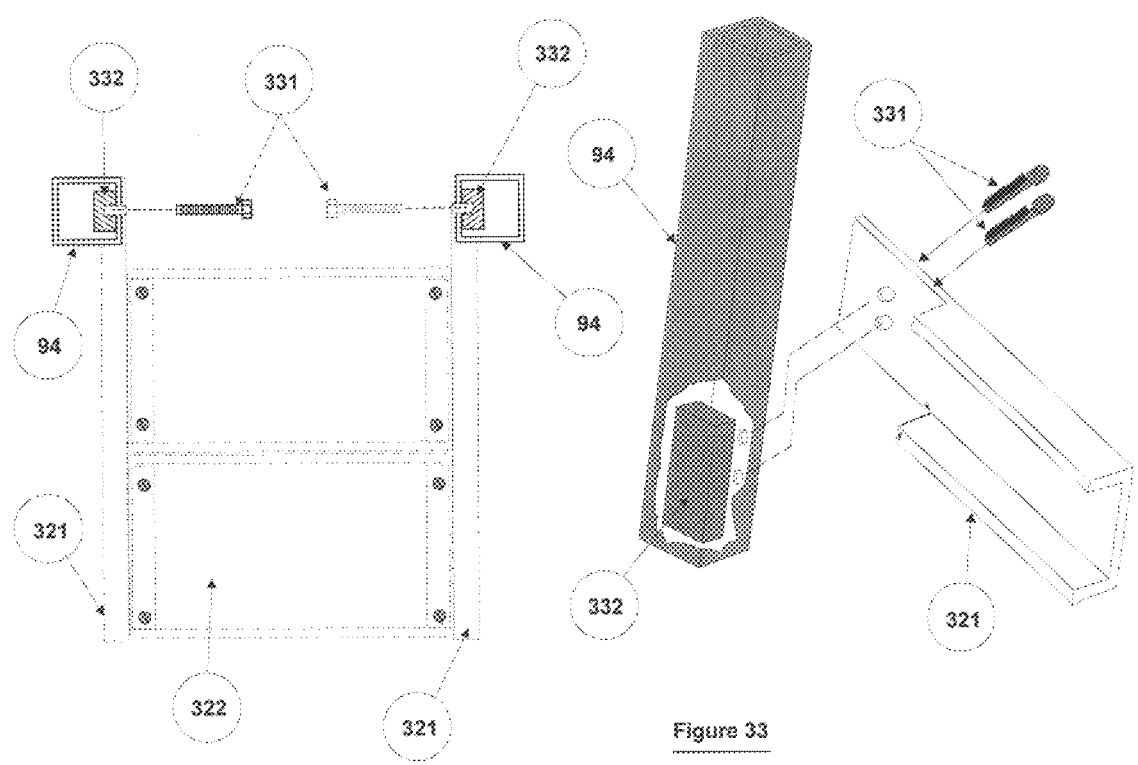
FIG. 33 illustrates views of the attachment of vertical rail posts to the stair risers.

Illustrated in FIG. 32 is a perspective view of the stair assembly 320 (which is a part of the safety system 90) including the stair railings, which can be installed as an option (unless required by applicable building codes). The stair assembly 320, is fabricated using FRP material c-channel shaped stair risers 321, rectangular-shaped stair treads 322, rectangular-shaped stair tread supports 323, vertical rail posts 94, balusters 95, upper balusters rails (also referred to as hand rails) 291, lower baluster rails 292, various corrosion resistant hardware, and optional adhesive bonding. The railing assembly fabricated using balusters 95, upper baluster rails (also referred to as handrails) 291, and lower baluster rails 292 can be installed as an option (unless required by applicable building codes). The methods for attaching the balusters 95, upper baluster rails 291, lower baluster rails 292, and c-channel shaped stair risers 321 are similar to those previously discussed earlier and illustrated in FIGS. 30 and 31 and shall not be discussed again. Illustrated in FIG. 32 is a method for attaching stair treads 322 to the stair risers 321. Top, front, and side views (including View B—B) of a partial stair section are illustrated. Note that only two stairs and no railings are shown in these views for clarity. Illustrated in FIG. 32 are the stair tread supports 323, which are attached to the stair risers 321 using corrosion resistant hardware 325 (self-tapping screws) threaded through clearance holes in the stair risers 321, into the stair tread supports 323, and/or optional adhesive bonding. The bonding adhesive would be applied singly to either of the side surface of the stair tread supports 323, stair risers 321, or any combination. The stair treads 322 are attached to the stair tread supports 323 using corrosion resistant hardware 325 (self-tapping screws) threaded through a FRP reinforcement block 324, into stair stringer supports 323, and/or optional adhesive bonding. Also illustrated in FIG. 32 are the stair assembly attachment brackets 326, which are fabricated from FRP angle material (FRP solid rectangular bar can also be used) and used to attach the stair assembly to the flooring system using corrosion resistant attachment hardware. The stair assembly attachment brackets 326 are attached to the stair risers 321 using corrosion resistant attachment hardware 327, 328, and 329 (bolts, washers, and nuts) as illustrated in FIG. 32. Additional stair risers may be added if increased strength is required. The (stair railing) vertical rail posts 94 are attached to the stair risers 321 as illustrated in the top view of a partial section of stairs. FIG. 33 illustrates the assembly of the (stair railing) vertical rail posts 94 using corrosion resistant hardware 331 (self-tapping screws) threaded through clearance holes in the (stair railing) vertical rail posts 94, into pilot holes drilled into a FRP reinforcement block 332, and/or optional adhesive bonding. The stair risers 321 are cut (notched) as illustrated in FIG. 33 to allow the vertical rail posts 94 to be attached flush against the stair risers 321. Illustrated in FIG. 33a is the optional ramp 97, which is rigidly attached to the flooring system of the invention. A detailed view of the ramp 97 is illustrated in FIG. 33a. Note that the ramp railing is not shown for clarity and is assembled similar to that of the safety system railing illustrated in FIGS. 9, 30, and 31. Illustrated in FIG. 33a is the ramp, which is fabricated using FRP pultrusion structural shapes and is assembled as shown in FIG. 33a using corrosion resistant hardware. The ramp 97 is composed of a frame consisting of c-channel ramp side stringers 331a and ramp boards 336a, ramp board support rails 339a, and a ramp attachment plate 337a. View D—D illustrates the attachment of the ramp board support rails 339a to the side stringers 331 using corrosion resistant hardware 332a (self-tapping screws). Illustrated is the assembly of the ramp board support rails 339a using corrosion resistant hardware 332a (self-tapping screws) threaded through clearance holes in the ramp side stringers 331a, into pilot holes drilled in the ramp board support rails 339a, and/or optional adhesive bonding. The ramp boards 336a are attached to the ramp board support rails 339a using corrosion resistant attachment hardware 335a (self-tapping screws) threaded through clearance holes in the ramp boards 336a and reinforcement blocks 333a, into pilot holes drilled in the ramp board support rails 339a, and/or optional adhesive bonding. The FRP reinforcement blocks 333a are inserted into the ends of the ramp boards 336a. Illustrated in View C—C, are the deck attachment holes in the ramp attachment plate 337a. The ramp attachment plate 337a is used to attach the ramp 97 to the flooring system of the invention using corrosion resistant hardware (bolts, washers, and nuts). The ramp attachment plate 337a is attached to the c-channel ramp side stringers 331a using corrosion resistant hardware 338a (self-tapping screws). Clearance holes are drilled though the c-channel ramp side stringers 331a. Pilot holes are drilled though the ramp attachment plate 337a through which the self-tapping screws 338a are inserted. An optional, skid-resistant surface may be applied on the top surface of the ramp boards 336a. There are numerous variations and configurations which the stair assembly 320 (refer to FIG. 32) or ramp 97 (refer to FIGS. 9 and 33a) can be fabricated. However, the shape, type, cross-section, type of material combination, color, orientation, placement, arrangement, spacing, method of attachment, and configuration may be varied and shall not be limited by this disclosure. The type, color, configuration, and number of attachment hardware may also be varied and shall not be limited by this disclosure. In addition, the bonding material and bonding method may also be varied and shall not be limited by this disclosure. These variations are not limited by this disclosure and may be varied according but not limited to design requirements, building codes, customer requirements, artistic expression, and aesthetics.

Figure 34:
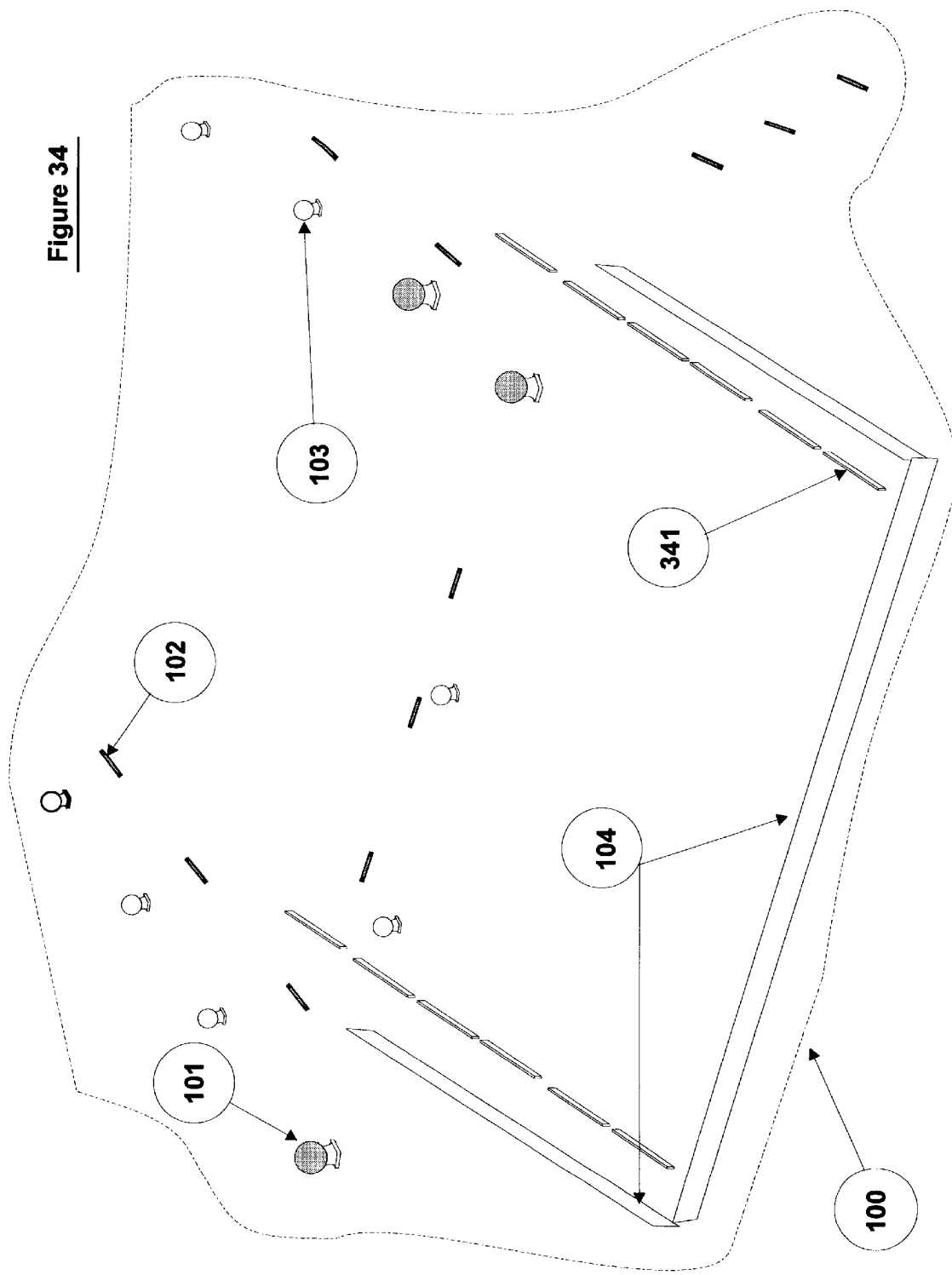
FIG. 34 is a view of the decorative system.
Figure 35:
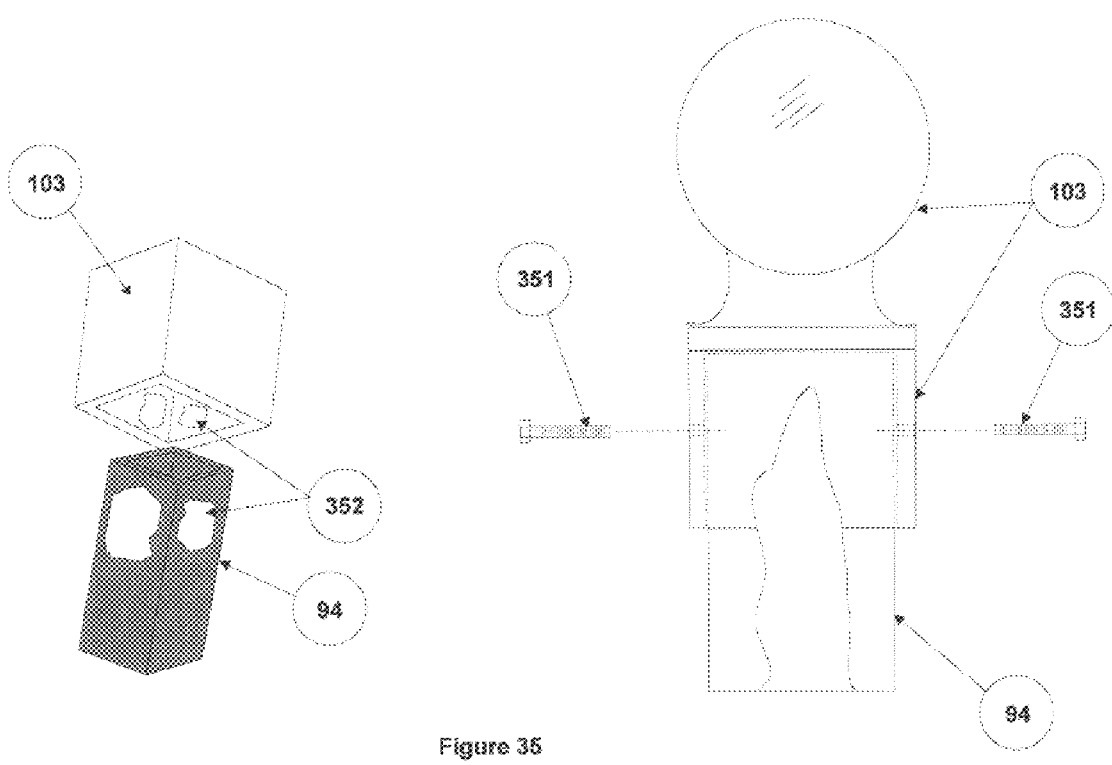
FIG. 35 illustrates views of the attachment of decorative vertical post end caps to vertical rail posts.

The decorative system 100, illustrated in FIG. 34 is comprised of a plurality of optional plastic or FRP vertical post caps 103, flooring plank end caps 341, pultruded trim panels 104, auxiliary lighting units 101, and low-level auxiliary lighting units 102 (weight bearing, flooring, safety, and roofing systems are not shown for clarity). Illustrated in FIG. 35 are the vertical post caps 103, which are fitted onto the vertical rail posts 94. The vertical post caps 103 are attached using corrosion resistant hardware 351 (self-tapping screws). Holes are drilled into the vertical post caps 103, vertical rail posts 94, and the corrosion resistant hardware 351 (self-tapping screws) are threaded into these holes. Adhesive bonding 352 may also be used in combination with the corrosion resistant hardware 351 to secure the vertical post caps 103 to the vertical rail posts 94 or may be used singly. Illustrated in FIG. 35 is the location of adhesive bonding 352, which may be applied to the inner surface of the vertical post caps 103, the outer surface of the vertical rail posts 94, or any combination. The type, shape, style, color, installation method, and configuration of the vertical post caps 103 can be varied and shall not be limited by this disclosure.

Figure 36:
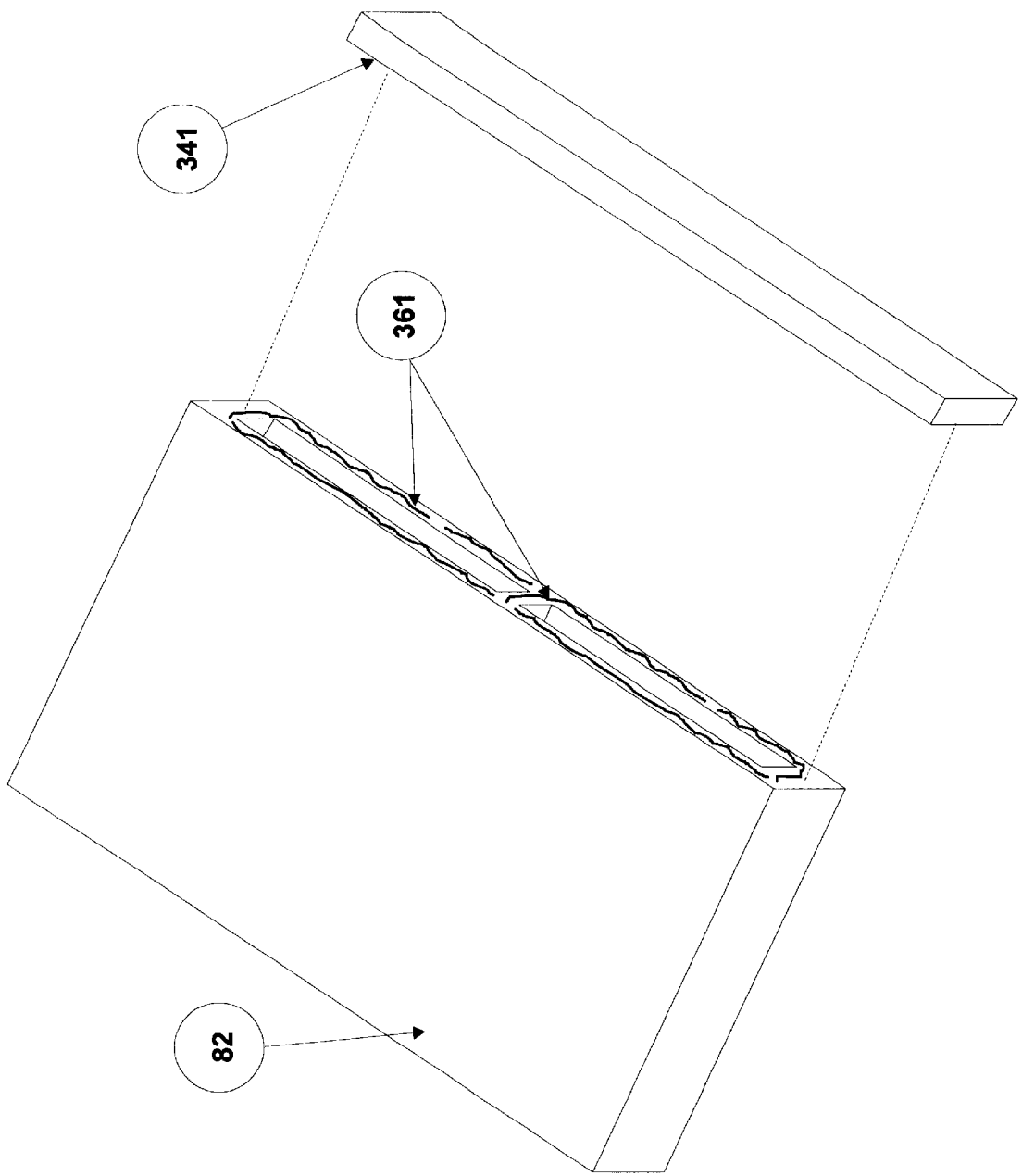
FIG. 36 is an illustration of the attachment of end caps to the flooring planks.
Figure 37:
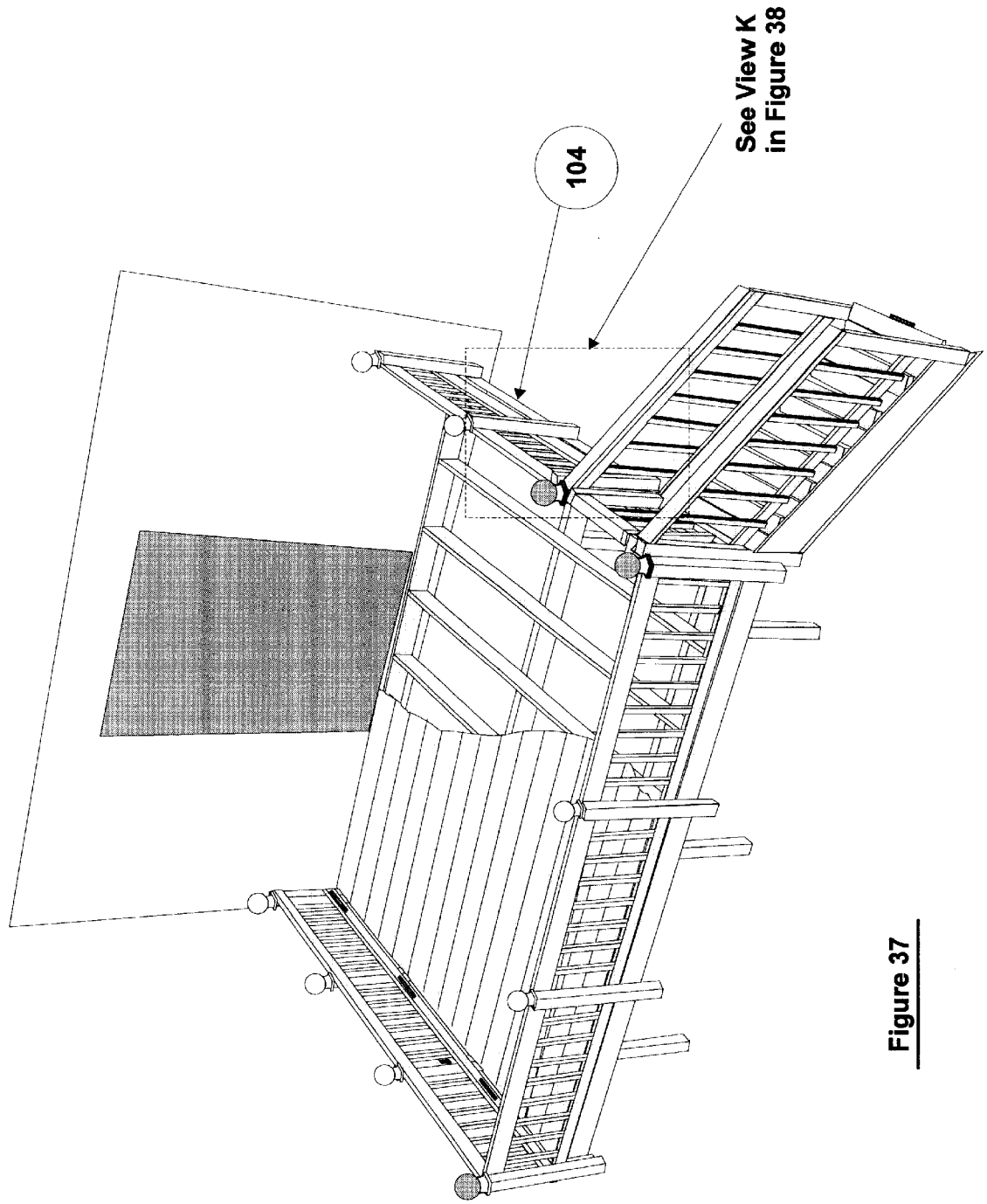
FIG. 37 is a perspective view of the invention highlighting the attachment of decorative FRP pultruded trim panels to the perimeter of the flooring system.
Figure 38:
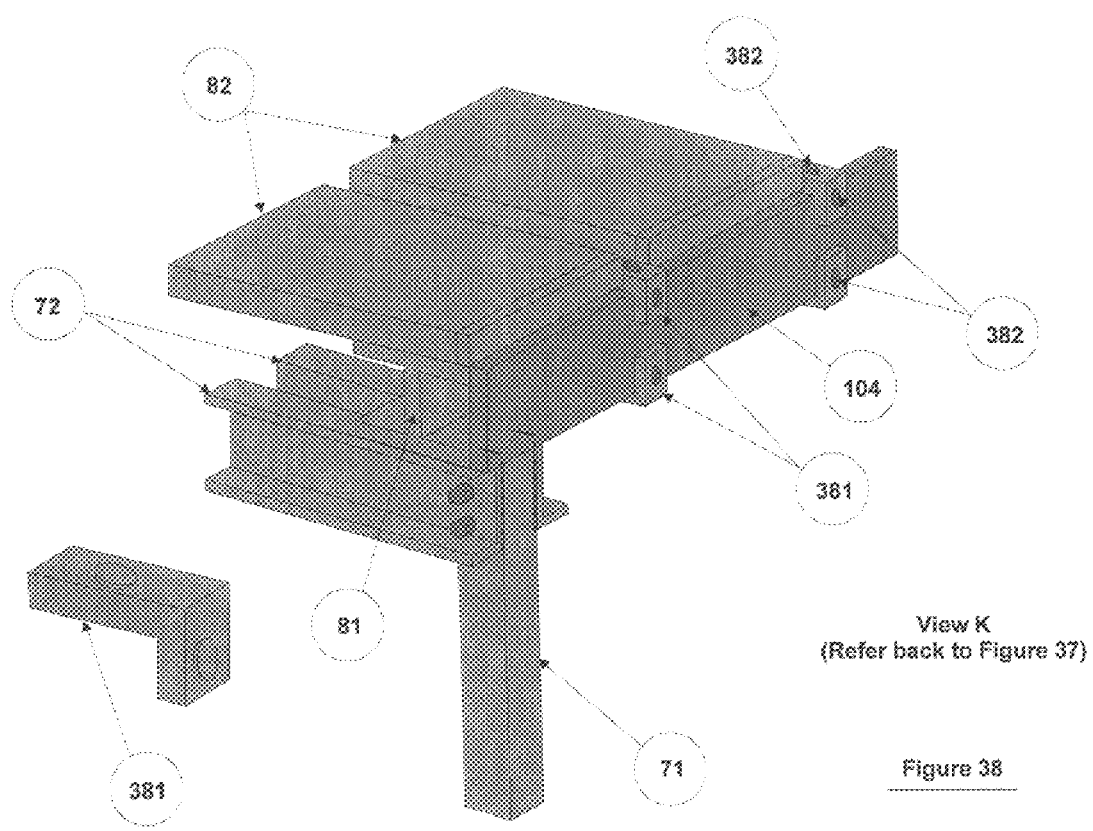
FIG. 38 is a detailed perspective view of the attachment of decorative FRP pultruded trim panels to the perimeter of the flooring system.

Illustrated in FIG. 36 are the flooring plank end caps 341, which are attached to the flooring planks 82 either as a force fit or with adhesive bonding 361. The type, shape, style, color, installation method, and configuration of the flooring plank end caps 341 can be varied and shall not be limited by this disclosure. Illustrated in FIG. 37 is the decorative system, which further comprises of decorative FRP pultruded trim panels 104. Illustrated in FIG. 38 is View K, which is an enlarged view of the attachment of the FRP pultruded trim panels 104 to the perimeter of the flooring system of the invention using FRP trim panel brackets 381 (fabricated from FRP angle material), corrosion resistant hardware 382 (countersunk self-tapping screws), and/or optional adhesive bonding. Countersunk holes are drilled into the trim panel brackets 381 and pilot holes are drilled into the joists 81, through which the corrosion resistant hardware 382 (countersunk self-tapping screws) are threaded.

Figure 39:
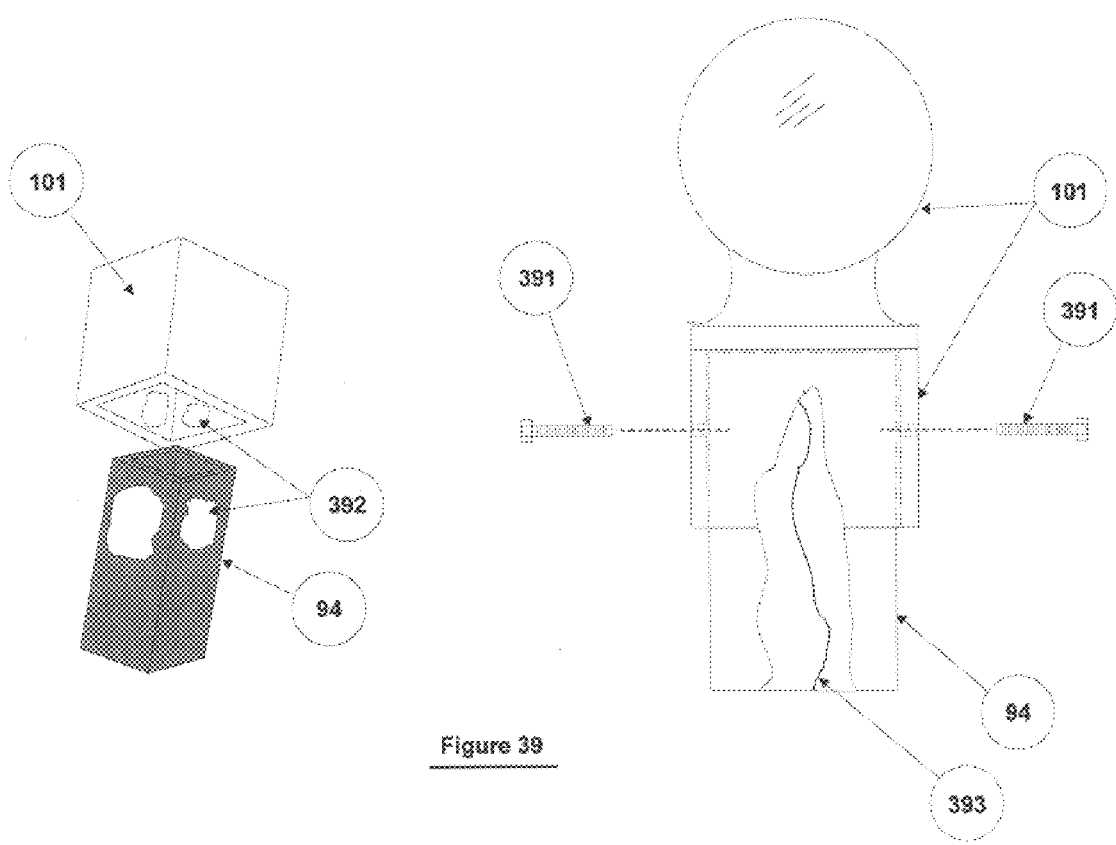
FIG. 39 illustrates detailed views of the attachment of auxiliary lighting units to vertical rail posts.
Figure 39B:
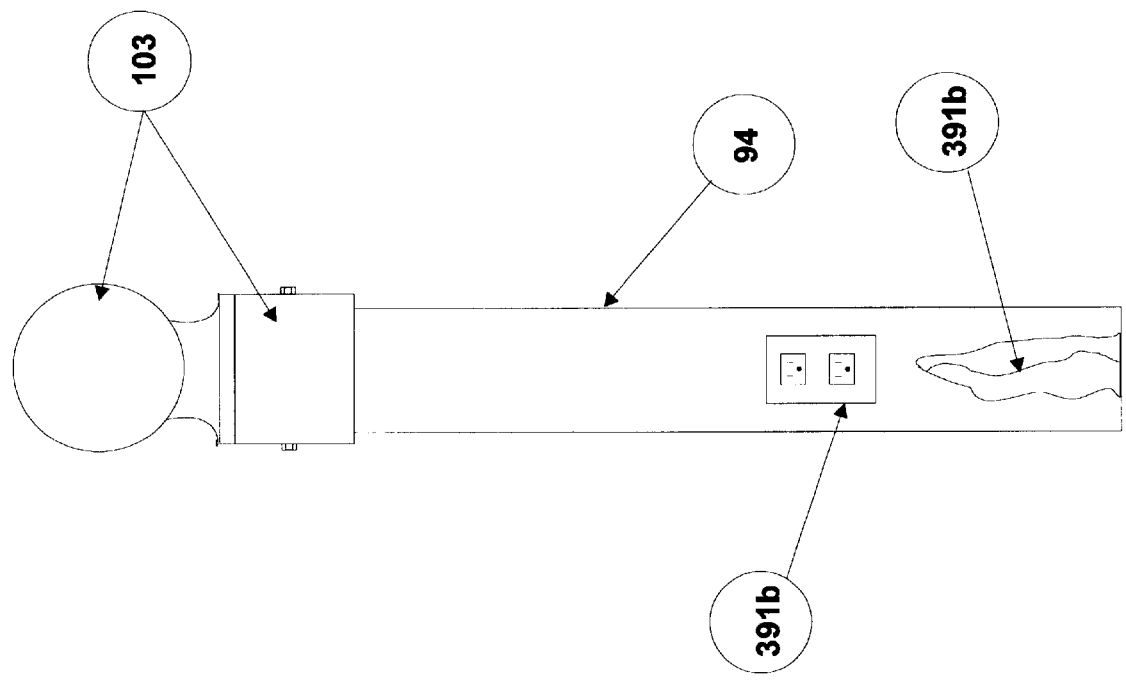
FIG. 39b illustrates a view of a vertical rail post with an electrical outlet mounted on it.
Figure 40:
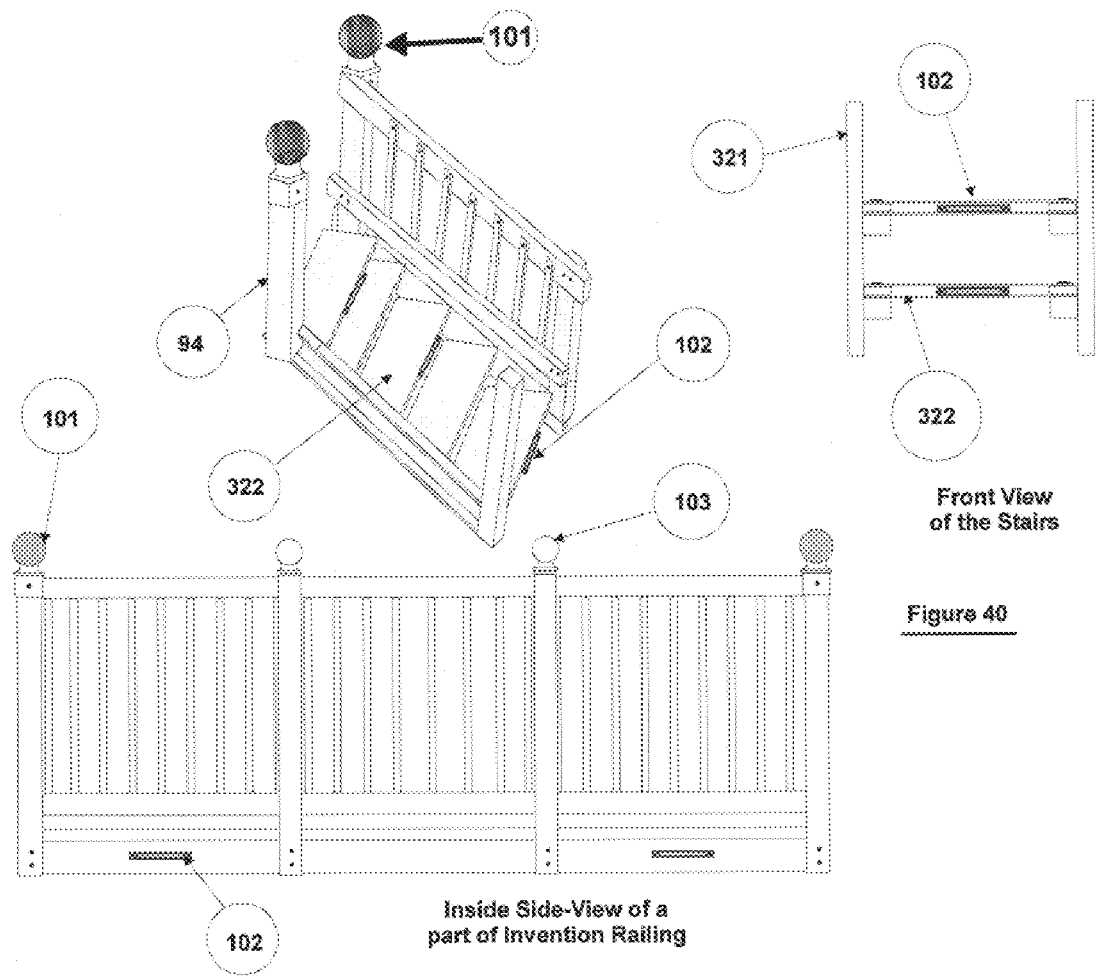
FIG. 40 illustrates views of the attachment of low-level auxiliary lighting units mounted on the flooring system safety system, or on stair treads.

Illustrated in FIG. 39 is one of a plurality of auxiliary lighting units 101, which is a part of the decorative system. The auxiliary lighting unit 101 is securely mounted on said FRP pultruded vertical rail posts 94. The auxiliary lighting units 101 are attached to vertical rail posts 94 using corrosion resistant hardware 391 (self-tapping screws), and/or optional adhesive bonding 392. The required wiring 393 for said optional auxiliary lighting units 101, can be installed through hollow sections of FRP pultruded components of the invention. As illustrated in FIG. 39*a*, optional electrical power can be installed throughout the structure of the invention. As illustrated in FIG. 39*b*, electrical outlets 391*a* can be installed in the FRP pultruded components such as the vertical rail posts 94. The required wiring 391*b* for said optional electrical power, can be concealed through hollow sections of FRP pultruded components of the invention. As illustrated in FIG. 40, in addition to the auxiliary lighting units 101, the decorative system further comprises a plurality of optional low-level auxiliary lighting units 102 securely mounted on the flooring system, safety system, or on stair treads 322. Auxiliary lighting units 102 are typically commercial off-the-shelf units and are attached to the flooring system using corrosion resistant hardware (self-tapping screws) through pilot holes drilled into the flooring system. The required wiring for low-level auxiliary lighting units 102 can also be installed through hollow sections of the invention similarly to that wiring 393 illustrated in FIG. 39.

Illustrated in FIG. 40*a* is the decorative system of the invention, which can also be configured to be screened-in. An enlarged view of the attachment (Method 1) of the screen 401*a* to the roofing system vertical rail posts 94 using FRP rectangular tubing 401*b*, is illustrated in FIG. 40*b*. The tubing 402*b*, sandwiches the screen to the roofing system vertical posts 111 and is attached using corrosion resistant hardware 402*b* (self-tapping screws) and/or optional adhesive bonding 403*b*. Also illustrated in FIG. 40*b*, is an enlarged view of the attachment (Method 2) of the screen 401*a* and screen tubing 404*b* to the roofing system vertical rail posts 94 which utilizes an integrated slot. The screen tubing 404*b*, sandwiches the screen to the roofing system vertical rail posts 94 by inserting it into the slot in the vertical rail posts 94. There are numerous decorative accessories, variations, and configurations which the decorative system 100, can be designed with and shall not be limited by this disclosure. The type, shape, color, orientation, placement, type of material combination, arrangement, spacing, method of attachment, and configuration may be varied and shall not be limited by this disclosure. The type, color, configuration, and number of attachment hardware may also be varied and shall not be limited by this disclosure. In addition, the bonding material and bonding method may also be varied and shall not be limited by this disclosure. These variations are not limited by this disclosure and may be varied according but not limited to design requirements, building codes, customer requirements, artistic expression, and aesthetics.

Figure 41:
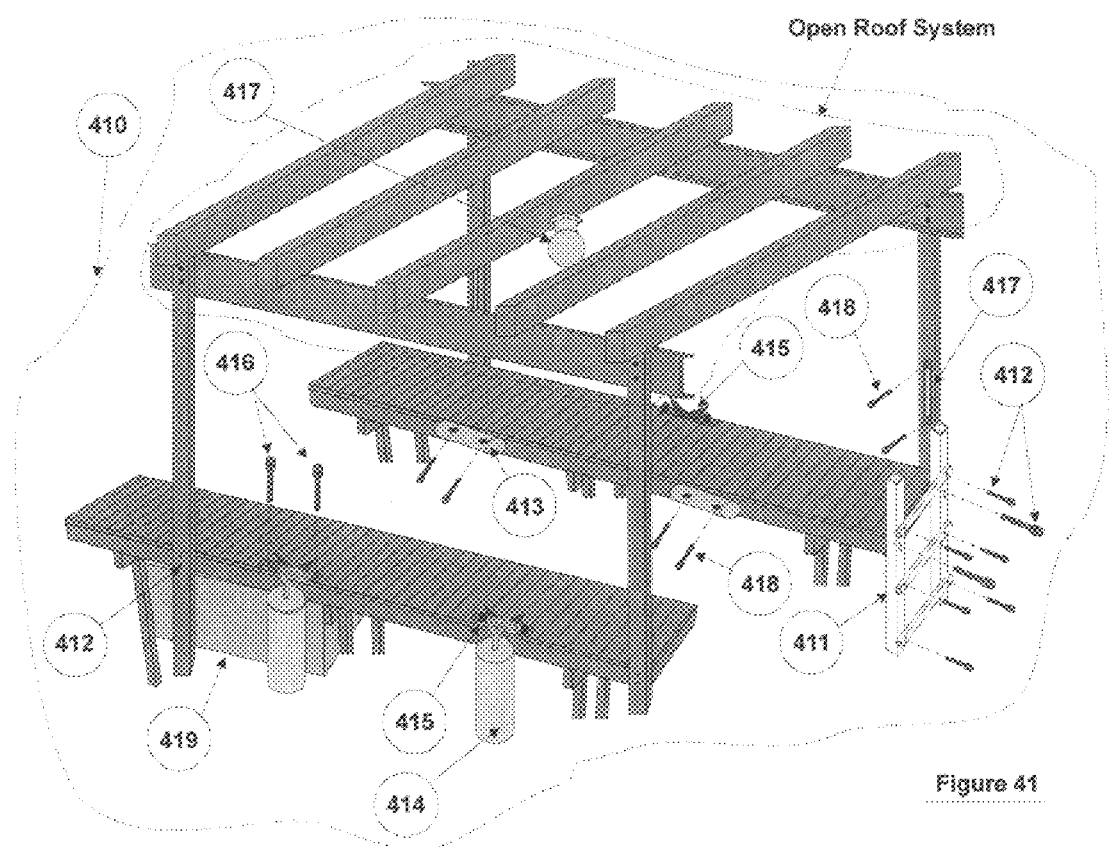
FIG. 41 is an illustration of the invention configured as a dock with an open roof structure and decorative accessories.

When the invention is configured as a dock 410, as illustrated in FIG. 41, the decorative system further comprises of a plurality of optional FRP or commercially available dock accessories including but not limited to dock ladders 411 secured by corrosion resistant hardware 412 (self-tapping screws), rub rails 413 corrosion resistant hardware 418 (self-tapping screws), bumpers 414, cleats 415 secured by corrosion resistant hardware 416 (self-tapping screws), auxiliary lights 417 corrosion resistant hardware 418 (self-tapping screws), and commercial flotation kits 419 attached to the invention. Commercial flotation kits 419 can be incorporated into dock/deck/boardwalk structures (e.g., polyethylene encased EPS foam flotation polyethylene float drums, and metal tube-type floats). A boatlift (e.g., floating, fixed, etc.) can also be incorporated into the dock or roof structure to lift all types of watercraft. There are numerous decorative accessories, variations, and configurations which the decorative system 100, the can be designed with and shall not be limited by this disclosure. The type, shape, color, orientation, placement, type of material combination, arrangement, spacing, method of attachment, and configuration may be varied and shall not be limited by this disclosure. The type, color, configuration, and number of attachment hardware may also be varied and shall not be limited by this disclosure. In addition, the bonding material and bonding method may also be varied and shall not be limited by this disclosure. These variations are not limited by this disclosure and may be varied according but not limited to design. requirements, building codes, customer requirements, artistic expression, and aesthetics.

Figure 42:
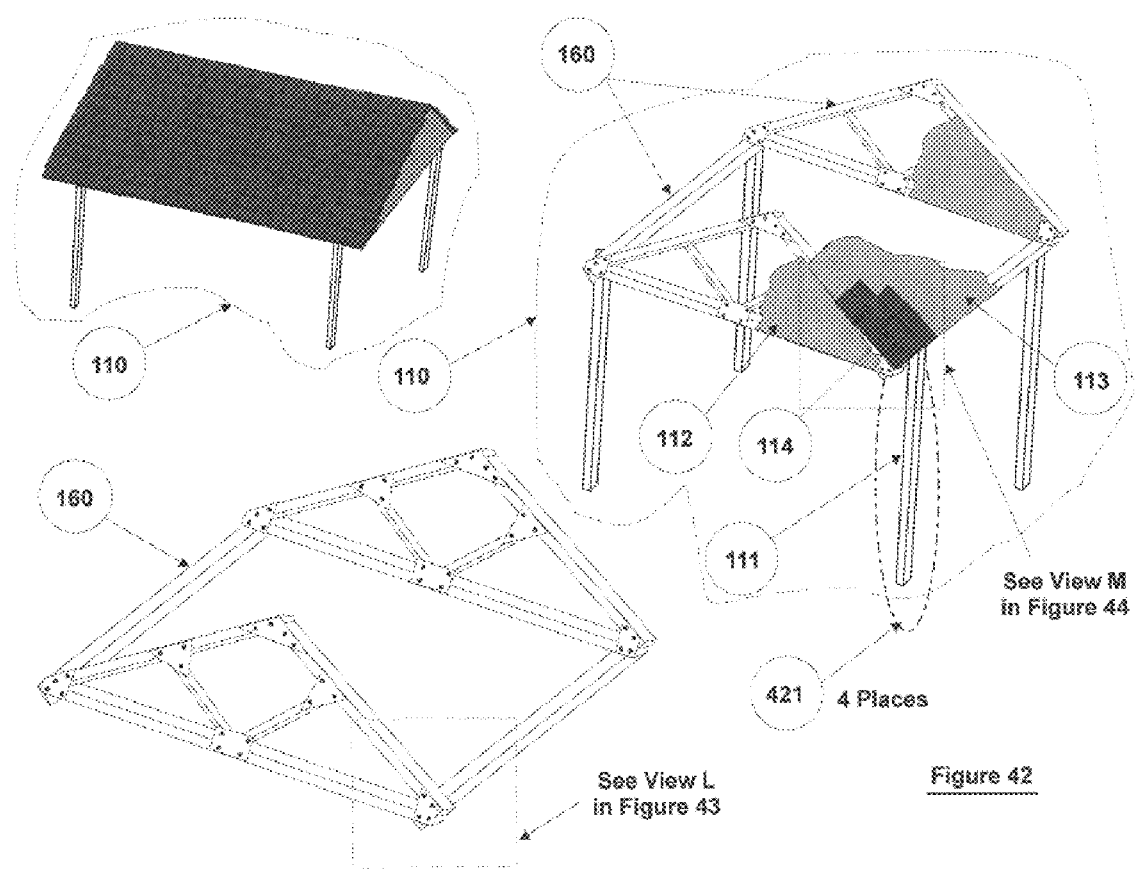
FIG. 42 illustrates views of the roofing system and roof frame or truss system.

The optional roofing system 110 illustrated in FIG. 42, is comprised of a second weight bearing support system 421 and a roof frame or truss system 160. The configuration of the optional roofing system can be varied. For example the roofing system 110, illustrated in FIG. 42 is a closed system. Characteristics of the roofing system 110 and the roof frame (or truss system) 160 including but not limited to shape, color, and configuration can be varied according but not limited to customer, designer, and building code requirements. The second (or roof) weight bearing system 421 consists of vertical support posts 111, roof sheathing panels 113 and shingles 114 as illustrated in FIG. 42. Illustrated in View L of FIG. 43 is an enlarged view of an example method for assembling the roof frame or truss system 160 of FIG. 42. The roof frame or truss system is comprised of FRP rectangular-shaped tubing 431, various shaped FRP tie-plates 432, FRP reinforcement blocks 433 and 434, truss support blocks 435, corrosion resistant hardware 436, 437, 438 (bolts, washers, and nuts), roof post plates 439, and/or adhesive bonding, or any combination. View L illustrates an example method for assembling the components of the roof frame or truss system 160 using FRP tubing 431, FRP tie-plates 432, corrosion resistant hardware 436, 437, 438 (bolts, washers, and nuts), and/or optional adhesive bonding. The other roof truss system component connections are similar in construction to that illustrated in FIG. 43. Illustrated in FIG. 44 is the roofing system, which further comprises a plurality of FRP pultruded, fiberglass, or plastic shingles 114 or barrel tiles 444 securely attached to the roof sheathing panels 113 using corrosion resistant hardware 443 (self-tapping screws) and/or optional adhesive bonding 432 or any combination. Trim panels 112 are attached to the truss joists 431 of the roof frame (truss) system 160 as illustrated in the enlarged view (View M) in FIG. 44 using corrosion resistant hardware 441 (self-tapping screws) and/or optional adhesive bonding, or any combination. Roof sheathing panels 113 are attached to the truss joists 431 (of the roof frame (truss) system) as illustrated in the enlarged view (View M) in FIG. 44 using corrosion resistant hardware 442 (countersunk self-tapping screws), and/or optional adhesive bonding 443, or any combination. The shingles 112 and barrel tiles 444 are attached to the roof sheathing 113 as illustrated in View M of FIG. 44, using corrosion resistant hardware 443 (countersunk self-tapping screws) and/or optional adhesive bonding, or any combination. The shingles 114 and roof sheathing 113 can be manufactured from various materials including but not limited to FRP pultruded, honeycomb or foam core sandwich, fiberglass, or plastic sheathing panels, securely attached to the FRP pultruded roof trusses or FRP pultruded rafters. The roofing system 450 illustrated in FIG. 45 is an open system and is assembled similarly to the construction as illustrated in FIGS. 42, 43, and 44. The roofing system including second weight bearing system can be either securely attached to the flooring system or combined with the first weight bearing system as illustrated in FIG. 45. There are numerous variations and configurations, which the roofing system can be designed with and shall not be limited by this disclosure. The type, shape, color, orientation, placement, type of material, arrangement, spacing, method of attachment, and configuration may be varied and shall not be limited by this disclosure. The type, color, configuration, and number of attachment hardware may also be varied and shall not be limited by this disclosure. In addition, the bonding material and bonding method may also be varied and shall not be limited by this disclosure. These variations are not limited by this disclosure and may be varied according but not limited to design requirements, building codes, customer requirements, artistic expression, and aesthetics.

The present invention has been described with reference to the preferred embodiment. Obviously, modifications and alterations will occur to others upon a reading and understanding of the specification. These modifications, variations, options, and alterations include but are not limited to the following:

Benches
Gazebos
Hot tub decks
Spa decks
Screened enclosures
Pavilions
Enclosures (pool, animal, etc.)
Property or yard enclosures
Porches
Booths
Stands
Children's play structure/enclosure
Lattice
Multi-levels
Storage bins and sheds
Sound systems
Boat mooring accessories
Boat/watercraft lifts
Various cross-sections of FRP pultrusion structural shapes
Various colors
Trellises
Any combination of wood, metal, PVC, and FRP shapes
Any combination of welding, adhesives, metal, composite, wood, and plastic fasteners
Coatings, sealants, pigments, and paints used throughout the invention It is intended by the applicant to include all such modifications, options, and alterations insofar as they come within the scope of the claims, appended claims, or the equivalent thereof.

What is claimed is:

1. A structure assembled from continuous fiber reinforced plastic (FRP) pultruded components comprising:
    first weight bearing system;
    flooring system securely attached to said first weight bearing system;
    safety system securely attached to said flooring system; and
    decorative system securely attached to said safety system.

2. The structure according to claim 1, further comprising roofing system comprising second weight bearing support system and a roof frame or truss system securely attached to said flooring system or to said first weight bearing system.

3. The structure according to claim 1, wherein said first weight bearing support system, further comprises:
    a plurality of continuous FRP pultruded vertical support posts secured to concrete footings for securing the deck to the ground or resting on corrosion resistant pads; and
    a plurality of continuous FRP pultruded beams securely attached to said continuous FRP pultruded vertical support posts.

4. The structure according to claim 3, wherein said flooring system, further comprises:
    a plurality of continuous FRP pultruded joists securely attached to said continuous FRP pultruded beams; and
    a plurality of continuous FRP pultruded flooring panels, fiberglass flooring panels, sandwich panels with honeycomb or foam cores, or continuous FRP pultruded flooring planks securely attached to said continuous FRP pultruded joists.

5. The structure according to claim 4, wherein said plurality of continuous FRP pultruded flooring panels, fiberglass flooring panels, sandwich panels with honeycomb or foam cores, or continuous FRP pultruded flooring planks are coated with a non-skid surface.

6. The structure according to claim 4, wherein said safety system, further comprises:

a railing system comprising a plurality of continuous FRP pultruded vertical support posts having a plurality of continuous FRP pultruded reinforcement spacers therein, and a plurality of continuous FRP pultruded balusters, plastic or pvc latticework, plastic panels, or decorative continuous FRP pultruded latticework, securely attached to the perimeter of said flooring system;

continuous FRP pultruded upper baluster rails securely attached to said continuous FRP pultruded vertical rail posts and said continuous FRP pultruded balusters, plastic or pvc latticework, plastic panels, or continuous FRP pultruded decorative latticework;

continuous FRP pultruded lower baluster rails securely attached to said continuous FRP pultruded vertical rail posts and said continuous FRP pultruded balusters, plastic or pvc latticework, plastic panels, or continuous FRP pultruded decorative latticework;

stairs comprised of continuous FRP pultruded stair treads and continuous FRP pultruded stair risers securely attached to said flooring system at the perimeter of said flooring system and other reinforcing pieces;

a ramp comprised of a plurality of continuous FRP pultruded side stringers securely attached to said flooring system at the perimeter of said flooring system, a plurality of continuous FRP pultruded ramp surface board support rails securely attached to said FRP pultruded side stringer, and a plurality of ramp surface members securely attached to said FRP pultruded ramp surface board support rails; and a continuous FRP pultruded gate securely attached to said trailing system.

7. The structure according to claim 6 wherein said decorative system, further comprises:

a plurality of decorative continuous FRP pultruded, pvc, or plastic end caps fitted into said continuous FRP pultruded vertical rail support posts;

a plurality of decorative continuous FRP pultruded, pvc, continuous fiber reinforced plastic, or plastic trim panels attached to the perimeter of said flooring system;

a plurality of decorative end caps fitted into said flooring planks;

a plurality of electrical receptacles securely mounted on said continuous FRP pultruded vertical rail posts, the required wiring for said electrical receptacles being installed through hollow sections of said continuous FRP pultruded components;

a plurality of auxiliary lighting units securely mounted on said continuous FRP pultruded vertical rail posts, the required wiring for said auxiliary lighting being installed through hollow sections of said continuous FRP pultruded components; and a plurality of low-level auxiliary lighting securely mounted on said flooring system, safety system or on said continuous FRP pultruded stair treads, the required wiring for said auxiliary lighting being installed through hollow sections of said continuous FRP pultruded components.

8. The structure according to claim 2 wherein said second weight bearing support system, further comprises a plurality of FRP pultruded vertical support posts securely attached to said flooring system or to said first weight bearing system.

9. The structure according to claim 8 wherein said roof frame or truss system, further comprises:

a plurality of FRP pultruded horizontal framing members securely attached to said FRP pultruded vertical support posts;

a plurality of FRP pultruded roof trusses or a plurality of FRP pultruded rafters securely attached to said FRP pultruded horizontal framing members;

a plurality of FRP pultruded, plastic, sandwich panels with honeycomb or foam cores, or fiberglass, sheathing panels securely attached to said FRP pultruded roof trusses or FRP pultruded rafters;

a plurality of optional decorative FRP pultruded, pvc, fiberglass, or plastic shingles or FRP pultruded, pvc, fiberglass, or plastic barrel tiles securely attached to said sheathing; and a plurality of FRP pultruded, pvc, fiber reinforced plastic, or plastic trim panels securely attached to said FRP pultruded horizontal framing members.

10. The structure according to claim 9, wherein said structure, further comprises an optional decorative FRP pultruded door securely attached to said FRP pultruded vertical support posts.

11. The structure according to claim 10, wherein said structure further comprises mesh screening securely attached between said flooring system and said trim panels at the perimeter of said flooring system and between said FRP pultruded horizontal framing members of said roofing system and said trim panels at the perimeter of said roofing system.

12. The structure according to claim 2, wherein said structure is securely attached to a pre-existing stricture.

13. The structure according to claim 1, wherein the FRP pultruded components include a UV inhibitor.

14. The structure according to claim 1, wherein said structure is free-standing.

15. The structure according to claim 2, wherein said structure is free-standing.

16. The structure according to claim 7, wherein said structure is free-standing.

17. The structure according to claim 11, wherein said structure is free-standing.

18. The structure according to claim 7 further comprising a FRP pultruded boat lift.

19. The structure according to claim 7 further comprising an optional FRP pultruded flotation dock.

20. A structure assembled from continuous FRP pultruded components comprising:

a plurality of continuous FRP pultruded vertical support posts secured to concrete footings for securing posts to the ground or resting on corrosion resistant pads;

a plurality of continuous FRP pultruded beams securely attached to said continuous FRP pultruded vertical support posts;

a plurality of continuous FRP pultruded joists securely attached to said continuous FRP pultruded beams;

a plurality of continuous FRP pultruded flooring panels, fiberglass flooring panels, sandwich panels with honeycomb or foam cores, or continuous FRP pultruded flooring planks securely attached to said continuous FRP pultruded joists;

a railing system comprising a plurality of continuous FRP pultruded vertical support posts having a plurality of continuous FRP pultruded reinforcement spacers therein, and a plurality of continuous FRP pultruded balusters, plastic or pvc latticework, plastic panels, or decorative continuous FRP pultruded latticework, securely attached to the perimeter of said flooring system;

continuous FRP pultruded upper baluster rails securely attached to said continuous FRP pultruded vertical rail posts and said continuous FRP pultruded balusters, plastic or pvc latticework, plastic panels, or continuous FRP pultruded decorative latticework;

continuous FRP pultruded lower baluster rails securely attached to said continuous FRP pultruded vertical rail posts and said continuous FRP pultruded balusters, plastic or pvc latticework, plastic panels, or continuous FRP pultruded decorative latticework;

stairs comprised of continuous FRP pultruded stair treads and continuous FRP pultruded stair risers securely attached to said flooring system at the perimeter of said flooring system;

a ramp comprised of a plurality of continuous FRP pultruded side stringers securely attached to said flooring system at the perimeter of said flooring system, a plurality of continuous FRP pultruded ramp surface board support rails securely attached to said continuous FRP pultruded side stringers, and a plurality of ramp surface members securely attached to said continuous FRP pultruded ramp surface board support rails;

a continuous FRP pultruded gate securely attached to said railing system;

a plurality of decorative continuous FRP pultruded, pvc, or plastic end caps fitted into said continuous FRP pultruded vertical rail support posts;

a plurality of decorative continuous FRP pultruded, pvc, continuous fiber reinforced plastic, or plastic trim panels attached to the perimeter of said flooring system;

a plurality of decorative end caps fitted into said continuous FRP pultruded flooring planks;

a plurality of auxiliary lighting units securely mounted on said continuous FRP pultruded vertical rail posts, the required wiring for said auxiliary lighting being installed through hollow sections of said continuous FRP pultruded components; and a plurality of low-level auxiliary lighting securely mounted on said flooring system, safety system, or on said continuous FRP pultruded stair treads, the required wiring for said auxiliary lighting being installed through hollow sections of said continuous FRP pultruded components.

21. The structure according to claim 20, further comprising:

a plurality of FRP pultruded vertical support posts securely attached to said FRP pultruded joists;

a plurality of FRP pultruded horizontal framing members securely attached to said FRP pultruded vertical support posts;

a plurality of FRP pultruded roof trusses or a plurality of FRP pultruded rafters securely attached to said FRP pultruded horizontal framing members;

a plurality of FRP pultruded, plastic, sandwich panels with honeycomb or foam cores, or fiberglass, sheathing panels securely attached to said FRP pultruded roof trusses or FRP pultruded rafters;

a plurality of optional decorative FRP pultruded, pvc, fiberglass, or plastic shingles or FRP pultruded, pvc, fiberglass, or plastic barrel tiles securely attached to said sheathing;

a plurality of trim panels securely attached to said FRP pultruded horizontal framing members;

an optional decorative pultruded door securely attached to said FRP pultruded vertical support posts; and optional mesh screening securely attached between said FRP pultruded floor panels, fiberglass flooring panels, sandwich panels with honeycomb or foam cores, or said FRP pultruded floor planks and said FRP pultruded, pvc, fiber reinforced plastic, or plastic trim panels at the perimeter of said FRP pultruded floor panels, fiberglass flooring panels, sandwich panels with honeycomb or foam cores, or FRP pultruded floor planks and between said horizontal framing members and said FRP pultruded, pvc, fiber reinforced plastic, or plastic trim panels.

22. The structure according to claim 20, wherein said structure is securely attached to a pre-existing structure.

23. The structure according to claim 21, wherein said structure is free-standing.

24. A method of assembling a structure from continuous FRP pultruded components comprising the steps of:

installing a plurality of continuous FRP pultruded vertical support posts into the ground, concrete pads, onto corrosion resistant pads, or through the water into the ground, in the case of a dock;

securely attaching a plurality of continuous FRP pultruded beams to said continuous FRP pultruded vertical support posts;

securely attaching a plurality of continuous FRP pultruded joists to said continuous FRP pultruded beams;

securely attaching a plurality of continuous FRP pultruded flooring panels, fiberglass flooring panels, sandwich panels with honeycomb or foam cores, or continuous FRP pultruded flooring planks to said continuous FRP pultruded joists;

securely attaching a plurality of continuous FRP pultruded vertical rail posts to the perimeter of said continuous FRP pultruded flooring panels, fiberglass flooring panels, sandwich panels with honeycomb or foam cores, or continuous FRP pultruded flooring planks;

securely attaching a plurality of continuous FRP pultruded balusters to the perimeter of said continuous FRP pultruded flooring panels, fiberglass flooring panels, sandwich panels with honeycomb or foam cores, or continuous FRP pultruded flooring planks;

securely attaching a plurality of continuous FRP pultruded upper baluster rails to said continuous FRP pultruded vertical rail posts and said continuous FRP pultruded balusters;

securely attaching a plurality of continuous FRP pultruded lower baluster rails to said continuous FRP pultruded vertical rail posts and said continuous FRP pultruded balusters;

securely attaching continuous FRP pultruded stairs, comprising continuous FRP pultruded stair risers, continuous FRP pultruded stair treads and continuous FRP pultruded reinforcing pieces, to the perimeter of said FRP pultruded flooring panels, fiberglass flooring panels, sandwich panels with honeycomb or foam cores, or FRP pultruded flooring planks;

securely attaching a continuous FRP pultruded ramp comprising continuous FRP pultruded side stringers, continuous FRP pultruded ramp surface support rails and ramp surface members to the perimeter of said continuous FRP pultruded flooring panels, fiberglass flooring panels, sandwich panels with honeycomb or foam cores, or continuous FRP pultruded flooring planks;

securely attaching a continuous FRP pultruded gate to said continuous FRP pultruded vertical rail support posts;

securely fitting a plurality of decorative continuous FRP pultruded, pvc, or plastic end caps into said continuous FRP pultruded vertical rail support posts;

securely attaching a plurality of decorative continuous FRP pultruded, pvc, fiber reinforced plastic, or plastic trim panels to the perimeter of said flooring system;

securely fitting a plurality of decorative end caps into said continuous FRP pultruded flooring planks, fiberglass flooring panels, or sandwich panels with honeycomb or foam cores;

securely mounting a plurality of auxiliary lighting units on said continuous FRP pultruded vertical rail posts, the required wiring for said auxiliary lighting being installed through hollow sections of said continuous FRP pultruded components; and securely mounting a plurality of low-level auxiliary lighting on said continuous FRP pultruded flooring system or on said continuous FRP pultruded stair treads, the required wiring for said auxiliary lighting being installed through hollow sections of said continuous FRP pultruded components.

25. The method according to claim 24, further comprising the steps of:

securely attaching a second FRP pultruded weight bearing system to the perimeter of said FRP pultruded flooring panels, fiberglass flooring panels, sandwich panels with honeycomb or foam cores, or FRP pultruded flooring planks or to said FRP pultruded vertical support posts;

securely attaching a plurality of FRP pultruded horizontal framing members to said FRP pultruded vertical support posts;

securely attaching a plurality of FRP pultruded roof trusses or a plurality of FRP pultruded rafters to said FRP pultruded horizontal framing members;

securely attaching a plurality of FRP pultruded, plastic, sandwich panels with honeycomb or foam cores, or fiberglass, sheathing panels to said FRP pultruded roof trusses or FRP pultruded rafters;

securely attaching a plurality of optional decorative FRP pultruded, pvc, fiberglass, or plastic shingles or FRP pultruded. pvc, fiberglass, or plastic barrel tiles to said FRP pultruded, plastic, sandwich panels with honeycomb or foam cores, or fiberglass, sheathing; and securely attaching a plurality of FRP pultruded, pvc, fiber reinforced plastic, or plastic trim panels to said FRP pultruded horizontal framing members;

securely attaching an optional FRP pultruded door to said FRP pultruded vertical support posts; and securely attaching optional mesh screening between said FRP pultruded flooring panels or FRP pultruded flooring planks and an optional FRP pultruded, pvc, fiber reinforced plastic, or plastic trim panels at the perimeter of said FRP pultruded flooring panels, fiberglass flooring panels, sandwich panels with honeycomb or foam cores, or said FRP pultruded flooring planks and between said FRP pultruded horizontal framing members and said FRP pultruded, pvc, fiber reinforced plastic, or plastic trim panels at the perimeter of said FRP pultruded horizontal framing members.

26. The method of claim 24 further comprising the step of securely attaching said continuous FRP pultruded structure to a pre-existing structure.

27. A method of installing a structure of continuous FRP pultruded components comprising the steps of:

installing a first weight bearing system to the ground, into concrete footings, or onto corrosion resistant pads;

securely attaching a flooring system to said first weight bearing system;

securely attaching a safety system to said flooring system; and securely attaching a decorative system to said safety system.

28. The method of claim 27, further comprising the steps of:

securely attaching a second weight bearing system comprising FRP pultruded vertical support posts to said flooring system or to said first weight bearing system;

securely attaching a roofing system to said second weight bearing system; and securely attaching an optional FRP pultruded door to said FRP pultruded vertical support posts; and securely attaching optional mesh screening to the perimeter of said flooring system and to the perimeter of said roofing system.

* * * * *